US012674992B2

(12) United States Patent
 Iwasaki

(10) Patent No.: US 12,674,992 B2
(45) Date of Patent: Jul. 7, 2026

(54) DISPLAY DEVICE AND DISPLAY METHOD

(71) Applicant: SONY GROUP CORPORATION, Tokyo (JP)

(72) Inventor: Masanori Iwasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 897 days.

(21) Appl. No.: 17/911,971

(22) PCT Filed: Feb. 9, 2021

(86) PCT No.: PCT/JP2021/004781
§ 371 (c)(1),
(2) Date: Sep. 15, 2022

(87) PCT Pub. No.: WO2021/192673
PCT Pub. Date: Sep. 30, 2021

(65) Prior Publication Data
US 2023/0009290 A1     Jan. 12, 2023

(30) Foreign Application Priority Data

Mar. 27, 2020     (JP) ................................. 2020-058190

(51) Int. Cl.
*G06F 3/01* (2006.01)
*G02B 27/01* (2006.01)
(52) U.S. Cl.
CPC ..... *G02B 27/0179* (2013.01); *G02B 27/0101* (2013.01); *G06F 3/01* (2013.01); *G06F 3/012* (2013.01)
(58) Field of Classification Search
CPC ....... G06F 3/01; G06F 3/012; G02B 27/0101; G02B 27/0179

(Continued)

(56) References Cited

U.S. PATENT DOCUMENTS

2010/0149073 A1*  6/2010  Chaum .............. G02B 27/0075
                                                            345/8
2016/0095540 A1*  4/2016  Shang ................ A61B 5/14532
                                                            600/319

(Continued)

FOREIGN PATENT DOCUMENTS

JP           06-347731 A      12/1994
JP        2006-509575 A       3/2006

(Continued)

OTHER PUBLICATIONS

International Search Report and Written Opinion of PCT Application No. PCT/JP2021/004781, issued on Apr. 27, 2021 11 pages of ISRWO.

*Primary Examiner* — Calvin C Ma
(74) *Attorney, Agent, or Firm* — CHIP LAW GROUP

(57)          ABSTRACT

The present technology provides a display device capable of appropriately displaying information in a visual field range of a user. The present technology provides a display device including: a display system configured to display information in a visual field range of a user by irradiating a retina of an eyeball with light using an element integrally provided on the eyeball of the user; a detection system configured to detect a change in an orientation and/or a position of the eyeball; and a control system configured to control a display position and/or a display mode of the information in the visual field range on the basis of a detection result in the detection system. According to the present technology, it is possible to provide a display device capable of appropriately displaying information in a visual field range of a user.

51 Claims, 39 Drawing Sheets

(58) Field of Classification Search
    USPC ......................................................... 345/156
    See application file for complete search history.

(56)                References Cited

U.S. PATENT DOCUMENTS

| 2016/0299354 A1* | 10/2016 | Shtukater | ................. | G02C 7/04 |
| 2017/0243324 A1* | 8/2017 | Mierle | ................. | G06T 15/005 |
| 2022/0050521 A1* | 2/2022 | Drozdov | ............. | G06V 40/193 |

FOREIGN PATENT DOCUMENTS

| JP | 2006-292883 A | 10/2006 |
| JP | 2015-141155 A | 8/2015 |
| JP | 2016-002353 A | 1/2016 |
| JP | 2016-500450 A | 1/2016 |
| JP | 2016-171550 A | 9/2016 |
| JP | 2018-042166 A | 3/2018 |
| KR | 10-2016-0112536 A | 9/2016 |
| WO | 2015/068440 A1 | 5/2015 |

* cited by examiner

DISPLAY PROCESSING 1

CONTENT CLASSIFICATION PROCESSING 1

INITIAL DISPLAY PROCESSING

DISPLAY POSITION / MODE ALTERATION NECESSITY
DETERMINATION PROCESSING 1

DISPLAY POSITION/MODE CONTROL PROCESSING

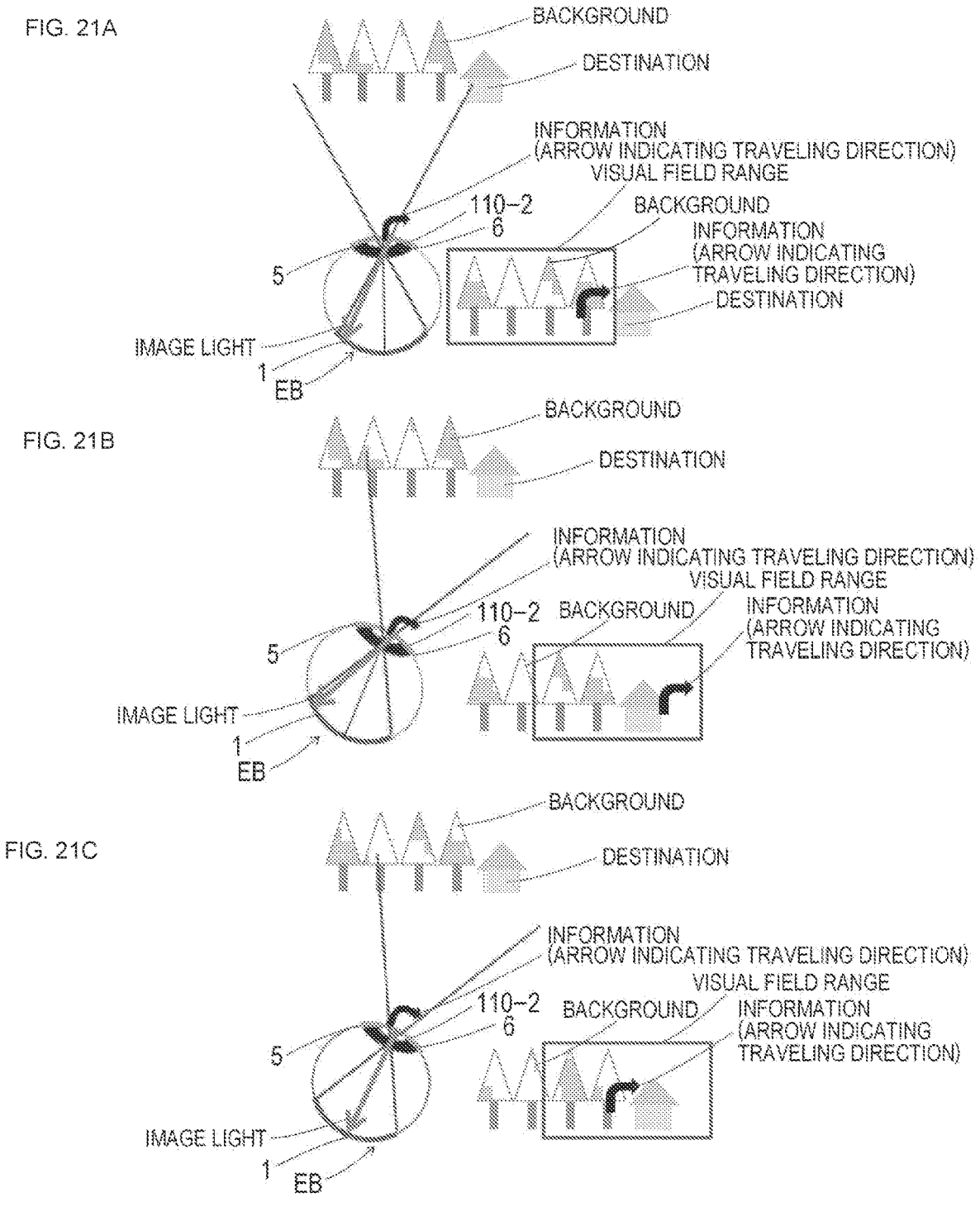

DISPLAY PROCESSING 2

*FIG. 24*

DISPLAY POSITION / MODE ALTERATION NECESSITY
DETERMINATION PROCESSING 2

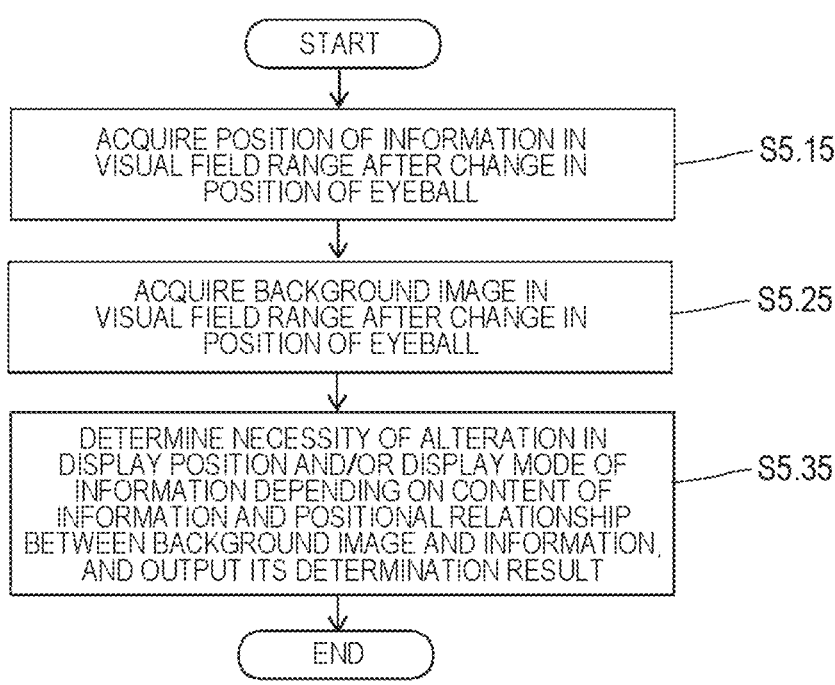

START

ACQUIRE POSITION OF INFORMATION IN
VISUAL FIELD RANGE AFTER CHANGE IN
POSITION OF EYEBALL — S5.15

ACQUIRE BACKGROUND IMAGE IN
VISUAL FIELD RANGE AFTER CHANGE IN
POSITION OF EYEBALL — S5.25

DETERMINE NECESSITY OF ALTERATION IN
DISPLAY POSITION AND/OR DISPLAY MODE OF
INFORMATION DEPENDING ON CONTENT OF
INFORMATION AND POSITIONAL RELATIONSHIP
BETWEEN BACKGROUND IMAGE AND INFORMATION,
AND OUTPUT ITS DETERMINATION RESULT — S5.35

END

DISPLAY PROCESSING 4

DISPLAY PROCESSING 5

CONTENT CLASSIFICATION PROCESSING 2

DISPLAY PROCESSING 1'

DISPLAY PROCESSING 2'

DISPLAY PROCESSING 3'

FIG. 33

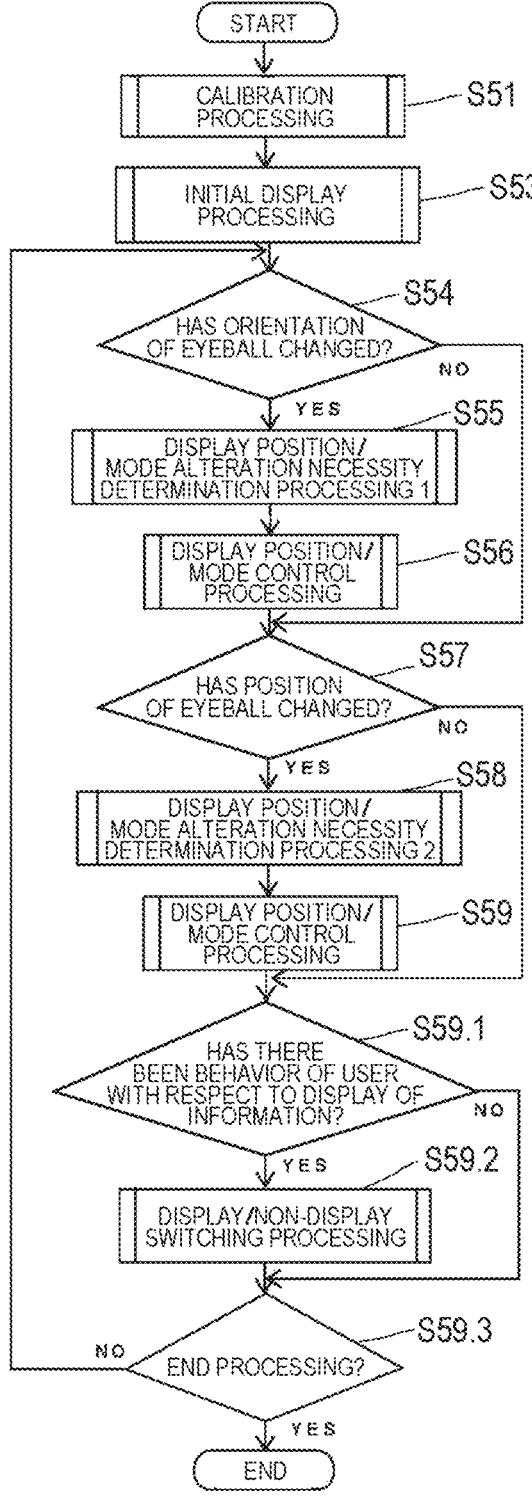

DISPLAY PROCESSING 5'

START

CALIBRATION PROCESSING — S51

INITIAL DISPLAY PROCESSING — S53

HAS ORIENTATION OF EYEBALL CHANGED? — S54 — NO

YES

DISPLAY POSITION/MODE ALTERATION NECESSITY DETERMINATION PROCESSING 1 — S55

DISPLAY POSITION/MODE CONTROL PROCESSING — S56

HAS POSITION OF EYEBALL CHANGED? — S57 — NO

YES

DISPLAY POSITION/MODE ALTERATION NECESSITY DETERMINATION PROCESSING 2 — S58

DISPLAY POSITION/MODE CONTROL PROCESSING — S59

HAS THERE BEEN BEHAVIOR OF USER WITH RESPECT TO DISPLAY OF INFORMATION? — S59.1 — NO

YES

DISPLAY/NON-DISPLAY SWITCHING PROCESSING — S59.2

END PROCESSING? — S59.3 — NO

YES

END

DISPLAY PROCESSING 6

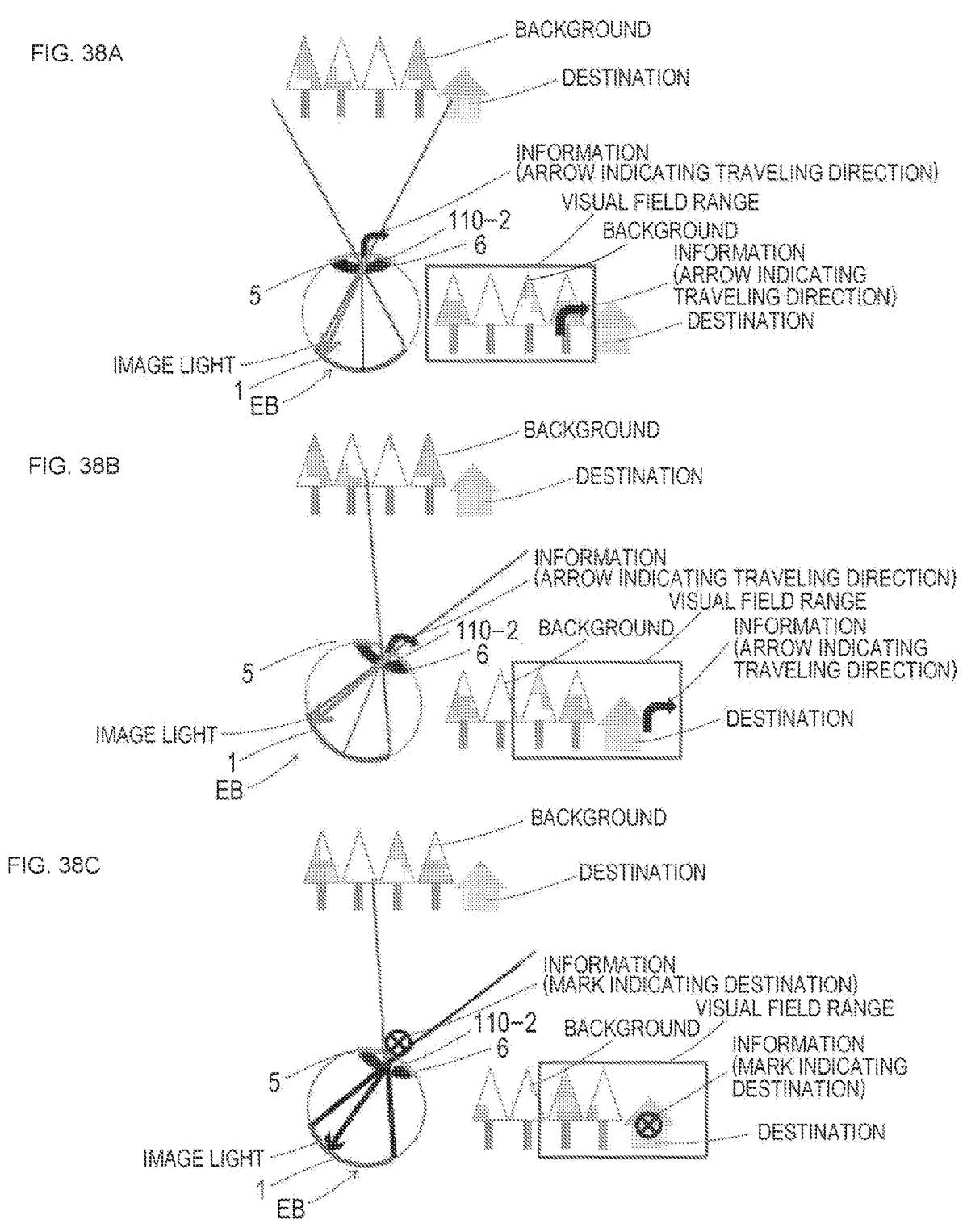

DISPLAY DEVICE AND DISPLAY METHOD

CROSS REFERENCE TO RELATED APPLICATIONS

This application is a U.S. National Phase of International Patent Application No. PCT/JP2021/004781 filed on Feb. 9, 2021, which claims priority benefit of Japanese Patent Application No. JP 2020-058190 filed in the Japan Patent Office on Mar. 27, 2020. Each of the above-referenced applications is hereby incorporated herein by reference in its entirety.

TECHNICAL FIELD

The technology according to the present disclosure (hereinafter also referred to as "present technology") relates to a display device and a display method.

BACKGROUND ART

A technology of displaying information in a visual field range of a user by irradiating a retina of an eyeball of the user with light using an element integrally provided on the eyeball of the user is conventionally known (for example, see Patent Document 1).

CITATION LIST

Patent Document

Patent Document 1: Japanese Patent Application Laid-Open No. 2006-292883

SUMMARY OF THE INVENTION

Problems to be Solved by the Invention

However, in the conventional technology, there has been room for improvement in appropriately displaying information in the visual field range of the user.

Therefore, a main object of the present technology is to provide a display device and a display method capable of appropriately displaying information in a visual field range of a user.

Solutions to Problems

The present technology provides
a display device including:
a display system configured to display information in a visual field range of a user by irradiating a retina of an eyeball with light using an element integrally provided on the eyeball of the user;
a detection system configured to detect a change in an orientation and/or a position of the eyeball; and
a control system configured to control a display position and/or a display mode of the information in the visual field range on the basis of a detection result in the detection system.

The control system may determine necessity of alteration in the display position and/or the display mode when the detection system detects a change in an orientation and/or a position of the eyeball, and control the display system on the basis of its determination result.

The control system may determine necessity of the alteration depending on presence or absence of a change in the display position before and after a change in an orientation and/or a position of the eyeball.

The control system may determine necessity of the alteration depending on a positional relationship between the display position and a background in the visual field range after a change in an orientation and/or a position of the eyeball.

The control system may determine content of the information and determine necessity of the alteration depending on its determination result.

The control system may make a first determination of determining whether or not it is necessary to urgently and/or forcibly notify the user of content of the information, and control the display system on the basis of a determination result in the first determination.

The control system may cause the display system to display the information conspicuously in the visual field range in a case where a determination result in the first determination is affirmed.

The control system may cause the display system to display the information at a center part in the visual field range in a case where a determination result in the first determination is affirmed.

The control system may make a second determination of determining whether or not content of the information is important for future behavior of the user in a case where a determination result in the first determination is negated, and control the display system on the basis of a determination result in the second determination.

The control system may cause the display system to display the information conspicuously in the visual field range in a case where a determination result in the second determination is affirmed.

The control system may cause the display system to display the information at a center part in the visual field range in a case where a determination result in the second determination is affirmed.

The control system may cause the display system to display the information inconspicuously in the visual field range in a case where a determination result in the second determination is negated.

The control system may cause the display system to display the information at a peripheral part in the visual field range in a case where a determination result in the second determination is negated.

The control system may perform machine learning of behavior of the user toward display of the information, and determine content of the information on the basis of its learning result.

The detection system may include an eyeball sensor configured to detect a change in an orientation of the eyeball.

The detection system may include a head sensor configured to detect a change in an orientation of a head of the user.

The detection system may include a sensor configured to detect movement of the user.

The detection system may include the eyeball sensor and the head sensor.

The detection system may include the eyeball sensor and the sensor configured to detect movement.

The detection system may include the head sensor and the sensor configured to detect movement.

The detection system may include the eyeball sensor, the head sensor, and the sensor configured to detect movement.

The element may be of an eyeball-worn type.

The element may be a display element.

The display device may further include a position shift detection system configured to detect a position shift between the eyeball and the element, and the control system may further control the display system on the basis of a detection result of the position shift detection system.

The control system may control the display position in such a manner not to change before and after the position shift.

The element may be of an eyeball-embedded type.

The element may be a display element.

The element may be an optical element, and the display system may include a projection unit configured to project, onto the optical element, light for displaying the information.

In this case, the display device may further include an incident position shift detection system configured to detect an incident position shift, which is a shift of an incident position of light entering the retina via the optical element according to a change in an orientation of the eyeball, and the control system may further control the display system on the basis of a detection result in the incident position shift detection system.

The control system may control the display system in such a manner that the incident position shift is corrected.

The display device may further include another detection system configured to detect opening-closing of an eyelid corresponding to the eyeball, and the control system may control the display system on the basis of a detection result in the another detection system.

The present technology also provides a display method including:

a process of displaying information in a visual field range of a user by irradiating a retina of an eyeball with light using an element integrally provided on the eyeball of the user;

a process of detecting a change in an orientation and/or a position of the eyeball; and a process of controlling a display position and/or a display mode of the information in the visual field range on the basis of a detection result in the process of detecting.

In the process of controlling, necessity of alteration in the display position and/or the display mode may be determined when a change in an orientation and/or a position of the eyeball is detected in the process of detecting, and the display position and/or the display mode may be controlled on the basis of its determination result.

In the process of controlling, necessity of the alteration may be determined depending on presence or absence of a change in the display position before and after a change in an orientation and/or a position of the eyeball.

In the process of controlling, necessity of the alteration may be determined depending on a positional relationship between the display position and a background in the visual field range after a change in an orientation and/or a position of the eyeball.

In the process of controlling, content of the information may be determined and, depending on its determination result, necessity of the alteration may be determined.

In the process of controlling, a first determination of determining whether or not it is necessary to urgently and/or forcibly notify the user of content of the information may be made, and the display position and/or the display mode may be controlled on the basis of a determination result in the first determination.

In the process of controlling, the information may be displayed conspicuously in the visual field range in a case where a determination result in the first determination is affirmed.

4

In the process of controlling, the information may be displayed at a center part in the visual field range in a case where a determination result in the first determination is affirmed.

In the process of controlling, a second determination of determining whether or not content of the information is important for future behavior of the user may be made in a case where a determination result in the first determination is negated, and the display position and/or the display mode may be controlled on the basis of a determination result in the second determination.

In the process of controlling, the information may be displayed conspicuously in the visual field range in a case where a determination result in the second determination is affirmed.

In the process of controlling, the information may be displayed at a center part in the visual field range in a case where a determination result in the second determination is affirmed.

In the process of controlling, the information may be displayed inconspicuously in the visual field range in a case where a determination result in the second determination is negated.

In the process of controlling, the information may be displayed in a peripheral part in the visual field range in a case where a determination result in the second determination is negated.

In the process of controlling, machine learning of behavior of the user toward display of the information may be performed, and content of the information may be determined on the basis of its learning result.

The element may be an optical element irradiated with light for displaying the information, a process of detecting an incident position shift, which is a shift of an incident position of light entering the retina via the optical element according to a change in an orientation of the eyeball may be further included, and in the process of controlling, the display system may be further controlled on the basis of a detection result in the incident position shift detection system.

In the process of controlling, the display system may be controlled in such a manner that the incident position shift is corrected.

The element may be of an eyeball-worn type, the display method may further include a process of detecting a position shift between the eyeball and the element, and in the process of controlling, the display position and/or the display mode may be controlled on the basis of a detection result in the process of detecting a position shift.

In the process of controlling, a position where the information is displayed in the visual field range may be controlled in such a manner not to change before and after the position shift.

The display method may further include a process of detecting opening-closing of an eyelid corresponding to the eyeball, and in the process of controlling, display of the information may be controlled on the basis of a detection result in the process of detecting opening-closing.

The present technology provides also a display device including:

a display system configured to display information in a visual field range of a user by irradiating a retina of an eyeball with light using an element integrally provided on the eyeball of the user; and a control system configured to determine content of the information and, on the basis of its determination result, control a display position and/or a display mode of the information in the visual field range.

The present technology also provides a display method including:

a process of displaying information in a visual field range of a user by irradiating a retina of an eyeball with light using an element integrally provided on the eyeball of the user; and a process of determining content of the information and, on the basis of its determination result, controlling a display position and/or a display mode of the information in the visual field range.

BRIEF DESCRIPTION OF DRAWINGS

FIGS. 21A and 21C are views for explaining an operation example 1 of the display device of Example 2. FIG. 21B is a comparison reference view used for comparison with the operation example 1.

FIG. 24 is a flowchart for explaining display position/mode alteration necessity determination processing 2.

FIG. 33 is a flowchart for explaining display processing 5'.

FIGS. 38A and 38C are views for explaining an operation example 4 of the display device of Example 2. FIG. 38B is a comparison reference view used for comparison with the operation example 4.

MODE FOR CARRYING OUT THE INVENTION

Figures 1A, 1B, 1C:
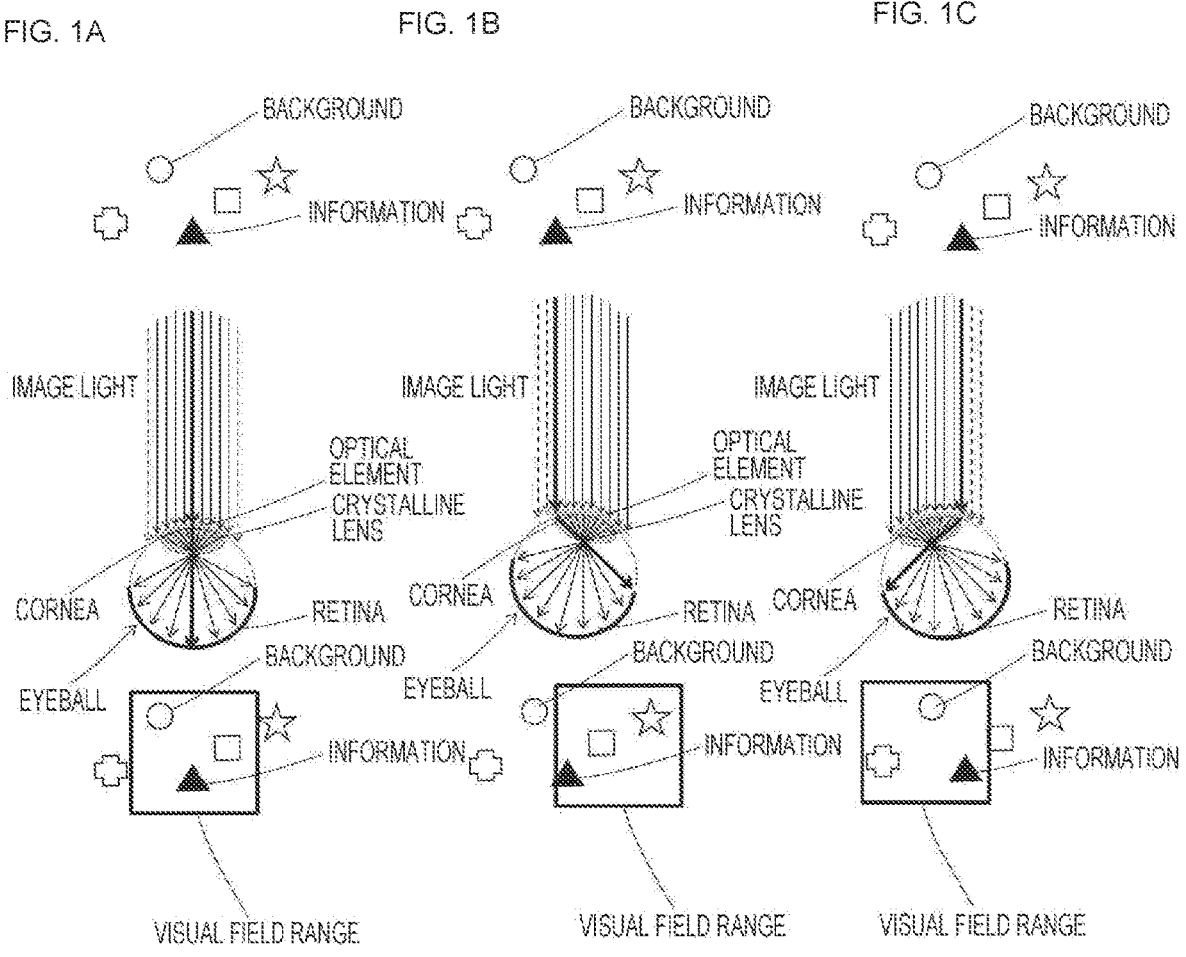
FIGS. 1A, 1B, and 1C are views for explaining a configuration and a defect of a display device of Comparative Example 1.

A preferred embodiment of the present technology will be described below in detail with reference to the accompanying drawings. Note that in the present description and drawings, configuration elements having substantially the same function configuration are given the same reference signs, and thus redundant description will be omitted. The embodiment described below presents a representative embodiment of the present technology, and the scope of the present technology is not narrowly interpreted by this. In the present description, even in a case where it is described that each of the display device and the display method according to the present technology exhibits a plurality of effects, each of the display device and the display method according to the present technology is only required to exhibit at least one effect. The effects described in the present description are merely examples and are not limited, and other effects may be present.

Furthermore, description will be given in the following order.

1. Introduction
2. Configuration of display device according to embodiment of present technology
3. Display processing 1
4. Display processing 2
5. Display processing 3
6. Display processing 4
7. Display processing 5
8. Effects of display device and display method according to embodiment of present technology 9. Modification of present technology 1. <Introduction>

In recent years, development of display devices configured to display information as a virtual image in a visual field range of a user has been actively carried out.

Some of such display devices use an element provided integrally with an eyeball of a user.

For example, by irradiating the retina of an eyeball of the user with image light projected from a projection unit through an optical element worn on the eyeball of a user, the display device of Comparative Example 1 illustrated in FIGS. 1A, 1B, and 1C display information as a virtual image in a visual field range of the user. This display device displays information at a constant position (fixedly) regardless of an orientation of the eyeball. In this case, in the display device of Comparative Example 1, when the eyeball of the user moves (when the visual field range changes), the position of the information in the visual field range of the user changes each time the eyeball moves. In this case, the user gets annoyed because the information appears and disappears inside the visual field range.

Figure 2A:
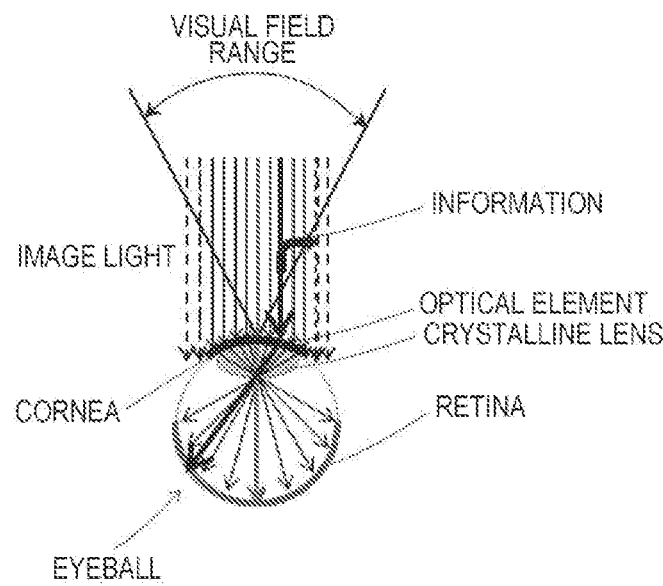
FIGS. 2A and 2B are views for explaining a configuration of a display device of Comparative Example 2.
Figure 2B:
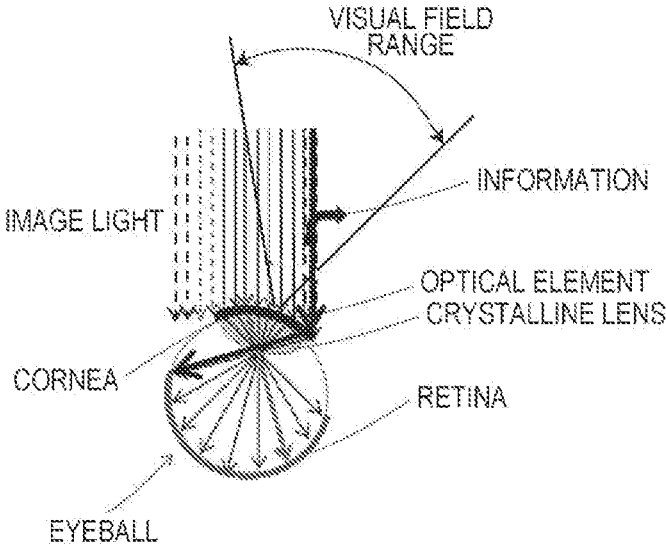

For example, by irradiating the retina of an eyeball of the user with image light projected from a projection unit through an optical element worn on the eyeball of a user, the display device of Comparative Example 2 illustrated in FIGS. 2A and 2B displays information as a virtual image in a visual field range of the user. This display device performs control in such a manner that a position where information is displayed in a visual field range becomes always substantially constant (for example, a peripheral part of the visual field range). That is, this display device performs display control in such a manner that information is always displayed at a constant position (for example, a peripheral part) in the visual field range even when the eyeball moves.

Figure 3A:
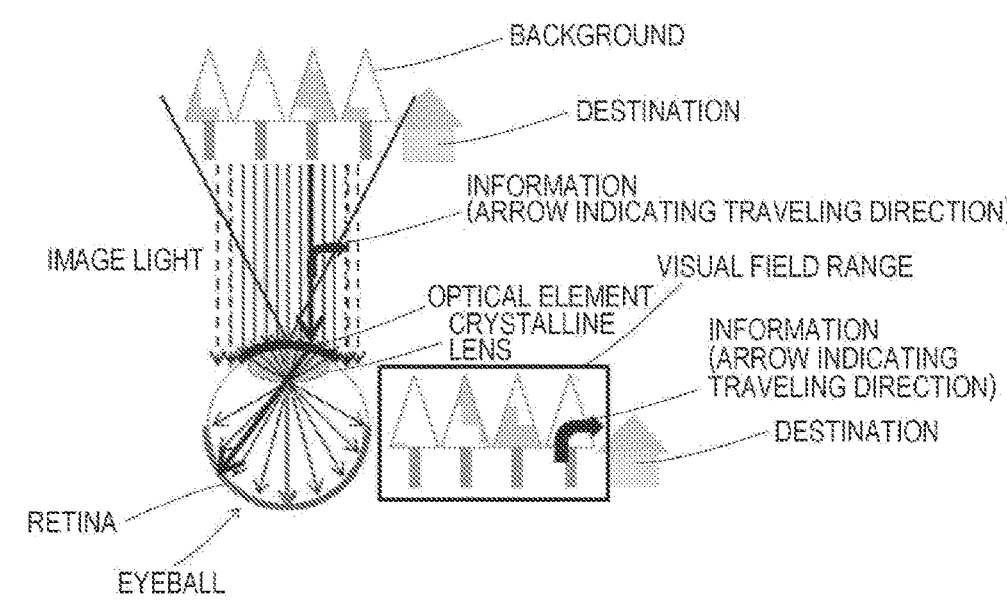
FIGS. 3A and 3B are views for explaining a defect in the display device of Comparative Example 2.
Figure 3B:
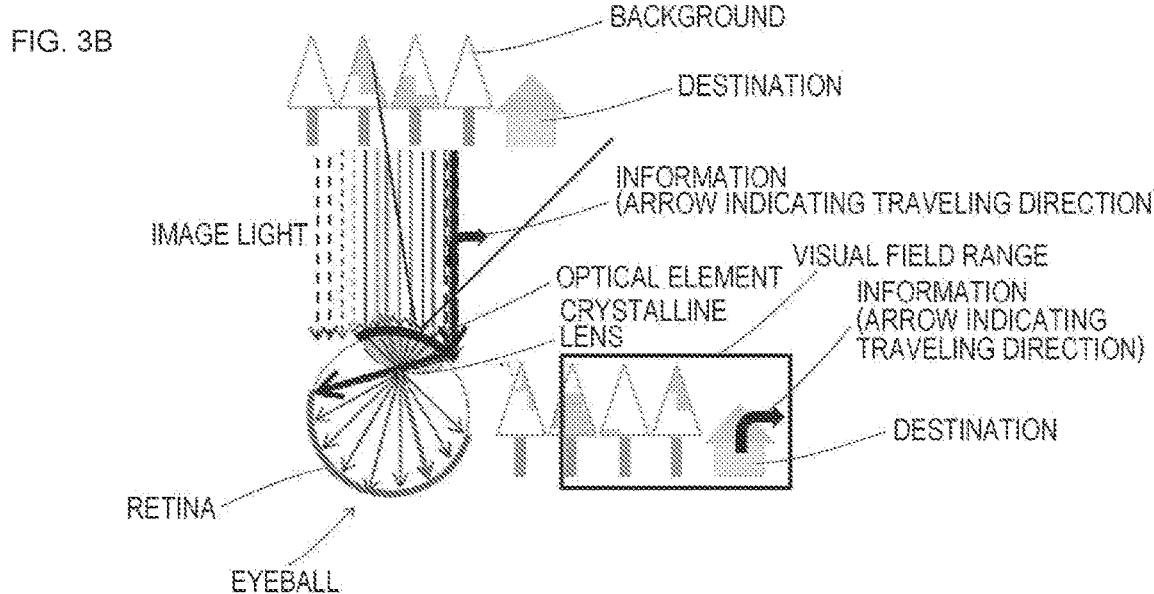

However, with the display device of Comparative Example 2, for example, as illustrated in FIG. 3A, when an arrow indicating a traveling direction to a destination is displayed as information in a peripheral part of a visual field range and the arrow points to the destination, for example, as illustrated in FIG. 3B, even if the user moves the eyeball toward the destination and the destination enters the peripheral part of the visual field range, the arrow is still displayed in the peripheral part of the visual field range, and therefore the arrow overlaps with the destination (the arrow points to somewhere else but the destination), which is inappropriate. Note that, in FIGS. 3A and 3B, in order to facilitate understanding, a view of a visual field range viewed from the horizontal direction is also illustrated in addition to a view of the visual field range viewed from above (the same shall apply to other figures).

Figure 4A:
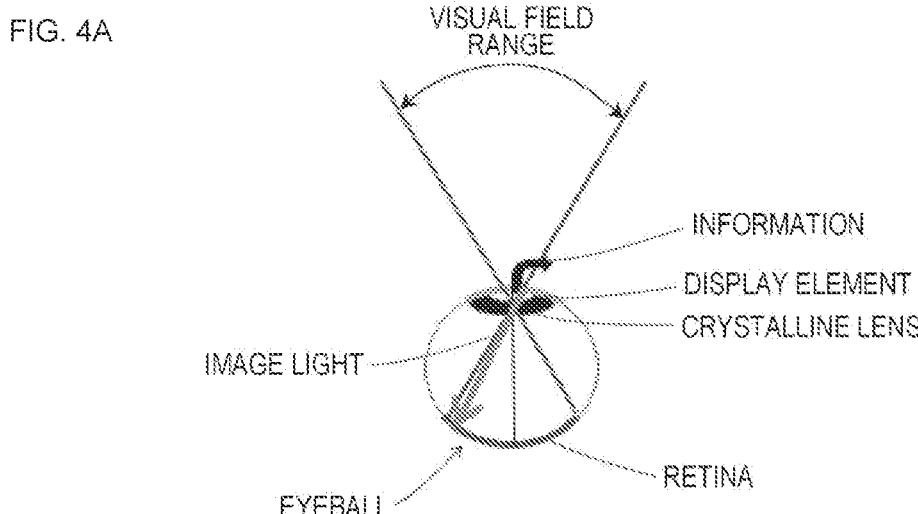
FIGS. 4A and 4B are views for explaining a configuration of a display device of Comparative Example 3.
Figure 4B:
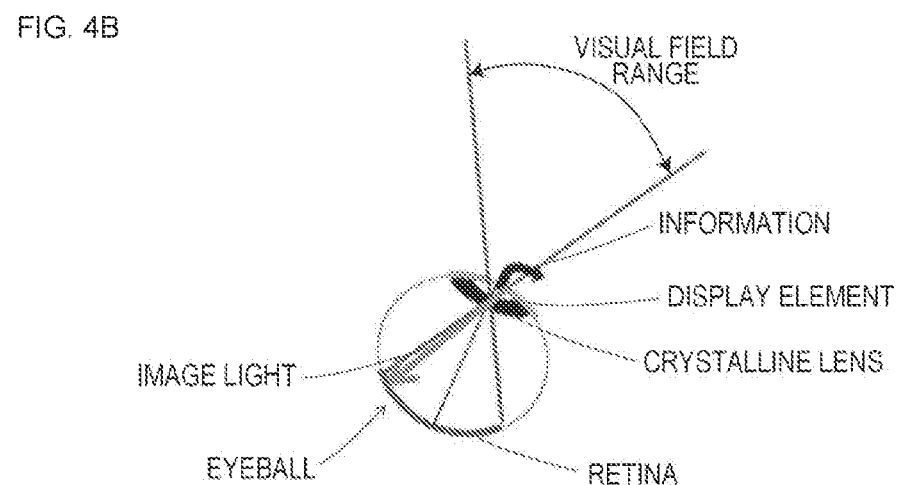

For example, by irradiating the retina of an eyeball of a user with image light from a display element worn on the eyeball, the display device of Comparative Example 3 illustrated in FIGS. 4A and 4B displays information as a virtual image in a visual field range of the user. With this display device, since the eyeball and the display element move integrally, information is always displayed at a substantially constant position (for example, a peripheral part of the visual field range) without special control is performed.

Figure 5A:
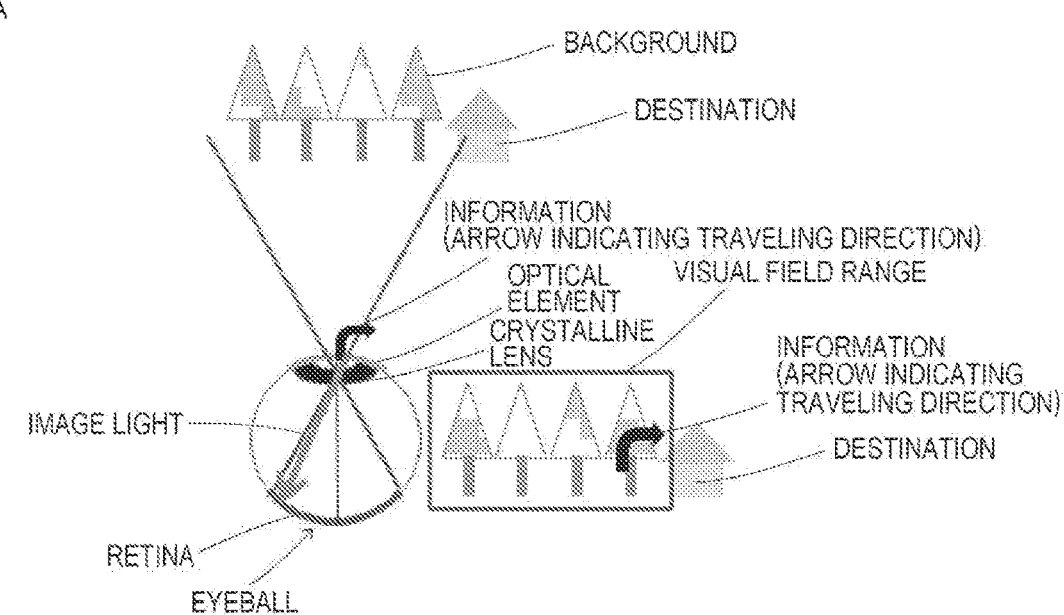
FIGS. 5A and 5B are views for explaining a defect in the display device of Comparative Example 3.
Figure 5B:
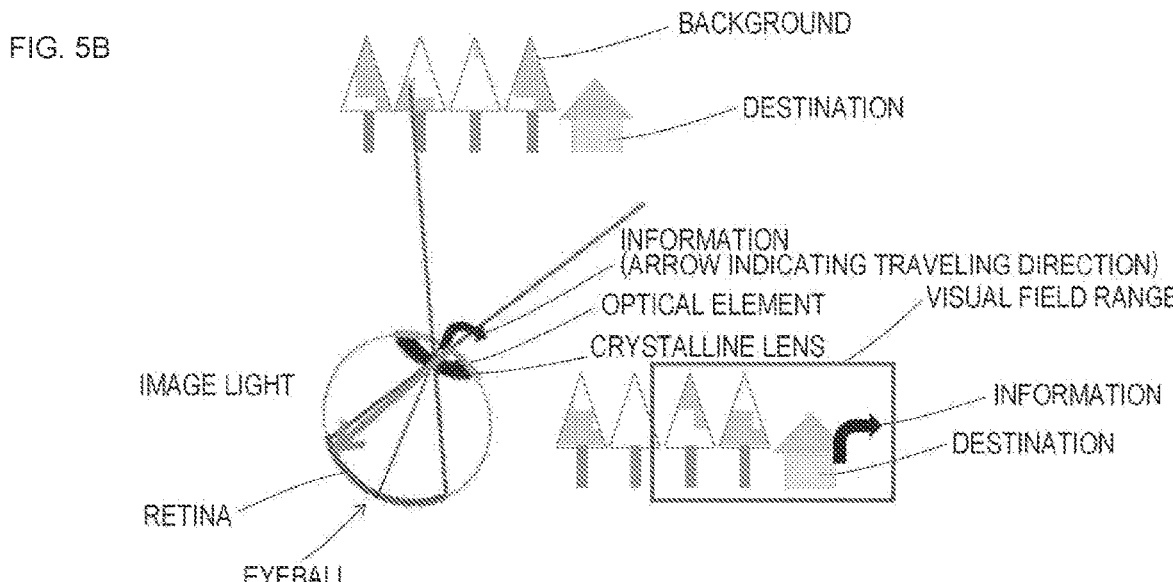

However, also with the display device of Comparative Example 3, for example, as illustrated in FIG. 5A, when an arrow indicating a traveling direction to a destination is displayed as information in a peripheral part of a visual field range and the arrow points to the destination, for example, as illustrated in FIG. 5B, even if the user moves the eyeball toward the destination and the destination enters the peripheral part of the visual field range, the arrow is still displayed in the peripheral part of the visual field range, and therefore the arrow overlaps with the destination (the arrow points to somewhere else but the destination), which is inappropriate.

As described above, in Comparative Examples 2 and 3, when the eyeball of the user moves, the display position and/or the display mode of the information in the visual field range can become inappropriate in relation to the destination.

Therefore, as a result of intensive studies, the inventor has developed a display device capable of displaying information at an appropriate position and/or mode in the visual field range even when the user's eyeball moves.

2. <Configuration of Display Device According to Embodiment of Present Technology>

Hereinafter, the configuration of a display device according to the embodiment of the present technology will be described with reference to FIGS. 6 to 10.

In the following description, a direction from the rear side to the front side of the face is defined as a forward direction, a direction from the front side to the rear side of the face is defined as a rearward direction, a direction from the upper side to the lower side of the face is defined as a downward direction, a direction from the lower side to the upper side of the face is defined as an upward direction, a direction from the left side to the right side of the face is defined as a rightward direction, and a direction from the right side to the left side of the face is defined as a leftward direction.

As illustrated in FIGS. 6 to 9, a display device 10 (10-1 to 10-4) according to the embodiment of the present technology includes a display system 100 (100-1 to 100-2), a detection system 200, and a control system 300. Moreover, the display device 10 can include an imaging system 400.

FIGS. 6 to 9 illustrate the configurations of the display systems 100-1 to 100-4, the detection system 200, and the imaging system 400 of the display devices 10-1 to 10-4 according to Examples 1 to 4 of the embodiment, respectively.

The display device 10 may be provided in such a manner to display information in the visual field range of an eyeball EB for each of the eyeballs EB of the user, or may be provided in such a manner to display information in the visual field range of the eyeball EB only for one of the eyeballs EB.

Figure 10:
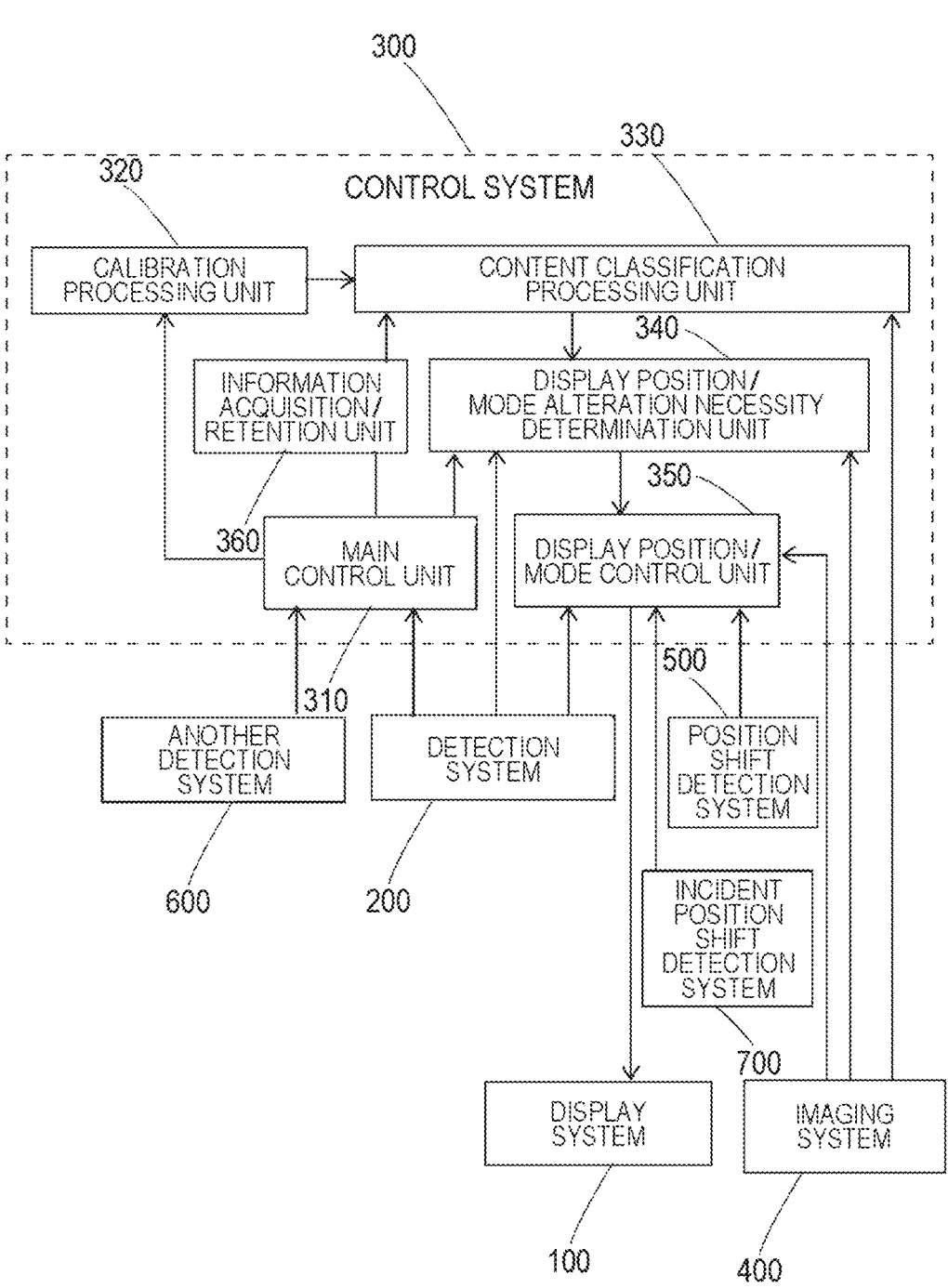
FIG. 10 is a block diagram illustrating an example of a function of a control system.

FIG. 10 illustrates a functional block diagram of the control system 300 of Examples 1 to 4 of the display device according to the embodiment.

The display device 10 (10-1 to 10-4) is a device that provides augmented reality (AR) by superimposing and displaying information as a virtual image on a front scene of the user.

The "information" can include, for example, characters, symbols, and figures.

The display system 100 (100-1 to 100-4) displays information in the visual field range of the user by irradiating a retina 1 of the eyeball EB with light using an element 110 (110-1 to 110-4) integrally provided in the eyeball EB of the user.

The detection system 200 detects a change in the orientation and/or the position of the eyeball EB.

The control system 300 controls the display position and/or the display mode of the information in the visual field range on the basis of the detection result of the detection system 200.

By controlling the display system 100, the control system 300 controls the display position and/or the display mode of information in the visual field range. The control system 300 will be described in detail later.

The "display position" is a position at which information is displayed in the visual field range.

The "display mode" is a mode (for example, size, shape, color, density, and the like of information) in which information is displayed in the visual field range.

The display system 100, the detection system 200, the control system 300, and the imaging system 400 may be integrally provided via a common support structure (for example, a glasses frame GF, but it is only partially illustrated in FIGS. 6 to 9), or at least one of them may be separately provided. For example, the control system 300 may be provided separately from the other systems and connected to the other systems wirelessly or by wire.

Display Device of Example 1

Figure 6:
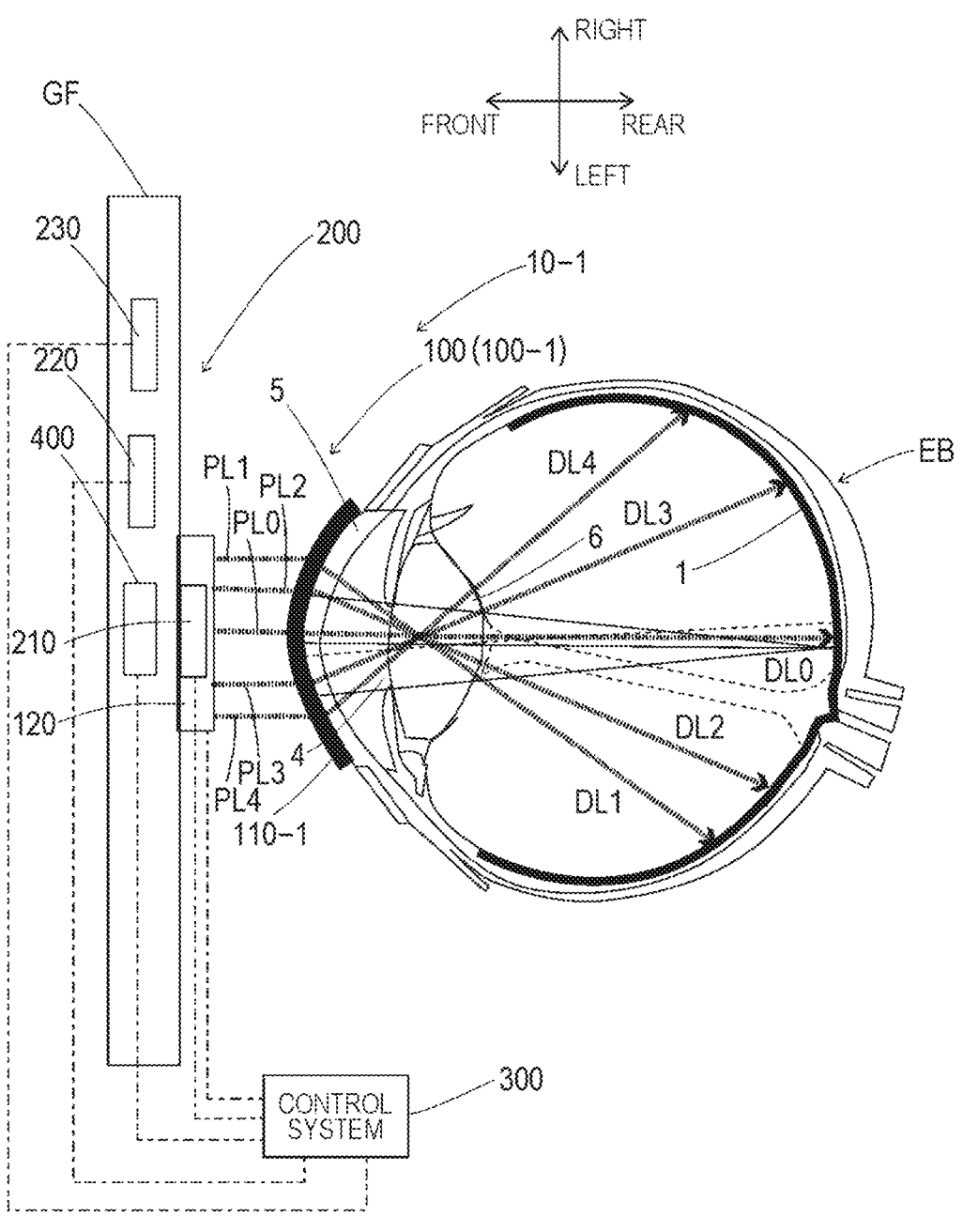
FIG. 6 is a view illustrating a configuration of a display device according to Example 1 of an embodiment.

As illustrated in FIG. 6, in the display device 10-1 of Example 1, the element 110-1 of the display system 100-1 is of an eyeball-worn type.

The element 110-1 is an optical element (for example, a lens). This optical element is also referred to as "optical element 110-1".

The optical element 110-1 is, for example, of a contact lens type, and is worn to a cornea 5 of the eyeball EB. In a state where the optical element 110-1 is worn to the eyeball EB of the user, ambient light (for example, natural light such as sunlight, artificial light such as illumination light, and the same shall apply hereafter) transmits the optical element 110-1 and enters the retina 1 of the eyeball EB, and therefore the user can visually recognize the real landscape through the optical element 110-1.

The display system 100-1 includes a projection unit 120 that projects light (image light) for displaying information onto the optical element 110-1.

The projection unit 120 is provided on the glasses frame GF in such a manner to oppose the optical element 110-1 worn to the eyeball EB, for example, when the glasses frame GF is worn to the head of the user.

For example, it is preferable that projection unit 120 is disposed at a position where the front view of the user is not obstructed, or each configuration element includes a transparent material as much as possible.

As an example, the projection unit 120 includes a light-emitting unit array in which a plurality of light-emitting units (for example, organic light-emitting diodes (OLED), light-emitting diodes (LED), or surface-emitting lasers (VC-SEL)) is two-dimensionally arrayed, a collimating lens that converts each of a plurality of beams of light from the light-emitting unit array into a beam of substantially parallel light, and a lighting control unit that performs lighting control of the light-emitting unit array on the basis of image data of information to be displayed.

As an example, the optical element 110-1 has a refractive index distribution where the incident light is largely refracted inward from the center part toward the peripheral part.

For example, in a state where the optical element 110-1 worn on the eyeball EB faces the projection unit 120, projection light PL0 emitted from the center position of the projection unit 120 enters the center part of the optical element 110-1, travels straight in the eyeball EB as it is, and enters the retina 1 as display light DL0.

For example, in a state where the optical element 110-1 worn on the eyeball EB faces the projection unit 120, projection light PL1 emitted from the right end position of the projection unit 120 enters the right end part of the optical element 110-1, is greatly refracted leftward at the right end part, travels in the eyeball EB, and enters the left side part of the retina 1 as display light DLL For example, in a state where the optical element 110-1 worn on the eyeball EB faces the projection unit 120, projection light PL2 emitted from a position between the right end position and the center position of the projection unit 120 enters a part between the right end part and the center part of the optical element 110-1, is refracted leftward by the part, travels in the eyeball EB, and enters a position between the incident position of the display light DL0 and the incident position of the display light DL1 on the retina 1 as display light DL2.

For example, in a state where the optical element 110-1 worn on the eyeball EB faces the projection unit 120, projection light PL4 emitted from the left end position of the projection unit 120 enters the left end part of the optical element 110-1, is greatly refracted rightward at the left end part, travels in the eyeball EB, and enters the right side part of the retina 1 as display light DL4.

For example, in a state where the optical element 110-1 worn on the eyeball EB faces the projection unit 120, projection light PL3 emitted from a position between the left end position and the center position of the projection unit 120 enters a part between the left end part and the center part of the optical element 110-1, is refracted rightward in the part, travels in the eyeball EB, and enters a position between the incident position of the display light DL0 and the incident position of the display light DL4 in the retina 1 as display light DL3.

As seen from FIG. 6, the optical element 110-1 refracts a plurality of beams of projection light including the projection lights PL0 to PL4 from the projection unit 120 in such a manner that the plurality of beams of projection light intersects at one point (for example, at one point in a crystalline lens 6) after passing through a pupil 4.

The detection system 200 can include an eyeball sensor 210 configured to detect the orientation of the eyeball EB.

As an example, the eyeball sensor 210 is provided in the glasses frame GF in such a manner to oppose the eyeball EB of the user when the user wears the glasses frame GF on the head.

The eyeball sensor 210 includes, for example, a light-source unit configured to irradiate the eyeball EB with light (for example, infrared light) and a light-receiving unit that has a plurality of light-receiving regions configured to receive reflected light from the eyeball EB.

For example, a four-split photodetector (PD) in which four PDs are two-dimensionally arrayed can be used as the plurality of light-receiving regions of the light-receiving unit.

The eyeball sensor 210 can detect the orientation of the eyeball EB by comparing the light-receiving amount at each PD when the light emitted from the light-source unit and reflected by the eyeball EB is received by the four PDs.

The detection system 200 can also include a head sensor 220 configured to detect the orientation of the user's head.

As the head sensor 220, for example, a gyro sensor can be used.

The detection system 200 can also include a movement detection sensor 230 configured to detect the movement of the user.

Here, the "movement of the user" includes a case where the user moves on a moving object (for example, a vehicle, an aircraft, a ship, and the like) in addition to a case where the user moves by himself/herself (for example, walking, running, and the like).

As the movement detection sensor 230, for example, a speed sensor, an acceleration sensor, a GPS sensor, a geomagnetic sensor, or the like can be used.

The imaging system 400 includes, for example, an imaging element provided in the glasses frame GF, and images at least front scene of the user.

The imaging element can image at least the visual field range of the eyeball EB of the user.

The display device 10-1 can further include a position shift detection system 500 (see FIG. 10) configured to detect position shift between the eyeball EB and the element 110-1.

The position shift detection system 500 may detect the position shift from an imaging result (imaged image) in the imaging system 400, for example.

Using the eyeball sensor 210, the position shift detection system 500 may detect the position shift by comparing the light-receiving amount of the reflected light from the surface of the optical element 110-1 with the light-receiving amount of the reflected light from the eyeball EB. In this case, the reflected light from the eyeball EB may be any of the reflected light from the fundus of the eye, the reflected light from the white of the eye, the reflected light from the pupil of the eye, and the reflected light from the iris.

The position shift detection system 500 may mark the optical element 110-1, detect the shift between the reflected light from the mark and the reflected light from the eyeball EB using the eyeball sensor 210, and detect the shift between the optical element 110-1 and the eyeball EB.

The control system 300 further controls the display system 100-1 on the basis of the detection result of the position shift detection system 500.

At this time, the control system 300 preferably performs control in such a manner that the position where the information is displayed in the visual field range does not change before and after the position shift.

The display device 10-1 can further include another detection system 600 (see FIG. 10) configured to detect opening-closing of the eyelid corresponding to the eyeball EB.

The another detection system 600 may detect opening-closing of the eyelid using a detection result of the eyeball sensor 210, for example.

The another detection system 600 may detect opening-closing of the eyelid using an imaging result of the imaging system 400, for example. In this case, the imaging system 400 may include an imaging element configured to image a front scene of the user and an imaging element configured to image opening-closing of the eyelid of the user, or may include an imaging element that can perform omnidirectional imaging.

The control system 300 may control the display system 100-1 on the basis of a detection result in the another detection system 600.

As described above, the display device 10-1 causes the light (image light) projected from the projection unit 120 to enter the retina 1 via the optical element 110-1. For this reason, there is a possibility that the incident position of light (for example, light at the center of image light) supposed to enter the center of the retina 1 in the optical design shifts (offsets) from the center of the retina 1 along with a change in the orientation of the eyeball EB. In this case, the entire image light irradiated to the retina 1 shifts from the position in the optical design.

Therefore, the display device 10-1 can further include an incident position shift detection system 700 configured to detect an incident position shift, which is a shift of the incident position of the light entering the retina 1 via the optical element 110-1 according to the change in the orientation of the eyeball EB.

The control system 300 may further control the display system 100 on the basis of a detection result in the incident position shift detection system 700.

At this time, the control system 300 preferably controls the display system 100 in such a manner that the incident position shift is corrected (suppressed).

For example, in a case where no position shift between the eyeball EB and the optical element 110-1 has occurred (distinguishable by the detection result in the position shift detection system 500), the incident position shift is determined by characteristics (physical properties and design) of the optical element 110-1 and a rotation amount of the eyeball EB (that can be acquired from the detection result in the eyeball sensor 210).

In this case, the control system 300 can correct the incident position shift by controlling the display system 100 on the basis of the characteristics of the optical element 110-1 and the detection result of the eyeball sensor 210.

For example, in a case where position shift between the eyeball EB and the optical element 110-1 has occurred (distinguishable by the detection result in the position shift detection system 500), the incident position shift is determined by characteristics (physical properties and design) of the optical element 110-1, the rotation amount of the eyeball EB, and position shift information (acquirable from the detection result in the position shift detection system 500) between the eyeball EB and the optical element 110-1.

In this case, the control system 300 can correct the incident position shift by controlling the display system 100 on the basis of the characteristics of the optical element 110-1, the detection result in the eyeball sensor 210, and the detection result in the position shift detection system 500.

The basic principle of the incident position shift will be described below.

The eyeball functions as an optical system mainly including a crystalline lens when a human sees an object. Therefore, in a state where the eyeball faces straight forward, the beam of light incident from the optical axis of the eyeball forms an image in the fovea centralis as it is, which is a retinal position on the optical axis, and the beam of light in the peripheral visual field forms an image around the retina. Furthermore, in a case where the eyeball rotates, the entire optical system of the eyeball rotates, and therefore the relationship of image formation by the eyeball is maintained.

In general, in a case where light is bent by diffraction or refraction in an optical element, a diffraction angle or a refraction angle with respect to an incident angle is determined by characteristics (physical properties and design) of the optical element.

Figures 39A, 39B:
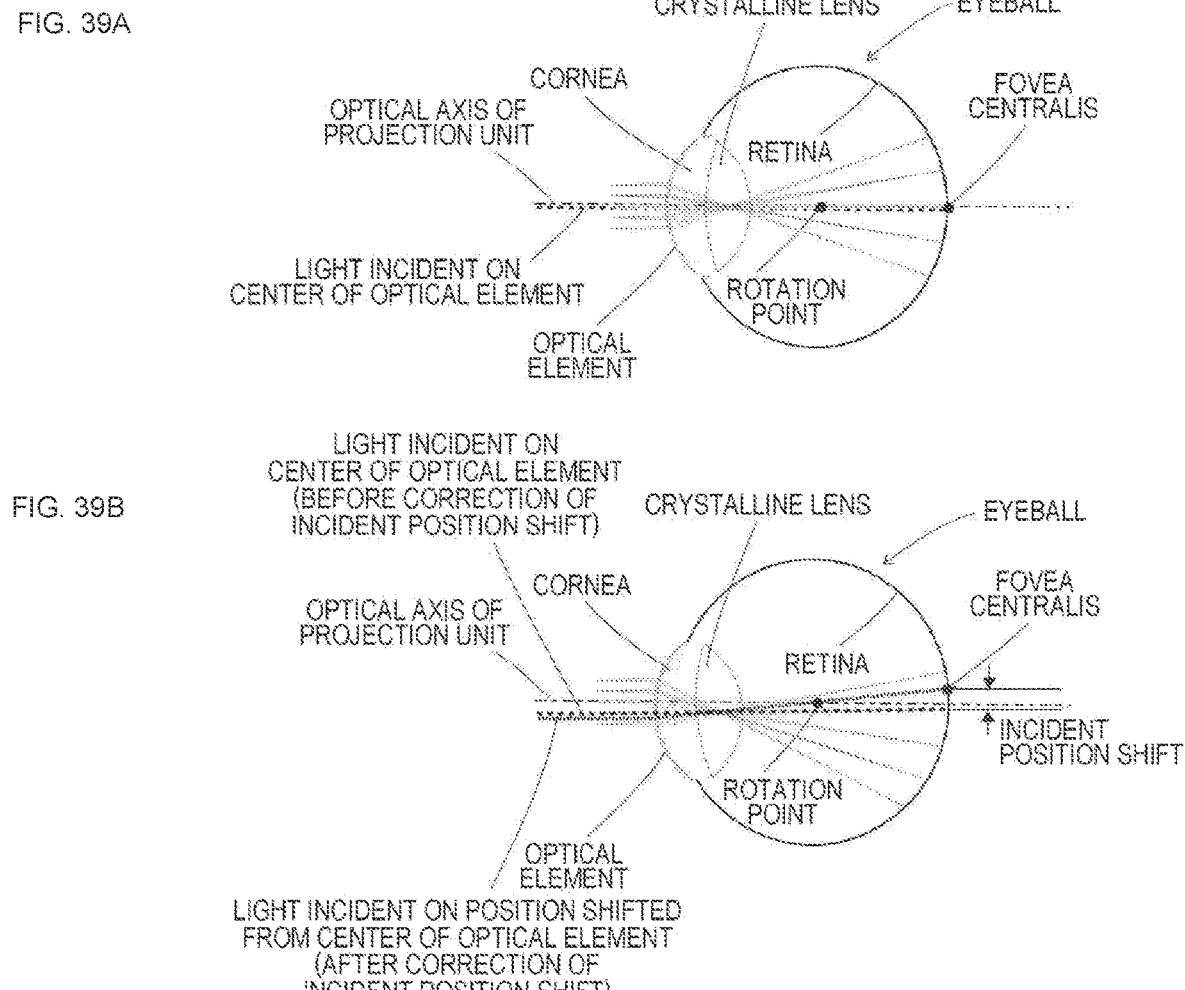
FIGS. 39A and 39B are views for explaining incident position shift.

In a case of the configuration in which light is projected onto the optical element worn on the eyeball, as illustrated in FIGS. 39A and 39B, an optical system having an optical axis different from that of the eyeball is added. Hereinafter, a case where light is projected onto the optical element from a direction in which the projection unit is fixed will be described as an example.

For example, as illustrated in FIG. 39A, in a case where the optical axis of the optical element and the optical axis of the projection unit are substantially parallel in a state where the eyeball wearing the optical element faces straight forward, light (for example, light at the center of image light) projected from the projection unit and incident on the center of the optical element travels along the optical axis of the optical element, passes through the rotation point (center of rotation of the eyeball), and enters (forms an image onto) the fovea centralis.

For example, as illustrated in FIG. 39B, in a case where the eyeball wearing the optical element has rotated from the state illustrated in FIG. 39A, the optical axis of the optical element and the optical axis of the projection unit form an angle, and therefore light projected from the projection unit and incident on the center of the optical element is refracted by the optical element and enters (forms an image onto) a retinal position shifted from the fovea centralis. This shift of the incident position from the fovea centralis is the incident position shift.

Therefore, it is preferable to detect the rotation amount of the eyeball by eye sensing using the eyeball sensor 210, and, according to the detection result, adjust (for example, shifts the incident position from the center of the optical element) the incident position of the light (for example, the center of image light) incident on the optical element in the state of FIG. 39A.

By adjusting the incident position of the light (for example, the light at the center of image light) on the optical element in this manner, the light can be refracted by the optical element and can enter (form an image onto) the fovea centralis (see FIG. 39B). That is, the incident position shift can be corrected.

At this time, in a case where magnification also changes, it is preferable to adjust not only the incident position but also the size of the light onto the optical element.

Hereinafter, the display devices 10-2, 10-3, and 10-4 of Example 2 to 4 will be described, but elements having the same configurations and functions as those of Example 1 are denoted by the same reference signs, and description thereof will be omitted.

Display Device of Example 2

Figure 7:
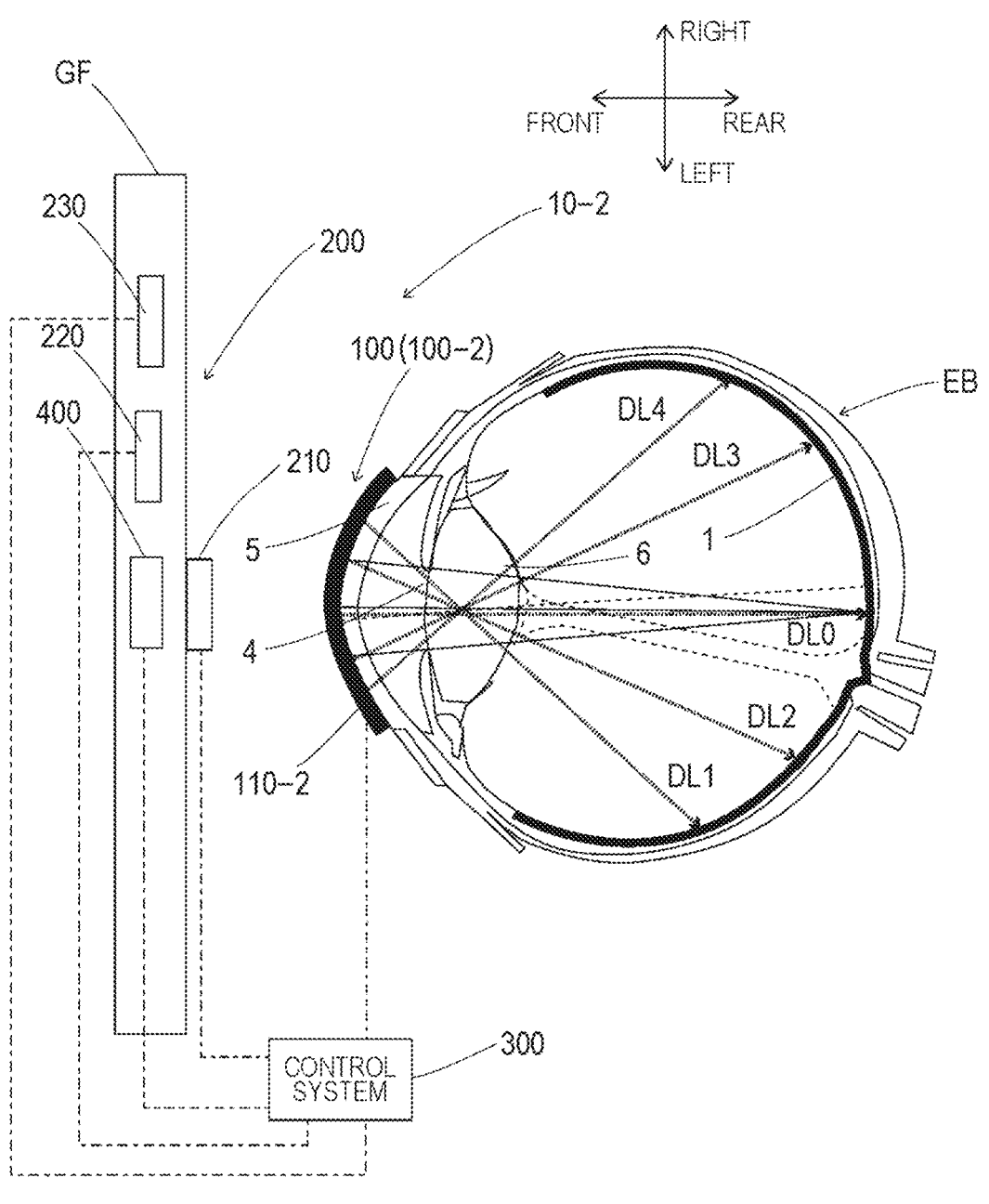
FIG. 7 is a view illustrating a configuration of a display device according to Example 2 of the embodiment.

As illustrated in FIG. 7, in the display device 10-2 of Example 2, the element 110-2 of the display system 100-2 is of an eyeball-worn type.

The element 110-2 is a display element. This display element is also referred to as "display element 110-2".

The display element 110-2 is, for example, of a contact lens type, and is worn to a cornea 5 of the eyeball EB.

The display element 110-2 includes a pixel array including a plurality of two-dimensionally or three-dimensionally arrayed pixels. Here, the "three-dimensional array" assumes a case where the display elements 110-2 are curved and substantially three-dimensionally arrayed at the time of use (when worn to the eyeball) even if they are two-dimensionally arrayed (arrayed in a planar manner) at the time of non-use, for example (the same shall apply hereafter).

Each pixel includes a light-emitting unit such as an organic light-emitting diode (OLED), a light-emitting diode (LED), or a surface-emitting laser (VCSEL). The pixel array may be referred to as light-emitting unit array.

In the pixel array, for example, pixels are driven (lit) on the basis of image information, and display light for displaying an image corresponding to the image information is emitted.

As an example, the display element 110-2 includes a transmission part that transmits at least part of light (for example, visible light) having a specific wavelength and a light shielding part that shields the light. Therefore, in a state where the display element 110-2 is worn to the eyeball EB of the user, ambient light transmits the display element 110-2 and enters the retina 1 of the eyeball EB, and therefore the user can visually recognize the real landscape through the display element 110-2.

The display element 110-2 is a light-emitting display element as an example, but may be configured to include a liquid crystal display unit and a light source configured to irradiate the liquid crystal display unit with light.

For example, in a state where the display element 110-2 worn on the eyeball EB faces the eyeball sensor 210, the display light DL0 emitted from the light-emitting unit at the center position of the display element 110-2 travels straight in the eyeball EB as it is and enters the center part of the retina 1.

For example, in a state where the display element 110-2 worn on the eyeball EB faces the eyeball sensor 210, the display light DL1 emitted from the light-emitting unit at the right end position of the display element 110-2 travels leftward in the eyeball EB and enters the left side part of the retina 1.

For example, in a state where the display element 110-2 worn on the eyeball EB faces the eyeball sensor 210, the display light DL2 emitted from the light-emitting unit at a position between the center position and the right end position of the display element 110-2 travels leftward in the eyeball EB, and enters a position between the incident position of the display light DL0 and the incident position of the display light DL1 in the retina 1.

For example, in a state where the display element 110-2 worn on the eyeball EB faces the eyeball sensor 210, the display light DL4 emitted from the light-emitting unit at the left end position of the display element 110-2 travels rightward in the eyeball EB and enters the right side part of the retina 1.

For example, in a state where the display element 110-2 worn on the eyeball EB faces the eyeball sensor 210, the display light DL3 emitted from the light-emitting unit at a position between the center position and the left end position of the display element 110-2 travels rightward in the eyeball EB and enters a position between the incident position of the display light DL0 and the incident position of the display light DL4 in the retina 1.

As seen from FIG. 7, the display element 110-2 emits a plurality of beams of display light including the display lights DL0 to DL4 in such a manner that the plurality of beams of display light intersects at one point (for example, at one point in the crystalline lens 6) after passing through the pupil 4.

Display Device of Example 3

Figure 8:
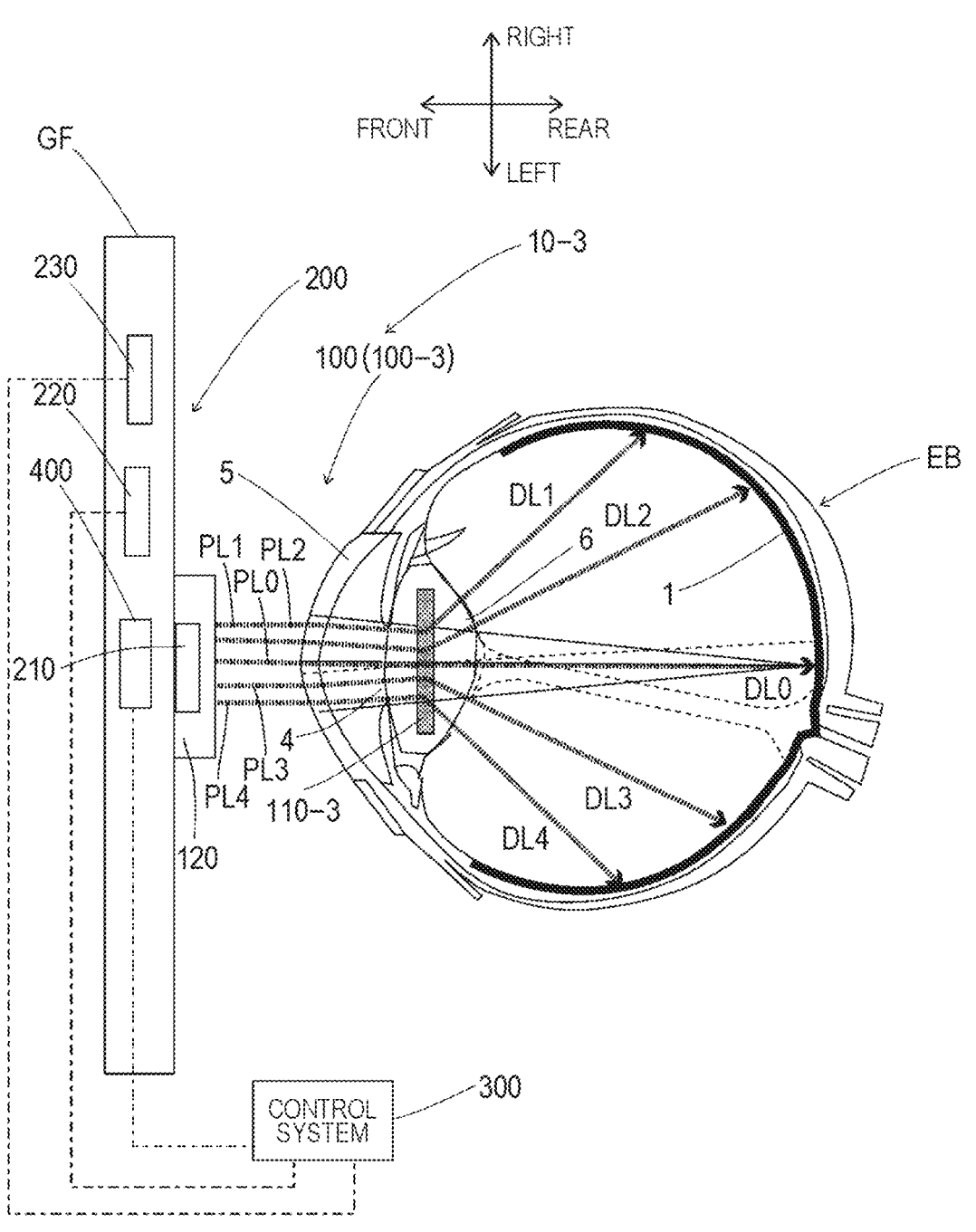
FIG. 8 is a view illustrating a configuration of a display device according to Example 3 of the embodiment.

As illustrated in FIG. 8, in the display device 10-3 of Example 3, the element 110-3 of the display system 100-3 is of an eyeball-embedded type.

The element 110-3 is an optical element (for example, a lens). This optical element is also referred to as "optical element 110-3".

The optical element 110-3 is, for example, of an intraocular lens type, and is embedded in the crystalline lens 6 of the eyeball EB. The ambient light entering the eyeball EB of the user transmits the optical element 110-3 and enters the retina 1, and therefore the user can visually recognize the real landscape through the optical element 110-3.

The display system 100-3 includes a projection unit 120 that projects light (image light) for displaying information onto the optical element 110-3.

As an example, the optical element 110-3 has a refractive index distribution where the incident light is largely refracted outward from the center part toward the peripheral part.

For example, in a state where the optical element 110-3 embedded in the eyeball EB faces the projection unit 120, the projection light PL0 emitted from the center position of the projection unit 120 enters the center part of the optical element 110-3, travels straight in the eyeball EB as it is, and enters the retina 1 as the display light DL0.

For example, in a state where the optical element 110-3 embedded in the eyeball EB faces the projection unit 120, the projection light PL1 emitted from the right end position of the projection unit 120 enters the right end part of the optical element 110-3, is greatly refracted rightward at the right end part, travels in the eyeball EB, and enters the right side part of the retina 1 as the display light DL1.

For example, in a state where the optical element 110-3 embedded in the eyeball EB faces the projection unit 120, the projection light PL2 emitted from a position between the right end position and the center position of the projection unit 120 enters a part between the right end part and the center part of the optical element 110-3, is refracted rightward by the part, travels in the eyeball EB, and enters a position between the incident position of the display light DL0 and the incident position of the display light DL1 on the retina 1 as the display light DL2.

For example, in a state where the optical element 110-3 embedded in the eyeball EB faces the projection unit 120, the projection light PL4 emitted from the left end position of the projection unit 120 enters the left end part of the optical element 110-3, is greatly refracted leftward at the left end part, travels in the eyeball EB, and enters the left side part of the retina 1 as the display light DL4.

For example, in a state where the optical element 110-3 embedded in the eyeball EB faces the projection unit 120, the projection light PL3 emitted from a position between the left end position and the center position of the projection unit 120 enters a part between the left end part and the center part of the optical element 110-3, is refracted leftward in the part, travels in the eyeball EB, and enters a position between the incident position of the display light DL0 and the incident position of the display light DL4 in the retina 1 as the display light DL3.

Display Device of Example 4

Figure 9:
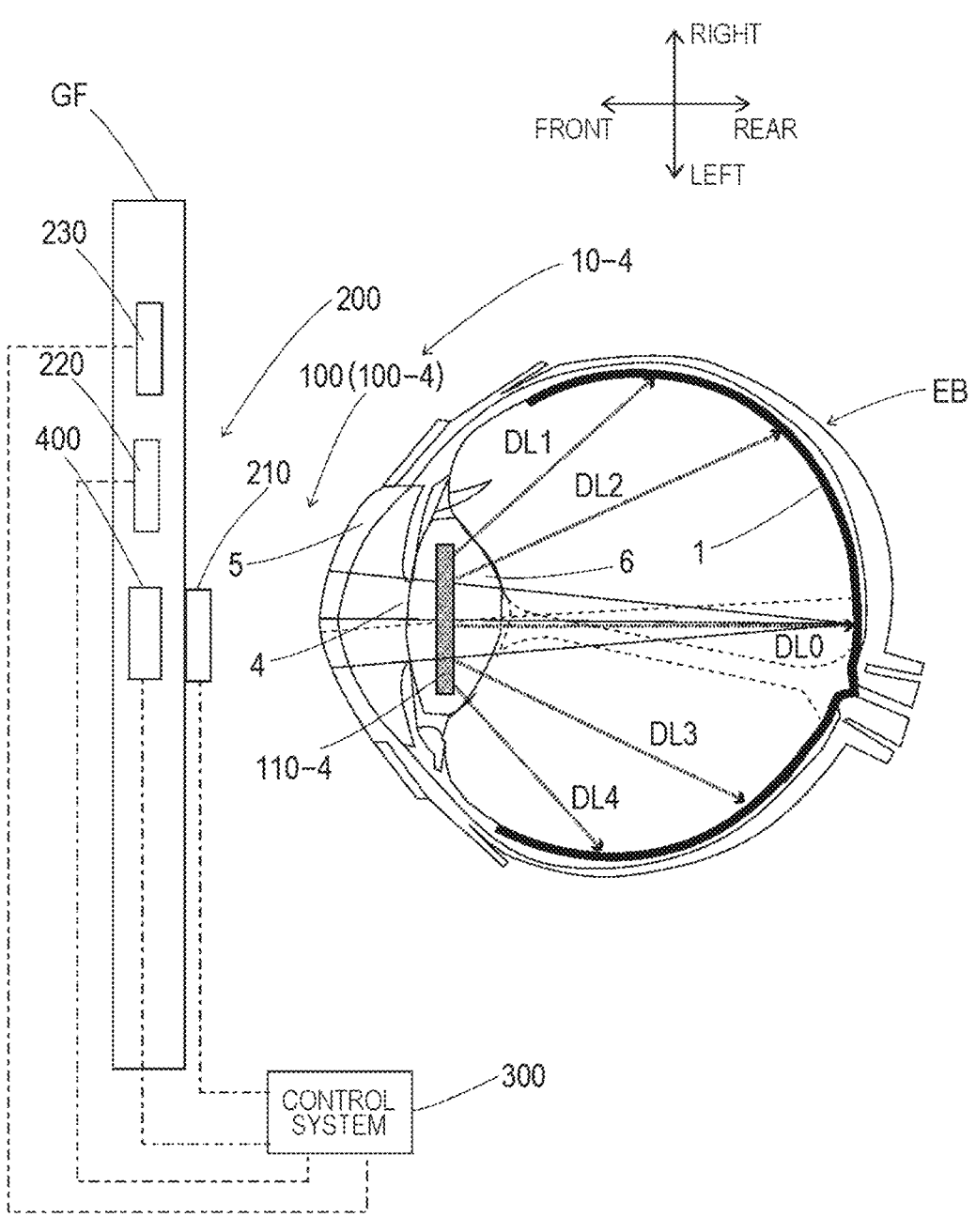
FIG. 9 is a view illustrating a configuration of a display device according to Example 4 of the embodiment.

As illustrated in FIG. 9, in the display device 10-4 of Example 4, the element 110-4 of the display system 100-4 is of an eyeball-embedded type.

The element 110-4 is a display element. This display element is also referred to as "display element 110-4".

The display element 110-4 is, for example, of an intraocular lens type, and is embedded in the crystalline lens 6 of the eyeball EB.

As an example, the display element 110-4 includes a transmission part that transmits at least part of light (for example, visible light) having a specific wavelength and a light shielding part that shields the light. Therefore, even if the display element 110-4 is embedded in the eyeball EB of the user, the ambient light entering the eyeball EB of the user transmits the display element 110-4 and enters the retina 1, and therefore the user can visually recognize the real landscape through the display element 110-4.

The display element 110-4 is a light-emitting display element as an example, but may be configured to include a liquid crystal display unit and a light source configured to irradiate the liquid crystal display unit with light.

For example, in a state where the display element 110-4 embedded in the eyeball EB faces the eyeball sensor 210, the display light DL0 emitted from the light-emitting unit at the center position of the display element 110-4 travels straight in the eyeball EB as it is and enters the center part of the retina 1.

For example, in a state where the display element 110-4 embedded in the eyeball EB faces the eyeball sensor 210, the display light DL1 emitted from the light-emitting unit at the right end position of the display element 110-4 travels rightward in the eyeball EB and enters the right side part of the retina 1.

For example, in a state where the display element 110-4 embedded in the eyeball EB faces the eyeball sensor 210, the display light DL2 emitted from the light-emitting unit at a position between the center position and the right end position of the display element 110-4 travels rightward in the eyeball EB, and enters a position between the incident position of the display light DL0 and the incident position of the display light DL1 in the retina 1.

For example, in a state where the display element 110-4 embedded in the eyeball EB faces the eyeball sensor 210, the display light DL4 emitted from the light-emitting unit at the left end position of the display element 110-4 travels leftward in the eyeball EB and enters the left side part of the retina 1.

For example, in a state where the display element 110-4 embedded in the eyeball EB faces the eyeball sensor 210, the display light DL3 emitted from the light-emitting unit at a position between the center position and the left end position of the display element 110-4 travels leftward in the eyeball EB and enters a position between the incident position of the display light DL0 and the incident position of the display light DL4 in the retina 1.

The configuration of the display device 10 according to the embodiment of the present technology is not limited to the configurations of the display devices 10-1 to 10-4 of Examples 1 to 4, and can be altered as appropriate.

(Control System)

Hereinafter, the control system 300 will be described with reference to FIGS. 10 to 13.

As illustrated in FIG. 10 as an example, the control system 300 is configured to include a main control unit 310, a calibration processing unit 320, a content classification processing unit 330, a display position/mode alteration necessity determination unit 340, a display position/mode control unit 350, and an information acquisition/retention unit 360.

The control system 300 is implemented by hardware including, for example, a CPU and a chip set.

The main control unit 310 integrally controls each configuration unit.

[Calibration Processing Unit]

The calibration processing unit 320 performs calibration processing using the display system 100 and the detection system 200 in accordance with an instruction from the main control unit 310. Specifically, when the user wears the glasses frame GF and the display device 10 is turned on, the calibration processing unit 320 drives the display system 100 to perform initial adjustment in such a manner that the display system 100 irradiates the eyeball EB of the user with image light.

Note that when the user wears the glasses frame GF on the head, the eyeball sensor 210 opposes the eyeball EB of the user. Therefore, the calibration processing unit 320 can detect, from a detection result of the eyeball sensor 210, that the user is wearing the glasses frame GF.

[Information Acquisition/Retention Unit]

The information acquisition/retention unit 360 acquires and/or retains information (also referred to as "display information") to be displayed in the visual field range of the user.

Specifically, the information acquisition/retention unit 360 acquires as needed, retains, and, as necessary, updates information from the network by wireless communication with a communication terminal such as a smartphone, a tablet, or a flip phone.

For example, when the user inputs a destination in a navigation app activated on the communication terminal, the information acquisition/retention unit 360 acquires, retains, and, as necessary, updates navigation information (for example, an arrow indicating a traveling direction) indicating a route from a departure point to the destination.

For example, the information acquisition/retention unit 360 acquires as needed, retains, and, as necessary, updates weather information (weather forecast, earthquake information, tsunami information, lightning information, torrential rain information, and the like), fire information, and the like from a weather information app activated on the communication terminal by the user.

For example, the information acquisition/retention unit 360 acquires as needed, retains, and, as necessary, updates information (for example, heart rate, blood pressure, body temperature, pulse, and the like) from a biological sensor worn on the user.

For example, the information acquisition/retention unit 360 acquires, retains, and, as necessary schedule information (what to do at what time and where) of the user in a schedule management app activated on the communication terminal by the user.

The information acquisition/retention unit 360 may store and retain predetermined display information in advance.

The information acquisition/retention unit 360 is implemented by, for example, a storage medium such as a memory or a hard disk.

[Content Classification Processing Unit]

The content classification processing unit 330 classifies the content of the information acquired and/or retained by the information acquisition/retention unit 360, and outputs a classification result.

Figure 11:
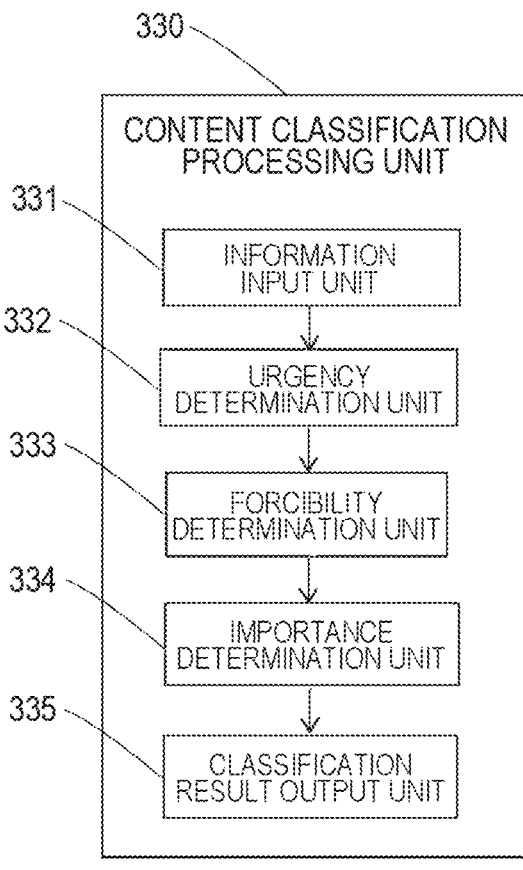
FIG. 11 is a block diagram illustrating a function of a content classification processing unit.

As illustrated in FIG. 11 as an example, the content classification processing unit 330 includes an information input unit 331, an urgency determination unit 332, a forcibility determination unit 333, an importance determination unit 334, and a classification result output unit 335.

The information input unit 331 inputs information acquired and/or retained by the information acquisition/retention unit 360.

The urgency determination unit 332 determines whether or not the information input to the information input unit 331 has a nature of urgent notification (whether or not to be urgent notification information).

The forcibility determination unit 333 determines whether or not the information input to the information input unit 331 has a nature of forcible notification (whether or not to be forcible notification information).

The importance determination unit 334 determines whether or not the information input to the information input unit 331 has importance (whether or not to be important information or referential information).

The classification result output unit 335 outputs a classification result of information (which of urgent notification information, forcible notification information, important information, or referential information the information has been classified into) on the basis of the determination results in the urgency determination unit 332, the forcibility determination unit 333, and the importance determination unit 334.

[Display Position/Mode Alteration Necessity Determination Unit]

The display position/mode alteration necessity determination unit 340 determines necessity of alteration in the display position and/or the display mode of the information in the visual field range of the user on the basis of the classification result in the content classification processing unit 330, the detection result in the detection system 200, and the imaging result in the imaging system 400.

Figure 12:
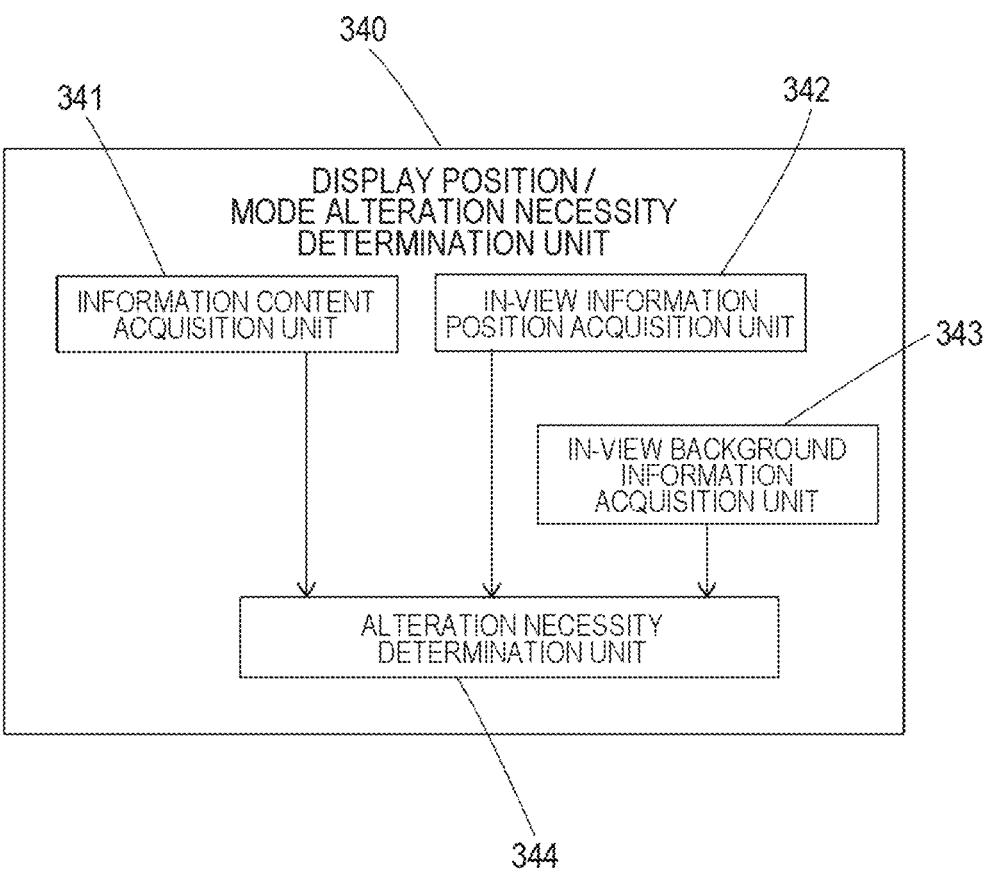
FIG. 12 is a block diagram illustrating a function of a display position/mode alteration necessity determination unit.

As illustrated in FIG. 12 as an example, the display position/mode alteration necessity determination unit 340 includes an information content acquisition unit 341, an in-view information position acquisition unit 342, an in-view background information acquisition unit 343, and an alteration necessity determination unit 344.

The information content acquisition unit 341 acquires content (which of urgent notification information, forcible notification information, important information, or referential information the information is) of information that is a classification result in the content classification processing unit 330.

The in-view information position acquisition unit 342 acquires the position of information in the visual field range of the user on the basis of, for example, a detection result in the eyeball sensor 210 and/or a characteristic of the display system 100 described later.

The in-view background information acquisition unit 343 acquires background information within the visual field range of the user on the basis of, for example, a detection result in the eyeball sensor 210 and an imaging result in the imaging system 400.

The alteration necessity determination unit 344 determines necessity of alteration in the display position and/or the display mode of the information in the visual field range of the user on the basis of the acquisition results of the information content acquisition unit 341, the in-view information position acquisition unit 342, and the in-view background information acquisition unit 343.

[Display Position/Mode Control Unit]

The display position/mode control unit 350 controls the display position and/or the display mode of information in the visual field range of the user on the basis of the determination result in the display position/mode alteration necessity determination unit 340, the imaging result in the imaging system 400, and the detection result in the position shift detection system 500.

Figure 13:
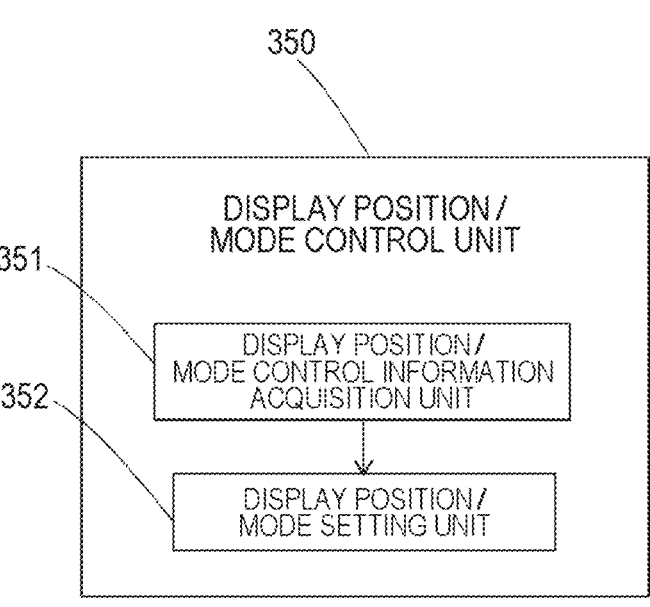
FIG. 13 is a block diagram illustrating a function of a display position/mode control unit.

As illustrated in FIG. 13 as an example, the display position/mode control unit 350 includes a display position/mode control information acquisition unit 351 and a display position/mode setting unit 352.

The display position/mode control information acquisition unit 351 acquires, as control information for controlling the display position/mode, a determination result in the display position/mode alteration necessity determination unit 340, a detection result in the detection system 200, an imaging result in the imaging system 400, and a detection result in the position shift detection system 500.

The display position/mode setting unit 352 sets the display position and/or the display mode of information in the visual field range of the user on the basis of the acquisition result by the display position/mode control information acquisition unit 351.

3. <Display Processing 1>

Figure 14:
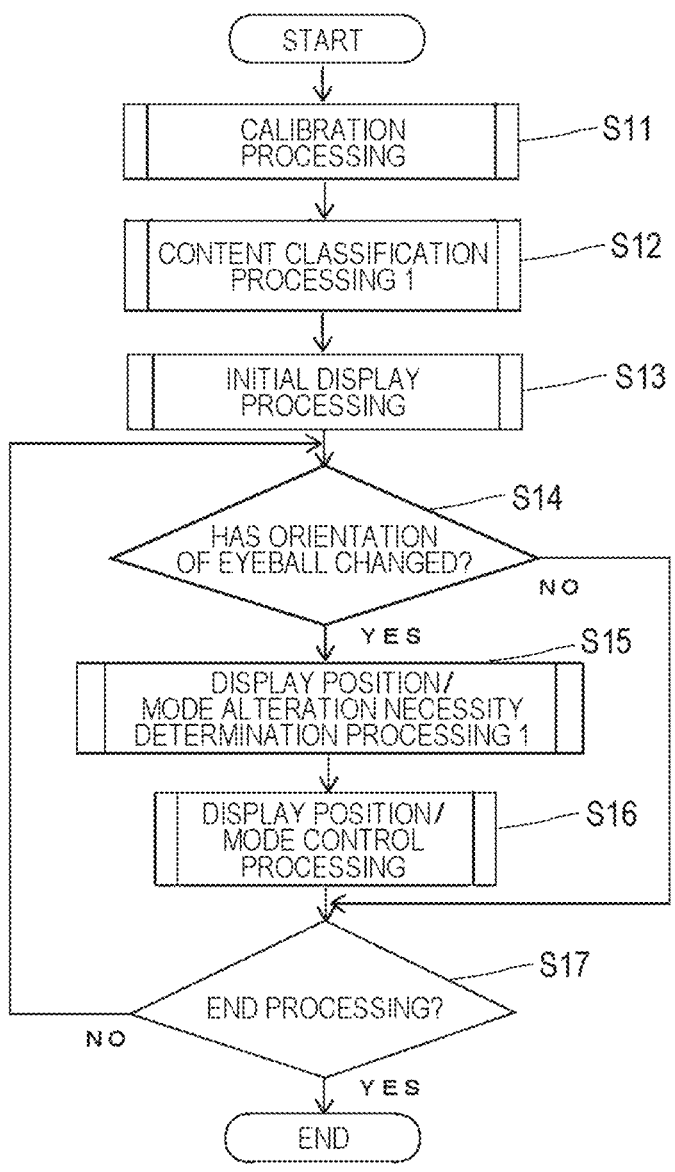
FIG. 14 is a flowchart for explaining display processing 1.

Hereinafter, display processing 1 (an example of a display method of the present technology) performed using the display device 10 according to the embodiment of the present technology will be described with reference to FIG. 14. The flowchart of FIG. 14 is on the basis of processing algorithm 1 executed by the control system 300. For performing the display processing 1, the eyeball sensor 210 is essential, but the head sensor 220 and the movement detection sensor 230 are not essential.

The display processing 1 is started when the user wears the glasses frame GF on the head and the display device 10 is turned on.

In the first step S11, the calibration processing unit performs the above-described calibration processing.

In the next step S12, the content classification processing unit 330 performs the content classification processing 1. Details of the content classification processing 1 will be described later.

In the next step S13, the display position/mode control unit 350 performs initial display processing. Details of the initial display processing will be described later.

In the next step S14, the main control unit 310 determines whether or not the orientation of the eyeball has changed. Specifically, the main control unit 310 determines whether or not the orientation (line-of-sight) of the eyeball has changed on the basis of the detection result in the eyeball sensor 210. When the determination in step S14 is affirmed, the process proceeds to step S15, and when the determination is negated, the process transitions to step S17.

In step S15, the display position/mode alteration necessity determination unit 340 performs the display position/mode alteration necessity determination processing 1. Details of the display position/mode alteration necessity determination processing 1 will be described later.

In the next step S16, the display position/mode control unit 350 performs the display position/mode control processing. Details of the display position/mode control processing will be described later.

In step S17, the main control unit 310 determines whether or not to end the processing. The determination here is affirmed, for example, when the display device 10 is turned off, when the glasses frame GF is removed from the head, or the like.

(Content Classification Processing 1)

Figure 15:
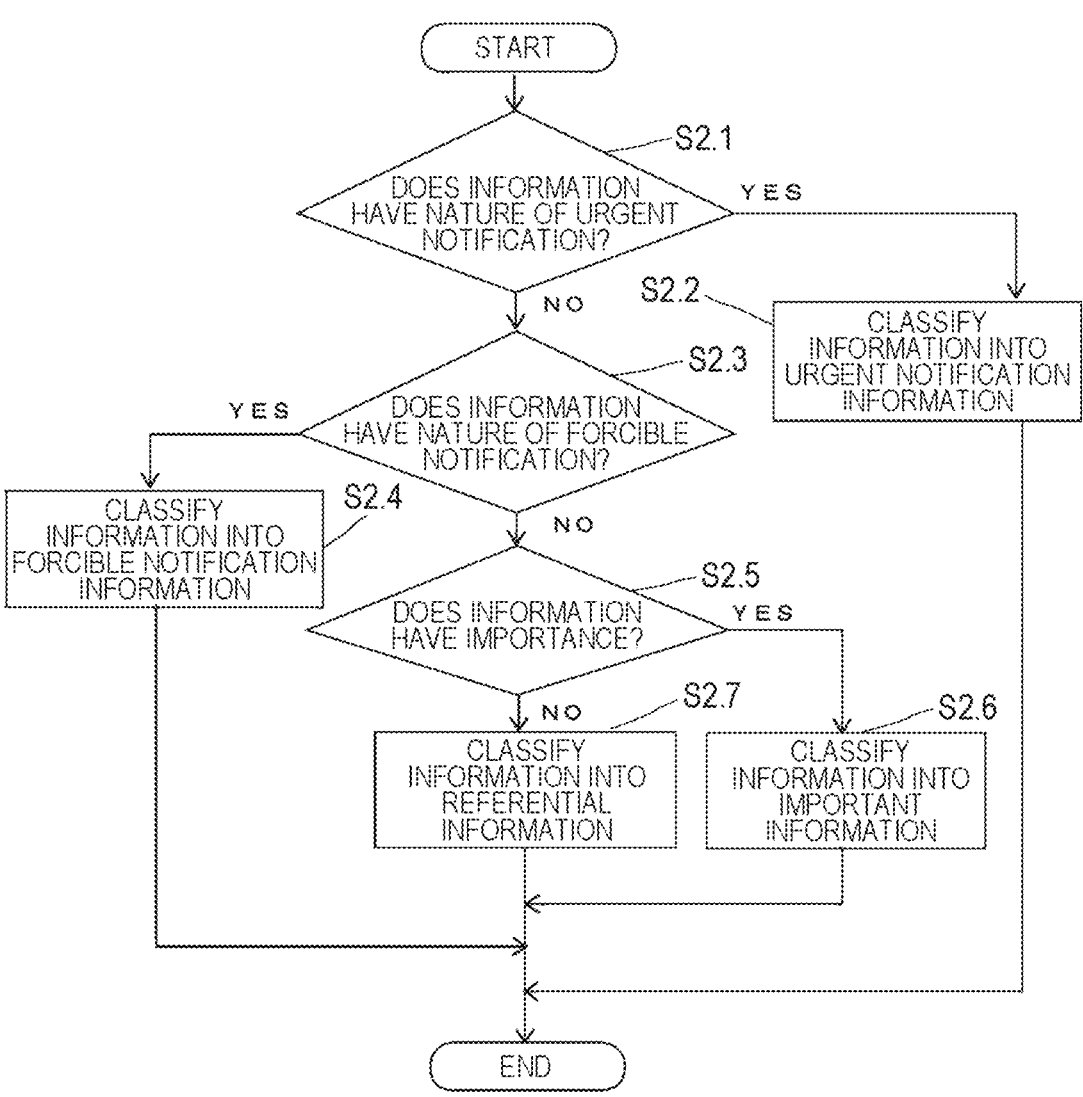
FIG. 15 is a flowchart for explaining content classification processing 1.

Hereinafter, the content classification processing 1 will be described with reference to the flowchart of FIG. 15.

In the first step S2.1, the content classification processing unit 330 determines whether or not the information has the nature of urgent notification. Specifically, the content classification processing unit 330 determines whether or not the information acquired and/or retained by the information acquisition/retention unit 360 is information notification of which needs to be urgently provided to the user (also referred to as "urgent notification information").

The urgent notification information include earthquake information, fire information in the neighborhood, torrential rain information, and terrorism incidence information.

When the determination in step S2.1 is affirmed, the process transitions to step S2.2, and when the determination is negated, the process transitions to step S2.3.

In step S2.2, the content classification processing unit 330 classifies the information into the urgent notification information, and outputs the classification result. When step S2.2 is executed, the flow ends.

In step S2.3, the content classification processing unit 330 determines whether or not the information has the nature of forcible notification. Specifically, the content classification processing unit 330 determines whether or not the information acquired and/or retained by the information acquisition/retention unit 360 is information notification of which needs to be forcibly provided to the user (also referred to as "forcible notification information").

The forcible notification information is information that does not have the nature of urgent notification but needs to be provided in notification in advance of information notification of which needs to be forcibly provided from a schedule of the user, for example.

The forcible notification information include, for example, meeting in a Y building at X o'clock, and boarding on an airplane departing from Y airport at X o'clock.

When the determination in step S2.3 is affirmed, the process transitions to step S2.4, and when the determination is negated, the process transitions to step S2.5.

In step S2.4, the content classification processing unit 330 classifies the information into the forcible notification information, and outputs the classification result. When step S2.4 is executed, the flow ends.

In step S2.5, the content classification processing unit 330 determines whether or not the information has importance. Specifically, the content classification processing unit 330 determines whether or not the information acquired and/or retained by the information acquisition/retention unit 360 is information that is important for future behavior of the user (also referred to as "important information").

The important information is information that does not have the nature of urgent notification and the nature of forcible notification, but should be noted, for example, when the user performs future behavior.

The important information include a traveling direction, a transit point, a required time from a current location to a destination, and a destination desired by the user (for example, store information) when the user uses a navigation app of the communication terminal.

When the determination in step S2.5 is affirmed, the process transitions to step S2.6, and when the determination is negated, the process transitions to step S2.7.

In step S2.6, the content classification processing unit 330 classifies the information into the important information, and outputs the classification result. When step S2.6 is executed, the flow ends.

In step S2.7, the content classification processing unit 330 classifies the information into the referential information, and outputs the classification result. The referential information is information that does not have the nature of urgent notification, the nature of forcible notification, and the importance, and is only required to be referred to as appropriate. When step S2.7 is executed, the flow ends.

Note that important information and referential information are information that can be switched to each other in time series depending on future behavior content of the user.

(Initial Display Processing)

Figure 16:
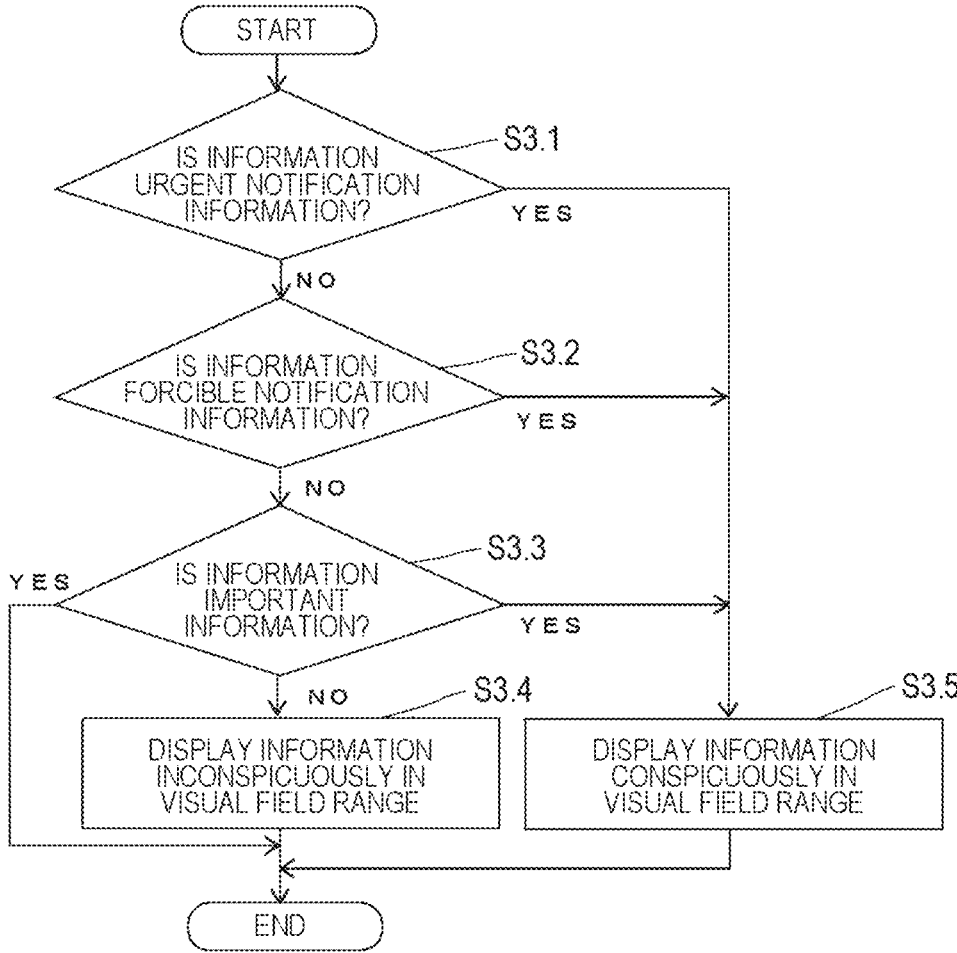
FIG. 16 is a flowchart for explaining initial display processing.

Hereinafter, the initial display processing will be described with reference to the flowchart of FIG. 16.

In the first step S3.1, the display position/mode control unit 350 determines whether or not the information is urgent notification information. When the determination here is negated, the process transitions to step S3.2, and when the determination is affirmed, the process transitions to step S3.5.

In step S3.2, the display position/mode control unit 350 determines whether or not the information is forcible notification information. When the determination here is negated, the process transitions to step S3.3, and when the determination is affirmed, the process transitions to step S3.5.

In step S3.3, the display position/mode control unit 350 determines whether or not the information is important information. When the determination here is negated, the process transitions to step S3.4, and when the determination is affirmed, the process transitions to step S3.5.

In step S3.4, the display position/mode control unit 350 displays the information inconspicuously in the visual field range of the user. Specifically, the display position/mode control unit 350 controls the display system 100 to display the information at a position and/or in a mode where the information is inconspicuous in the visual field range of the user.

That is, the display position/mode control unit 350 displays referential information at a position and/or in a mode inconspicuous in the visual field range of the user.

For example, the display position/mode control unit 350 controls the display system 100 in such a manner that the information is displayed in a peripheral part of the visual field range of the user.

For example, the display position/mode control unit 350 controls the display system 100 in such a manner that the information is displayed small and/or thinly and/or in a sober color and/or in a simple shape in the center part of the visual field range of the user.

When step S3.4 is executed, the flow ends.

In step S3.5, the display position/mode control unit 350 displays the information conspicuously in the visual field range. Specifically, the display position/mode control unit 350 controls the display system 100 to display the information at a conspicuous position and/or in a conspicuous mode in the visual field range.

That is, the display position/mode control unit 350 displays the urgent notification information, the forcible notification information, and the important information at a conspicuous position and/or in a conspicuous mode in the visual field range.

For example, the display position/mode control unit 350 controls the display system 100 in such a manner that the information is displayed at the center part of the visual field range of the user.

For example, the display position/mode control unit 350 controls the display system 100 in such a manner that the information is displayed large and/or thick and/or in a loud color and/or a peculiar shape in a peripheral part of the visual field range.

When step S3.5 is executed, the flow ends.

To supplement, human vision has a characteristic that, among objects present in the visual field range, objects closer to the center of the visual field range are viewed clearly, and objects closer to the end of the visual field range are viewed blurredly.

Therefore, regarding the display position, it can be considered that the closer a position is to the center of the visual field range, the more conspicuous the information displayed at the position, and the closer a position is to the center of the visual field range, the less conspicuous the information displayed at the position. Steps S3.4 and S3.5 have processing content based on such an idea.

(Display Position/Mode Alteration Necessity Determination Processing 1)

Figure 17:
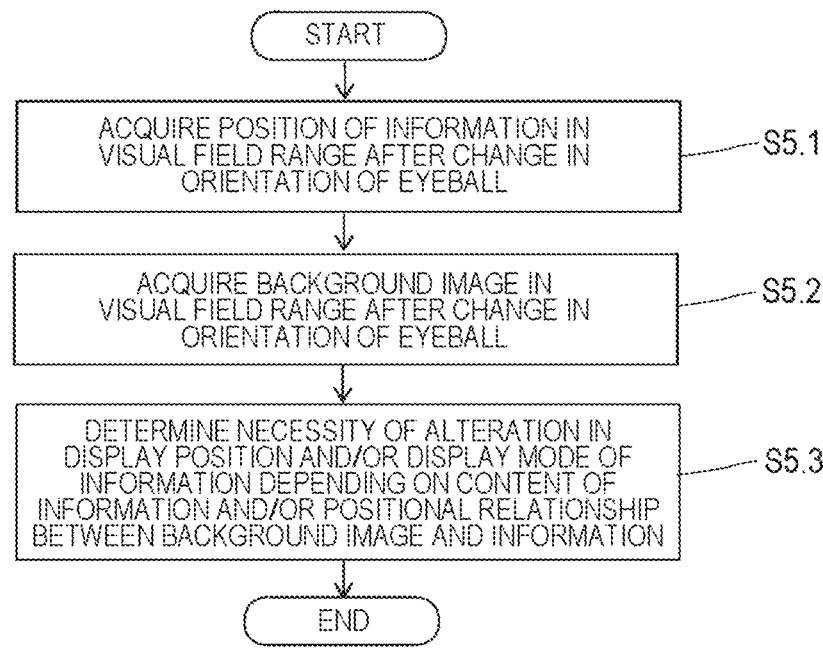
FIG. 17 is a flowchart for explaining display position/mode alteration necessity determination processing 1.

Hereinafter, the display position/mode alteration necessity determination processing 1 will be described with reference to the flowchart of FIG. 17.

In the first step S5.1, the display position/mode alteration necessity determination unit 340 acquires the position of the information in the visual field range after the change in the orientation of the eyeball EB of the user. Specifically, the display position/mode alteration necessity determination unit 340 acquires the position of the information in the visual field range after the change in the orientation of the eyeball EB of the user on the basis of the detection result in the eyeball sensor 210 and/or the display characteristics of the display system 100.

Here, the "display characteristics of the display system 100" means, for example, a case where information is always displayed at a predetermined position (for example, a peripheral part) in the visual field range, a case where information display following line-of-sight movement is performed, a case where the information is displayed at a constant position as viewed from the glasses frame GF, and the like (the same shall apply hereafter).

In the next step S5.2, the display position/mode alteration necessity determination unit 340 acquires a background image in the visual field range after a change in the orientation of the eyeball EB of the user (also referred to as "after line-of-sight movement"). Specifically, the display position/mode alteration necessity determination unit 340 acquires the background image in the visual field range after the change in the orientation of the eyeball EB of the user on the basis of the imaging result in the imaging system 400 and the detection result by the eyeball sensor 210.

In the final step S5.3, the display position/mode alteration necessity determination unit 340 determines necessity of alteration in the display position and/or the display mode of the information depending on the content of the information according to the classification result in the content classification processing unit 330 and/or the positional relationship between the background image and the information.

Specifically, in a case where the information is urgent notification information or forcible notification information and can be displayed in such a manner to become inconspicuous in the visual field range after line-of-sight movement, the display position/mode alteration necessity determination unit 340 determines that the display position and/or the display mode of the information needs to be altered and outputs a determination result that there is a need for the information to be displayed conspicuously.

In a case where the information is urgent notification information or forcible notification information and can be displayed conspicuously in the visual field range after line-of-sight movement, the display position/mode alteration necessity determination unit 340 determines that the display position and/or the display mode of the information needs not be altered and outputs its determination result.

In a case where the information is important information and can be displayed conspicuously in the visual field range after line-of-sight movement, the display position/mode alteration necessity determination unit 340 determines that the display position and/or the display mode of the information needs not be altered and outputs its determination result.

Figure 19A:
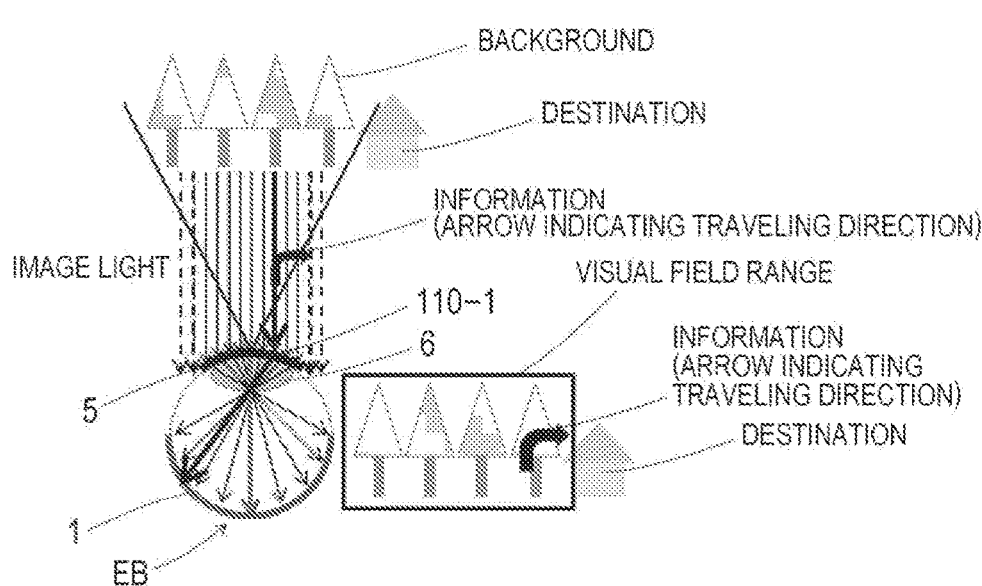
FIGS. 19A and 19B are views for explaining an operation example 1 of the display device of Example 1.
Figure 19B:
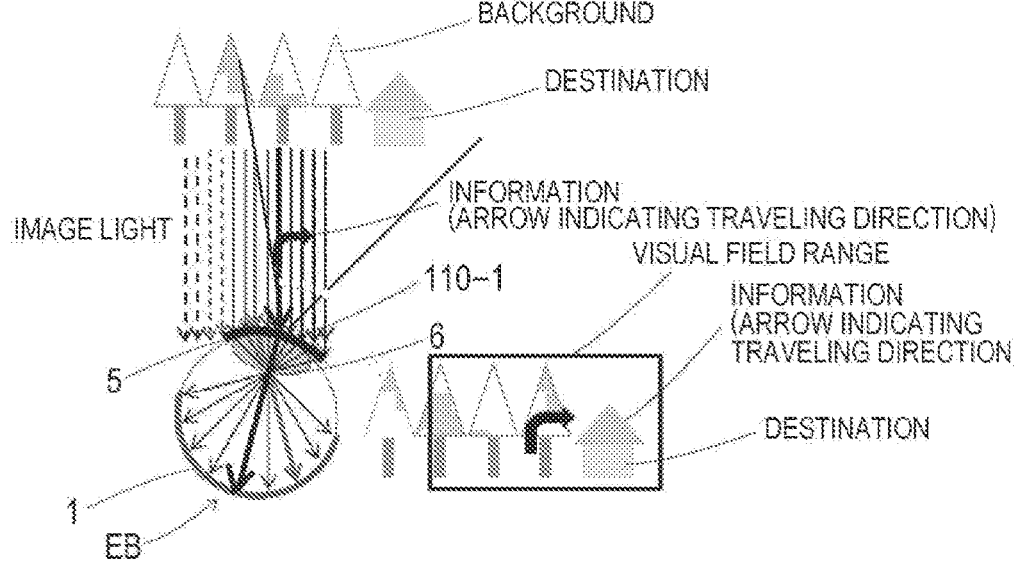

As illustrated in FIG. 19A for example, in a case where the user has activated a navigation app in the communication terminal, and in a case where the information displayed in the visual field range using the display device 10-1 of Example 1 is an arrow (important information) indicating the traveling direction to the destination, as illustrated in FIG. 19B for example, when the user moves the line-of-sight toward the destination with rather performing no special control (for example, control for causing the information to follow the line-of-sight movement), there is a case where the positional relationship between the background image and the information can become more appropriate (for example, a case where the arrow can become in a state of pointing to the destination after the line-of-sight movement) after the line-of-sight movement.

In such a case, the display position/mode alteration necessity determination unit 340 determines that the display position and the display mode of the information do not need to be altered.

Figures 20A, 20B, 20C:
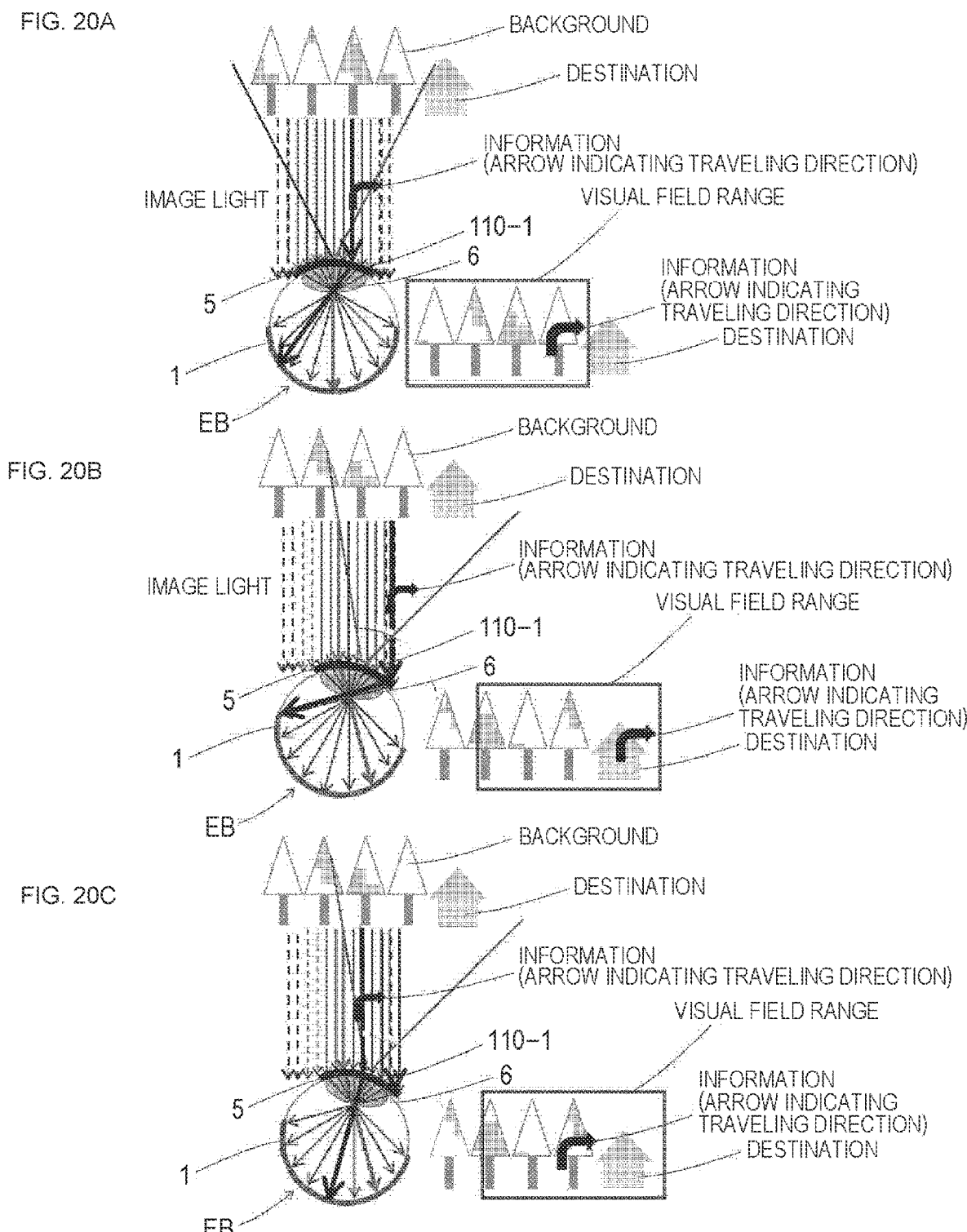
FIGS. 20A and 20C are views for explaining an operation example 2 of the display device of Example 1.
FIG. 20B is a comparison reference view used for comparison with the operation example 2.

As illustrated in FIG. 20A for example, in a case where the user has activated a navigation app in the communication terminal, and in a case where the information displayed in the visual field range using the display device 10-1 of Example 1 is an arrow (important information) indicating the traveling direction, as illustrated in FIG. 20B for example, when the user moves the line-of-sight toward the destination with performing special control (for example, control for causing the information to follow the line-of-sight movement), there is a case where the positional relationship between the background image and the information can become inappropriate (for example, a case where the arrow can overlap with the destination after the line-of-sight movement, or a case where the arrow can point to a direction different from the direction toward the destination) after the line-of-sight movement.

In such a case, as illustrated in FIG. 20C, the display position/mode alteration necessity determination unit 340 determines that the display position and/or the display mode of the information needs to be altered, and for example, the arrow needs to be displayed at the center part of the visual field range in such a manner to point to the destination (the display position of the information in the visual field range needs to be altered).

As illustrated in FIG. 21A for example, in a case where the user has activated a navigation app in the communication terminal, and in a case where the information displayed in the visual field range using the display device 10-2 of Example 2 is an arrow (important information) indicating the traveling direction, as illustrated in FIG. 21B for example, when the user moves the line-of-sight toward the destination, there is a case where the positional relationship between the background image and the information can become inappropriate (for example, a case where the arrow can overlap with the destination after the line-of-sight movement, or a case where the arrow can point to a direction different from the direction toward the destination) after the line-of-sight movement.

In such a case, as illustrated in FIG. 21C, the display position/mode alteration necessity determination unit 340 determines that the display position and/or the display mode of the information needs to be altered, and for example, the arrow needs to be displayed at the center part of the visual field range in such a manner to point to the destination (the display position of the information in the visual field range needs to be altered).

Figure 22A:
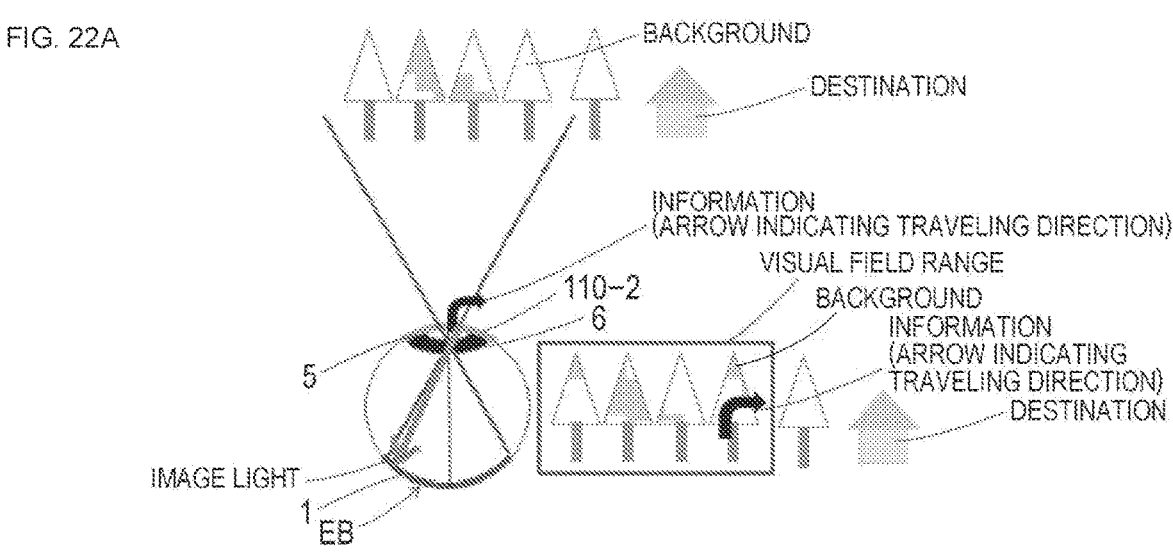
FIGS. 22A and 22B are views for explaining an operation example 2 of the display device of Example 2.
Figure 22B:
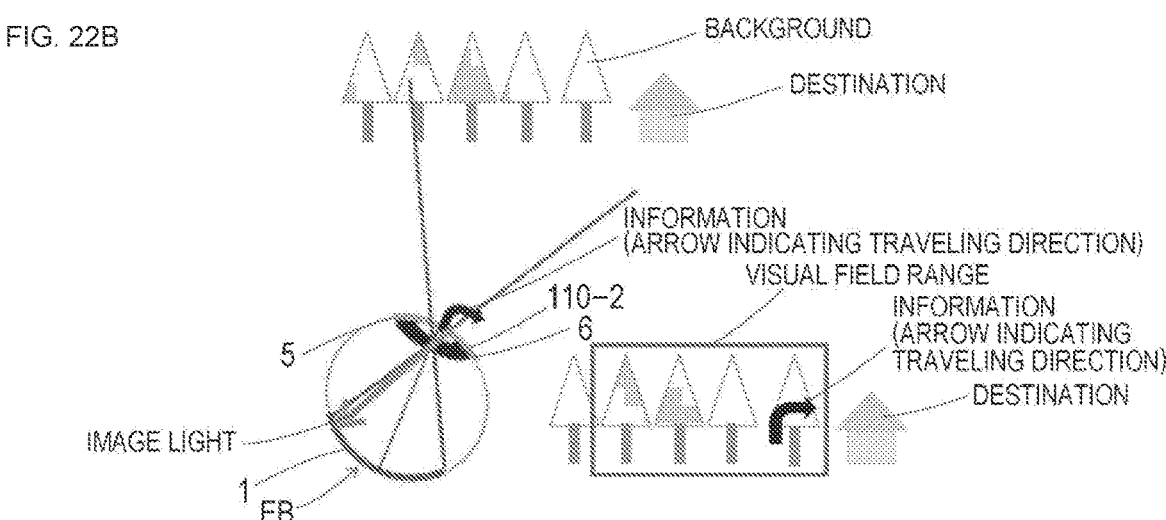

As illustrated in FIG. 22A for example, in a case where the user has activated a navigation app in the communication terminal, and in a case where the information displayed in the visual field range using the display device 10-2 of Example 2 is an arrow (important information) indicating the traveling direction, as illustrated in FIG. 22B for example, when the user moves the line-of-sight toward the destination, there is a case where the positional relationship between the background image and the information can become appropriate (for example, a case where the arrow can become in a state of pointing to the destination after the line-of-sight movement) after the line-of-sight movement.

In such a case, the display position/mode alteration necessity determination unit 340 determines that the display position and the display mode of the information do not need to be altered.

In a case where the information is referential information and can be displayed conspicuously in the visual field range after line-of-sight movement, the display position/mode alteration necessity determination unit 340 determines that the display position and/or the display mode of the information needs to be altered and outputs a determination result there is a need for the information to be displayed inconspicuously.

In a case where the information is referential information and can be displayed inconspicuously in the visual field range after line-of-sight movement, the display position/mode alteration necessity determination unit 340 determines that the display position and/or the display mode of the information needs not be altered and outputs its determination result.

(Display Position/Mode Control Processing)

Figure 18:
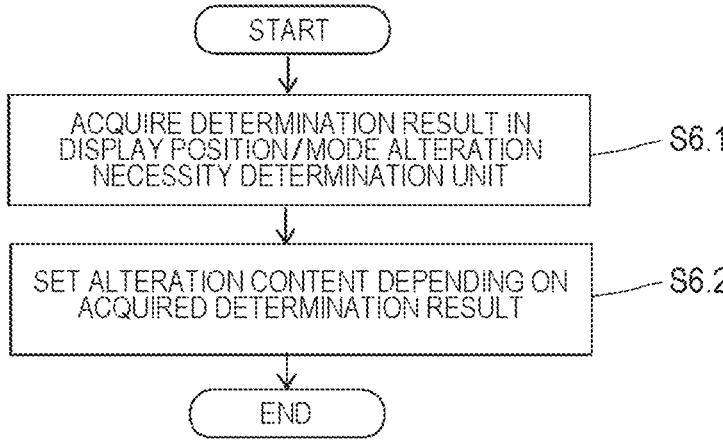
FIG. 18 is a flowchart for explaining display position/mode control processing.

Hereinafter, the display position/mode control processing will be described with reference to the flowchart of FIG. 18.

In the first step S6.1, the display position/mode control unit 350 acquires the determination result in the display position/mode alteration necessity determination unit 340.

In the final step S6.2, the display position/mode control unit 350 sets the alteration content depending on the determination result in the display position/mode alteration necessity determination unit 340.

Specifically, when the determination result in the display position/mode alteration necessity determination unit 340 is affirmative (a case where the alteration is necessary), the display position/mode control unit 350 sets alteration content of the display position and/or the display mode of the information, and when the determination result is negated, performs not processing at all.

The alteration content is a specific position (for example, the center part of the visual field range) and a specific mode (for example, large and/or thick and/or in a loud color and/or a peculiar shape) in a case where the display is altered in such a manner that the information is conspicuous in the visual field range.

The alteration content is a specific position (for example, a peripheral part of the visual field range) and a specific mode (for example, small and/or thinly and/or in a sober color and/or in a simple shape) in a case where the display is altered in such a manner that the information is inconspicuous in the visual field range.

4. <Display Processing 2>

Figure 23:
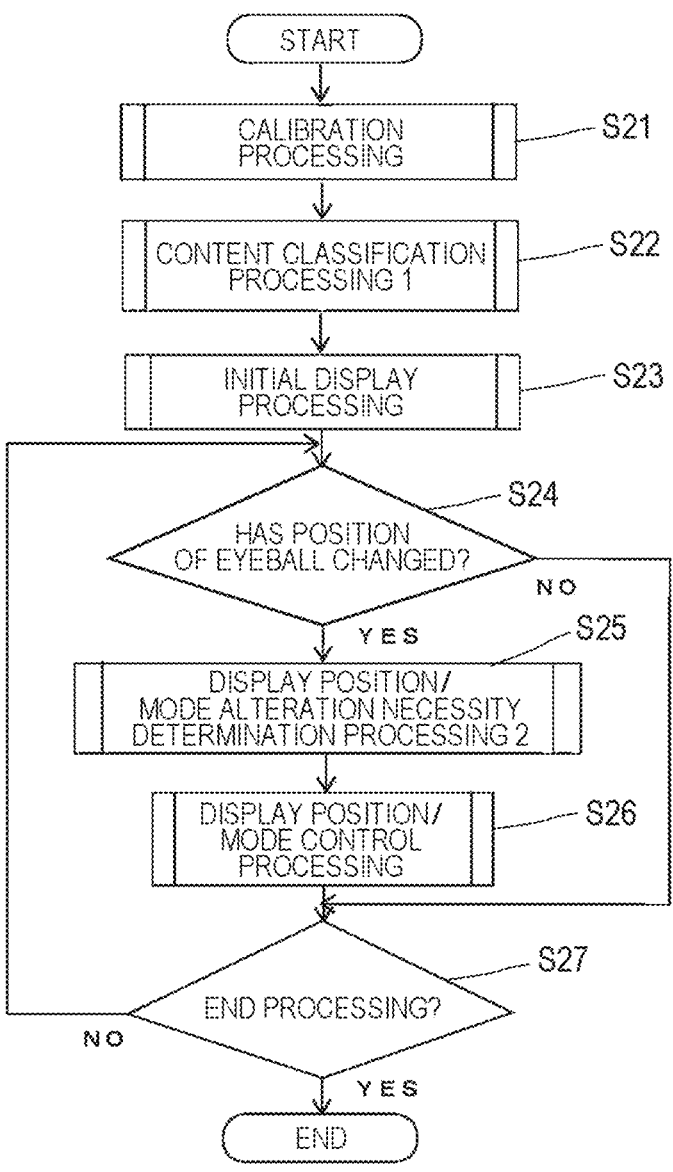
FIG. 23 is a flowchart for explaining display processing 2.

Hereinafter, display processing 2 (an example of a display method of the present technology) performed using the display device 10 according to the embodiment of the present technology will be described with reference to FIG. 23. The flowchart of FIG. 23 is on the basis of processing algorithm 2 executed by the control system 300. For performing the display processing 2, the eyeball sensor 210, the head sensor 220, and/or the movement detection sensor 230 are essential.

The display processing 2 is started when the user wears the glasses frame GF on the head and the display device 10 is turned on.

In the first step S21, the calibration processing unit performs the above-described calibration processing. Details of the calibration processing have been mentioned above.

In the next step S22, the content classification processing unit 330 performs the content classification processing 1. Details of the content classification processing have been mentioned above.

In the next step S23, the display position/mode control unit 350 performs the initial display processing. Details of the initial display processing have been mentioned above.

In the next step S24, the main control unit 310 determines whether or not the position of the eyeball has changed.

Specifically, the main control unit 310 determines presence or absence of a change in the position of the eyeball EB of the user from the detection result in the head sensor 220 and/or the movement detection sensor 230.

The position of the eyeball EB changes when the orientation and/or the position of the head and/or the body of the user changes, and therefore it is possible to determine the presence or absence of a change in the position of the eyeball EB of the user from the detection result of the head sensor 220 and/or the movement detection sensor 230.

When the determination in step S24 is affirmed, the process transitions to step S25, and when the determination is negated, the process transitions to step S27.

In step S25, the display position/mode alteration necessity determination unit 340 performs the display position/mode alteration necessity determination processing 2. Details of the display position/mode alteration necessity determination processing 2 will be described later.

In the next step S26, the display position/mode control unit 350 performs the display position/mode control processing. Details of the display position/mode control processing have been mentioned above.

In final step S27, the main control unit 310 determines whether or not to end the processing. The determination here is affirmed, for example, when the display device 10 is turned off, when the glasses frame GF is removed from the head, or the like. When the determination in step S27 is affirmed, the flow ends, and when the determination is negated, the process returns to step S24.

(Display Position/Mode Alteration Necessity Determination Processing 2)

Hereinafter, the display position/mode alteration necessity determination processing 2 will be described with reference to the flowchart of FIG. 24.

In the first step S5.15, the display position/mode alteration necessity determination unit 340 acquires the position of the information in the visual field range after the change in the position of the eyeball EB of the user. Specifically, the display position/mode alteration necessity determination unit 340 acquires the position of the information in the visual field range after the change in the position of the eyeball EB of the user from the detection result in the eyeball sensor 210 and/or the display characteristics of the display system 100.

In the next step S5.25, the display position/mode alteration necessity determination unit 340 acquires a background image in the visual field range after a change in the position of the eyeball EB. Specifically, the display position/mode alteration necessity determination unit 340 acquires the background image in the visual field range after the change in the position of the eyeball EB of the user on the basis of the imaging result in the imaging system 400, the detection result by the eyeball sensor 210, and the detection result in the head sensor 220 and/or the movement detection sensor 230.

In the final step S5.35, the display position/mode alteration necessity determination unit 340 determines necessity of alteration in the display position and the display mode of the information depending on the content of the information and the positional relationship between the background image and the information. A specific determination method is similar to that in step S5.3 in FIG. 17.

5. <Display Processing 3>

Figure 25:
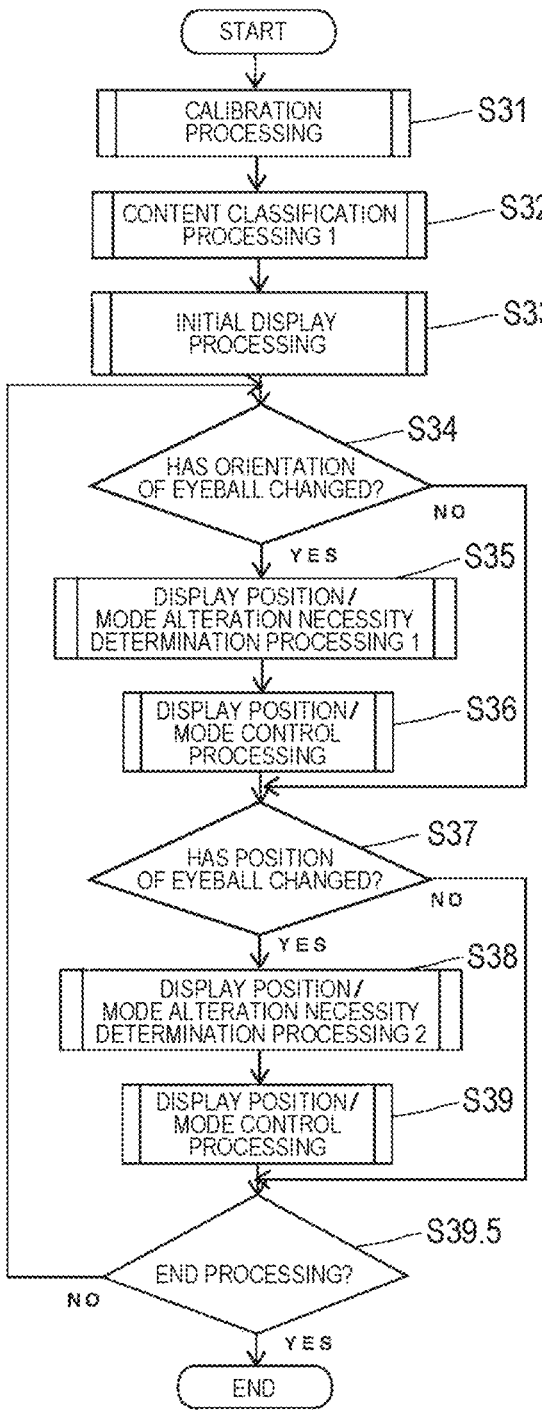
FIG. 25 is a flowchart for explaining display processing 3.

Hereinafter, display processing 3 (an example of a display method of the present technology) performed using the display device 10 according to the embodiment of the present technology will be described with reference to FIG. 25. The flowchart of FIG. 25 is on the basis of processing algorithm 3 executed by the control system 300. For performing the display processing 3, the eyeball sensor 210, the head sensor 220, and/or the movement detection sensor 230 are essential.

The display processing 3 is started when the user wears the glasses frame GF on the head and the display device 10 is turned on.

In the first step S31, the calibration processing unit performs the above-described calibration processing. Details of the calibration processing have been mentioned above.

In the next step S32, the content classification processing unit 330 performs the content classification processing 1. Details of the content classification processing 1 have been mentioned above.

In the next step S33, the display position/mode control unit 350 performs the initial display processing. Details of the initial display processing have been mentioned above.

In the next step S34, the main control unit 310 determines whether or not the orientation of the eyeball has changed. Specifically, the main control unit 310 determines whether or not the orientation (line-of-sight) of the eyeball has changed on the basis of the detection result in the eyeball sensor 210. When the determination in step S34 is affirmed, the process proceeds to step S35, and when the determination is negated, the process transitions to step S37.

In step S35, the display position/mode alteration necessity determination unit 340 performs the display position/mode alteration necessity determination processing 1. Details of the display position/mode alteration necessity determination processing 1 have been mentioned above. When step S35 is executed, the process transitions to step S36.

In step S36, the display position/mode control unit 350 performs the display position/mode control processing. Details of the display position/mode control processing have been mentioned above. When step S36 is executed, the process transitions to step S37.

In the next step S37, the main control unit 310 determines whether or not the position of the eyeball has changed.

Specifically, the main control unit 310 determines presence or absence of a change in the position of the eyeball EB of the user from the detection result in the head sensor 220 and/or the movement detection sensor 230.

When the determination in step S37 is affirmed, the process transitions to step S38, and when the determination is negated, the process transitions to step S39.5.

In step S38, the display position/mode alteration necessity determination unit 340 performs the display position/mode alteration necessity determination processing 2. Details of the display position/mode alteration necessity determination processing 2 have been mentioned above. When step S38 is executed, the process transitions to step S39.

In step S39, the display position/mode control unit 350 performs the display position/mode control processing. Details of the display position/mode control processing have been mentioned above. When step S39 is executed, the process transitions to step S39.5.

In step S39.5, the main control unit 310 determines whether or not to end the processing. The determination here is affirmed, for example, when the display device 10 is turned off, when the glasses frame GF is removed from the head, or the like. When the determination in step S39.5 is affirmed, the flow ends, and when the determination is negated, the process returns to step S34.

6. <Display Processing 4>

Figure 26:
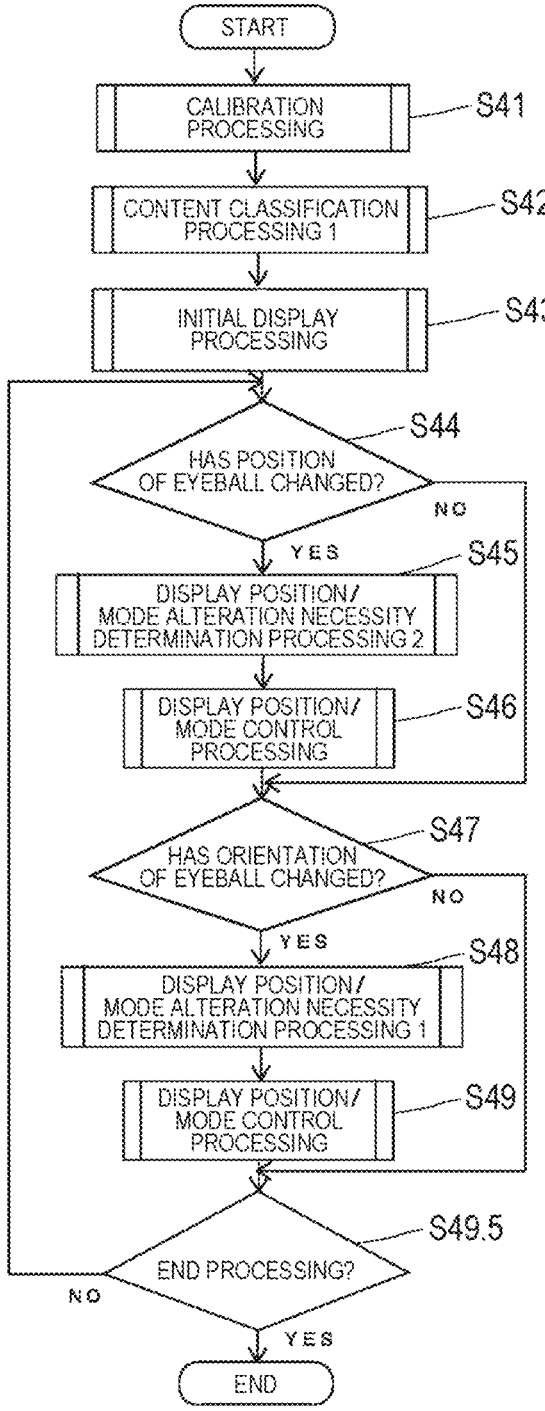
FIG. 26 is a flowchart for explaining display processing 4.

Hereinafter, display processing 4 (an example of a display method of the present technology) performed using the display device 10 according to the embodiment of the present technology will be described with reference to FIG. 26. The flowchart of FIG. 26 is on the basis of processing algorithm 4 executed by the control system 300. For performing the display processing 4, the eyeball sensor 210, the head sensor 220, and/or the movement detection sensor 230 are essential.

The display processing 4 is started when the user wears the glasses frame GF on the head and the display device 10 is turned on.

In the first step S41, the calibration processing unit performs the above-described calibration processing. Details of the calibration processing have been mentioned above.

In the next step S42, the content classification processing unit 330 performs the content classification processing 1. Details of the content classification processing 1 have been mentioned above.

In the next step S43, the display position/mode control unit 350 performs the initial display processing. Details of the initial display processing have been mentioned above.

In the next step S44, the main control unit 310 determines whether or not the position of the eyeball has changed. Specifically, the main control unit 310 determines presence or absence of a change in the position of the eyeball EB of the user from the detection result in the head sensor 220 and/or the movement detection sensor 230. When the determination in step S44 is affirmed, the process proceeds to step S45, and when the determination is negated, the process transitions to step S47.

In step S45, the display position/mode alteration necessity determination unit 340 performs the display position/mode alteration necessity determination processing 2. Details of the display position/mode alteration necessity determination processing 2 have been mentioned above.

In the next step S46, the display position/mode control unit 350 performs the display position/mode control processing. Details of the display position/mode control processing have been mentioned above. When step S46 is executed, the process transitions to step S47.

In step S47, the main control unit 310 determines whether or not the orientation of the eyeball has changed. Specifically, the main control unit 310 determines whether or not the orientation (line-of-sight) of the eyeball has changed on the basis of the detection result in the eyeball sensor 210. When the determination in step S47 is affirmed, the process transitions to step S48, and when the determination is negated, the process transitions to step S49.5.

In step S48, the display position/mode alteration necessity determination unit 340 performs the display position/mode alteration necessity determination processing 1. Details of the display position/mode alteration necessity determination processing 1 have been mentioned above. When step S48 is executed, the process transitions to step S49.

In step S49, the display position/mode control unit 350 performs the display position/mode control processing. Details of the display position/mode control processing have been mentioned above. When step S49 is executed, the process transitions to step S49.5.

In step S49.5, the main control unit 310 determines whether or not to end the processing. The determination here is affirmed, for example, when the display device 10 is turned off, when the glasses frame GF is removed from the head, or the like. When the determination in step S49.5 is affirmed, the flow ends, and when the determination is negated, the process returns to step S44.

7. <Display Processing 5>

Figure 27:
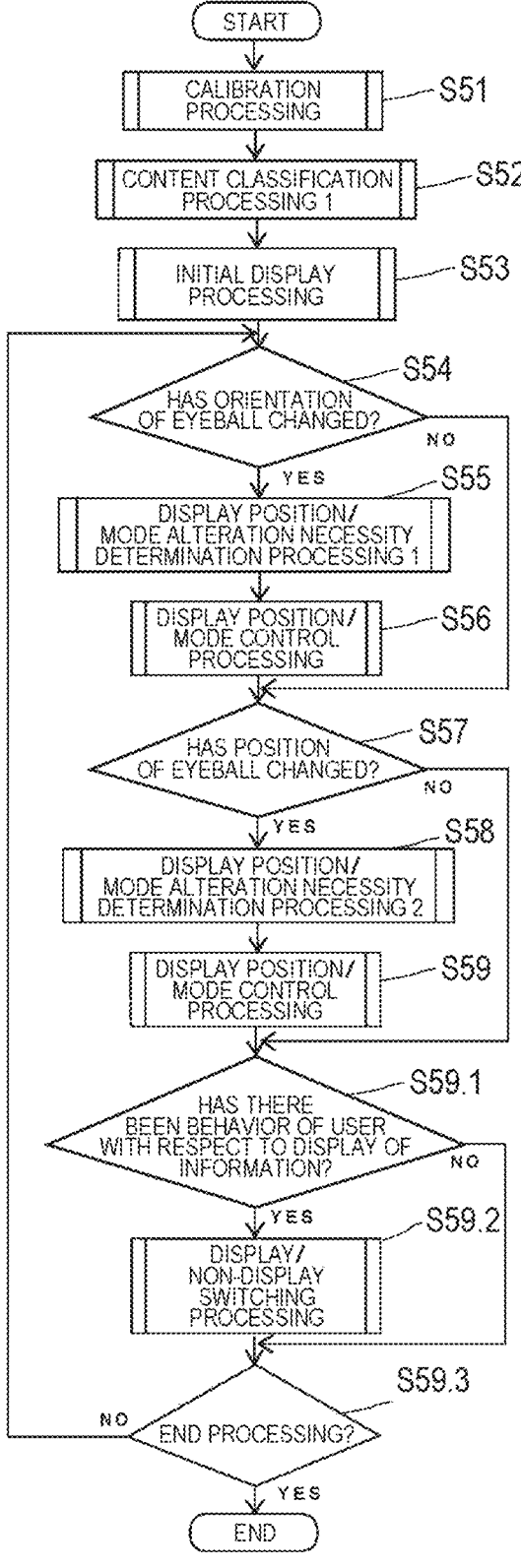
FIG. 27 is a flowchart for explaining display processing 5.

Hereinafter, display processing 5 (an example of a display method of the present technology) performed using the display device 10 according to the embodiment of the present technology will be described with reference to FIG. 27. The flowchart of FIG. 27 is on the basis of processing algorithm executed by the control system 300. For performing the display processing 5, the eyeball sensor 210, the head sensor 220, and/or the movement detection sensor 230 are essential.

The display processing 5 is started when the user wears the glasses frame GF on the head and the display device 10 is turned on.

In the first step S51, the calibration processing unit performs the above-described calibration processing. Details of the calibration processing have been mentioned above.

In the next step S52, the content classification processing unit 330 performs the content classification processing 1. Details of the content classification processing 1 have been mentioned above.

In the next step S53, the display position/mode control unit 350 performs the initial display processing. Details of the initial display processing have been mentioned above.

In the next step S54, the main control unit 310 determines whether or not the orientation of the eyeball has changed. Specifically, the main control unit 310 determines whether or not the orientation (line-of-sight) of the eyeball has changed on the basis of the detection result in the eyeball sensor 210. When the determination in step S54 is affirmed, the process proceeds to step S55, and when the determination is negated, the process transitions to step S57.

In step S55, the display position/mode alteration necessity determination unit 340 performs the display position/mode alteration necessity determination processing 1. Details of the display position/mode alteration necessity determination processing 1 have been mentioned above. When step S55 is executed, the process transitions to step S56.

In step S56, the display position/mode control unit 350 performs the display position/mode control processing. Details of the display position/mode control processing have been mentioned above. When step S56 is executed, the process transitions to step S57.

In the next step S57, the main control unit 310 determines whether or not the position of the eyeball has changed.

Specifically, the main control unit 310 determines presence or absence of a change in the position of the eyeball EB of the user from the detection result in the head sensor 220 and/or the movement detection sensor 230.

When the determination in step S57 is affirmed, the process transitions to step S58, and when the determination is negated, the process transitions to step S59.1.

In step S58, the display position/mode alteration necessity determination unit 340 performs the display position/mode alteration necessity determination processing 2. Details of the display position/mode alteration necessity determination processing 2 have been mentioned above. When step S58 is executed, the process transitions to step S59.

In step S59, the display position/mode control unit 350 performs the display position/mode control processing. Details of the display position/mode control processing have been mentioned above. When step S59 is executed, the process transitions to step S59.1.

In step S59.1, the main control unit 310 determines whether or not there has been behavior of the user with respect to display of information.

The behavior of the user with respect to display of information includes opening-closing of the eyelid. However, the opening-closing of the eyelid mentioned here does not mean a physiological matter such as the user's blinking but means the user's voluntary closing of the eyelid, voluntary opening of the eyelid from a state where the user is voluntarily closing the eyelid, and the like.

The main control unit 310 can detect opening-closing of the eyelid on the basis of the difference in reflectance between the eyeball and the eyelid using an optical sensor having a light-receiving/emitting unit, for example, as the another detection system 600.

When the determination in step S59.1 is affirmed, the process transitions to step S59.2, and when the determination is negated, the process transitions to step S59.3.

In step S59.2, the main control unit 310 performs display/non-display switching processing.

Specifically, for example, the main control unit 310 displays information in the visual field range when the user voluntarily closes the eyelid, and does not display the information when the user opens the eyelid. In this case, for example, the user closes the eyelid and confirms information, and when opening the eyelid, the user can take on the behavior on the basis of the information confirmed in a clear state where the information is not displayed in the visual field range.

For example, the main control unit 310 may display a large image (for example, a still image or a moving image) as information in substantially the entire visual field range when the user voluntarily closes the eyelid, and needs not display the image when the user opens the eyelid. When step S59.2 is executed, the process transitions to step S59.3.

In step S59.3, the main control unit 310 determines whether or not to end the processing. The determination here is affirmed, for example, when the display device 10 is turned off, when the glasses frame GF is removed from the head, or the like. When the determination in step S59.3 is affirmed, the flow ends, and when the determination is negated, the process returns to step S54.

8. <Effects of Display Device and Display Method According to Embodiment of Present Technology>

The display device 10 according to the embodiment described above includes: the display system 100 configured to display information in a visual field range of a user by irradiating the retina 1 of the eyeball EB with light using an element integrally provided on the eyeball EB of the user; the detection system 200 configured to detect a change in an orientation and/or a position of the eyeball EB; and the control system 300 configured to control a display position and/or a display mode of the information in the visual field range on the basis of a detection result in the detection system 200.

Therefore, it is possible to provide a display device capable of appropriately displaying information in a visual field range of a user.

The control system 300 determines necessity of alteration in the display position and/or the display mode when the detection system 200 detects a change in an orientation and/or a position of the eyeball EB, and controls the display system 100 on the basis of its determination result. Therefore, even if the orientation and/or the position of the eyeball EB changes, information can be appropriately displayed in the visual field range of the user.

The control system 300 determines necessity of alteration in the display position and/or the display mode of the information depending on presence or absence of a change in the display position before and after the change in the orientation and/or the position of the eyeball EB. Therefore, information can be appropriately displayed in the visual field range of the user depending on presence or absence of a change in the display position before and after the change in the orientation and/or the position of the eyeball EB.

The control system 300 determines necessity of alteration in the display position and/or the display mode of the information depending on the positional relationship between the display position and the background in the visual field range after the change in the orientation and/or the position of the eyeball EB. Therefore, it is possible to appropriately display information in the visual field range of the user depending on the positional relationship between the information and the background.

The control system 300 determines the content of the information, and, depending on its determination result, determines necessity of alteration in the display position and/or the display mode of the information.

Therefore, it is possible to appropriately display information in the visual field range of the user depending on the content of the information.

The control system 300 makes the first determination of determining whether or not it is necessary to urgently and/or forcibly notify the user of content of the information, and controls the display system 100 on the basis of a determination result in the first determination. Therefore, it is possible to appropriately display information having the nature of urgent notification and/or the nature of forcible notification in the visual field range of the user.

The control system 300 causes the display system 100 to display the information conspicuously in the visual field range in a case where a determination result in the first determination is affirmative. Therefore, it is possible to cause the user to reliably recognize information having the nature of urgent notification and/or the nature of forcible notification.

The control system 300 may cause the display system 100 to display the information at a center part in the visual field range in a case where a determination result in the first determination is affirmative. Therefore, it is possible to cause the user to recognize information having the nature of urgent notification and/or the nature of forcible notification.

The control system 300 may make a second determination of determining whether or not content of the information is important for future behavior of the user in a case where a determination result in the first determination is negated, and control the display system 100 on the basis of a determination result in the second determination. Therefore, it is possible to appropriately display information having importance in the visual field range of the user.

The control system 300 causes the display system 100 to display the information conspicuously in the visual field range of the user in a case where a determination result in the second determination is affirmative. Therefore, it is possible to cause the user to reliably recognize information having importance.

The control system 300 may cause the display system 100 to display the information at a center part in the visual field range of the user in a case where a determination result in the second determination is affirmative. Therefore, it is possible to cause the user to recognize information having importance.

The control system 300 may cause the display system 100 to display the information inconspicuously in the visual field range of the user in a case where a determination result in the second determination is negated. Therefore, it is possible to provide the user with information having no importance as referential information without affecting the visual field.

The control system may cause the display system 100 to display the information at a peripheral part in the visual field range in a case where a determination result in the second determination is negated. Therefore, it is possible to provide the user with information having no importance as referential information without affecting the visual field as much as possible.

The element 110 is of an eyeball-worn type, the display device 10 further includes the position shift detection system 500 configured to detect a position shift between the eyeball EB and the element 110, and the control system 300 further controls the display system 100 on the basis of a detection result of the position shift detection system 500. Therefore, it is possible to suppress position shift between the eyeball EB and the element 110.

The control system 300 may control the display position of the information in such a manner not to change before and after the position shift. Therefore, it is possible to suppress position shift more reliably.

The display device 10 may further include the another detection system 600 configured to detect opening-closing of the eyelid corresponding to the eyeball EB, and the control system 300 may control the display system 100 on the basis of a detection result in the another detection system 600. Therefore, it is possible to perform display control (for example, switching between display and non-display) in response to opening-closing of the eyelid.

The display method according to the present technology includes: the process of displaying information in a visual field range of a user by irradiating the retina 1 of the eyeball EB with light using the element 110 integrally provided on the eyeball EB of the user; the process of detecting a change in an orientation and/or a position of the eyeball EB; and the process of controlling a display position and/or a display mode of the information in the visual field range of the use on the basis of a detection result in the process of detecting.

Therefore, it is possible to appropriately display information in the visual field range of the user.

In the process of controlling, necessity of alteration in the display position and/or the display mode of information is determined when a change in an orientation and/or a position of the eyeball EB is detected in the process of detecting, and the display position and/or the display mode is controlled on the basis of its determination result. Therefore, even if the orientation and/or the position of the eyeball EB changes, information can be appropriately displayed in the visual field range of the user.

In the process of controlling, necessity of alteration in the display position and/or the display mode of the information is determined depending on presence or absence of a change in the display position before and after the change in the orientation and/or the position of the eyeball EB. Therefore, information can be appropriately displayed in the visual field range of the user depending on presence or absence of a change in the display position before and after the change in the orientation and/or the position of the eyeball EB.

In the process of controlling, necessity of the alteration is determined depending on the positional relationship between the display position and a background in the visual field range after a change in the orientation and/or the position of the eyeball EB. Therefore, it is possible to appropriately display information in the visual field range of the user depending on the positional relationship between the information and the background.

In the process of controlling, the content of the information is determined, and, depending on its determination result, necessity of alteration in the display position and/or the display mode of the information is determined. Therefore, it is possible to appropriately display information in the visual field range of the user depending on the content of the information.

In the process of controlling, the first determination of determining whether or not it is necessary to urgently and/or forcibly notify the user of content of the information is made, and the display position and/or the display mode is controlled on the basis of a determination result in the first determination. Therefore, it is possible to appropriately display information having the nature of urgent notification and/or the nature of forcible notification in the visual field range of the user.

In the process of controlling, control of displaying the information conspicuously in the visual field range of the user is performed in a case where a determination result in the first determination is affirmative. Therefore, it is possible to cause the user to reliably recognize information having the nature of urgent notification and/or the nature of forcible notification.

In the process of controlling, control of displaying the information at a center part in the visual field range of the user is performed in a case where a determination result in the first determination is affirmative. Therefore, it is possible to cause the user to recognize information having the nature of urgent notification and/or the nature of forcible notification.

In the process of controlling, a second determination of determining whether or not content of the information is important for future behavior of the user is made in a case where a determination result in the first determination is negated, and the display position and/or the display mode is controlled on the basis of a determination result in the second determination. Therefore, it is possible to appropriately display information having importance in the visual field range of the user.

In the process of controlling, control of displaying the information conspicuously in the visual field range of the user is performed in a case where a determination result in the second determination is affirmative. Therefore, it is possible to cause the user to reliably recognize information having importance.

In the process of controlling, control of displaying the information at a center part in the visual field range of the user is performed in a case where a determination result in the second determination is affirmative. Therefore, it is possible to cause the user to recognize information having importance.

In the process of controlling, control of displaying the information inconspicuously in the visual field range of the user is performed in a case where a determination result in the second determination is negated. Therefore, it is possible to provide the user with information having no importance as referential information without affecting the visual field.

In the process of controlling, control of displaying the information in a peripheral part in the visual field range of the user is performed in a case where a determination result in the second determination is negated. Therefore, it is possible to provide the user with information having no importance as referential information without affecting the visual field as much as possible.

The element 110 is of an eyeball-worn type, the process of detecting a position shift between the eyeball EB and the element 110 is further included, and in the process of controlling, the display position and/or the display mode of information is controlled on the basis of a detection result in the process of detecting a position shift. Therefore, it is possible to suppress position shift between the eyeball EB and the element 110.

In the process of controlling, the position where the information is displayed in the visual field range of the user may be controlled in such a manner not to change before and after the position shift. Therefore, it is possible to suppress position shift more reliably.

The display method according to the present technology further includes the process of detecting opening-closing of the eyelid corresponding to the eyeball EB, and in the process of controlling, display of the information is controlled on the basis of a detection result in the process of detecting opening-closing. Therefore, it is possible to perform display control (for example, switching between display and non-display) in response to opening-closing of the eyelid.

9. <Modification of Present Technology>

The display device 10 and the display processing 1 to 5 according to the embodiment of the present technology described above (examples of the display method according to the present technology) can be appropriately altered.

For example, in each display processing, the content classification processing 2 described below may be performed instead of the content classification processing 1.

(Content Classification Processing 2)

Figure 28:
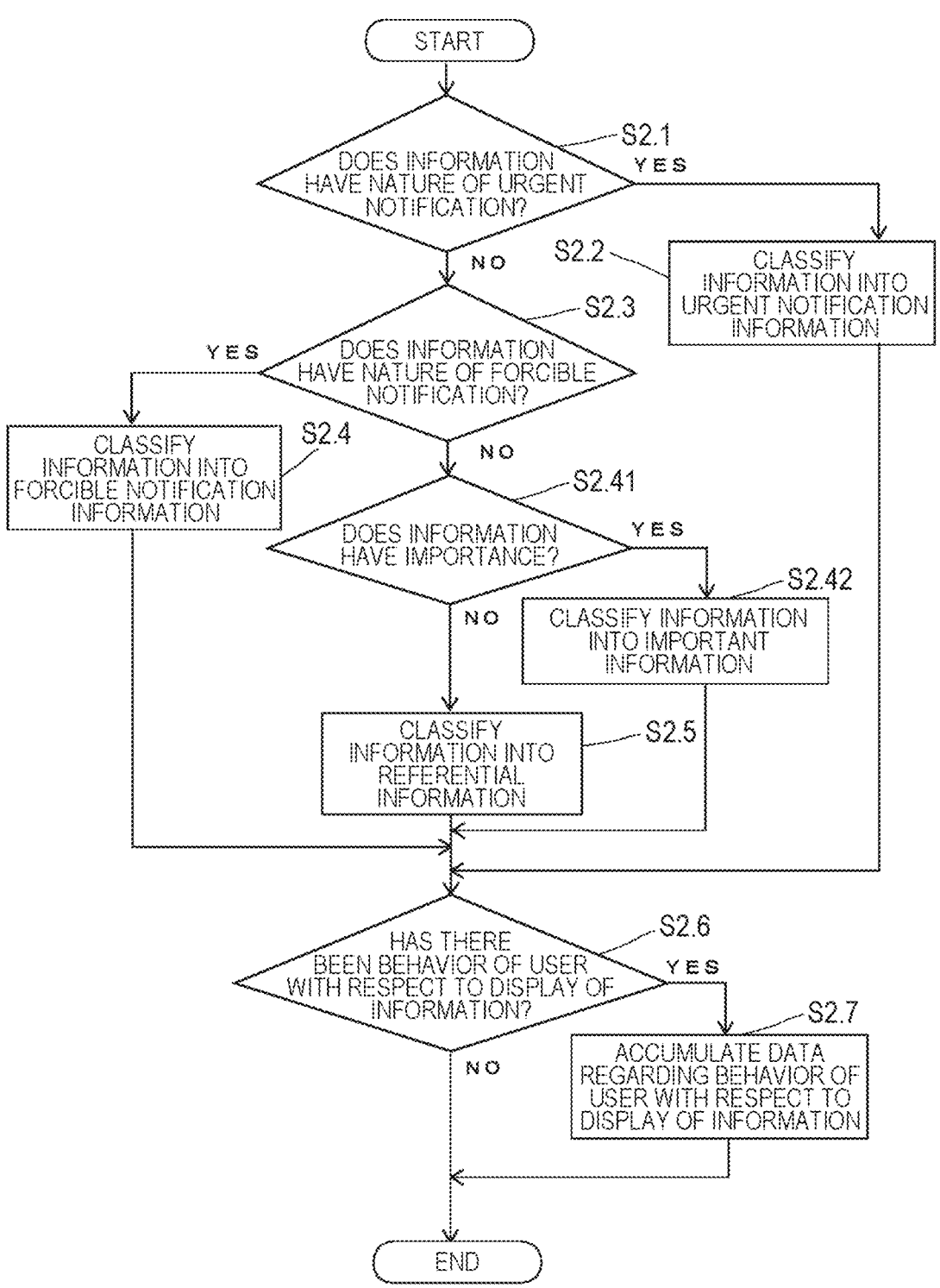
FIG. 28 is a flowchart for explaining content classification processing 2.

Hereinafter, the content classification processing 2 will be described with reference to the flowchart of FIG. 28.

In the first step S2.1, the content classification processing unit 330 determines whether or not the information has the nature of urgent notification. Specifically, the content classification processing unit 330 determines whether or not the information acquired and/or retained by the information acquisition/retention unit 360 is urgent notification information. The urgent notification information include earthquake information, fire information in the neighborhood, torrential rain information, and terrorism incidence information.

When the determination in step S2.1 is affirmed, the process transitions to step S2.2, and when the determination is negated, the process transitions to step S2.3.

In step S2.2, the content classification processing unit 330 classifies the information into the urgent notification information, and outputs the classification result. When step S2.2 is executed, the process transitions to step S2.6.

In step S2.3, the content classification processing unit 330 determines whether or not the information has the nature of forcible notification. Specifically, the content classification processing unit 330 determines whether or not the information acquired and/or retained by the information acquisition/ retention unit 360 is forcible notification information.

The forcible notification information is information that does not have the nature of urgent notification but needs to be provided in notification in advance of information notification of which needs to be forcibly provided from a schedule of the user, for example.

The forcible notification information include, for example, meeting in a Y building at X o'clock, and boarding on an airplane departing from Y airport at X o'clock.

When the determination in step S2.3 is affirmed, the process transitions to step S2.4, and when the determination is negated, the process transitions to step S2.41.

In step S2.4, the content classification processing unit 330 classifies the information into the forcible notification information, and outputs the classification result. When step S2.4 is executed, the process transitions to step S2.6.

In step S2.41, the content classification processing unit 330 determines whether or not the information has importance. Specifically, the content classification processing unit 330 determines whether or not the information acquired and/or retained by the information acquisition/retention unit 360 is information that is important for future behavior of the user (also referred to as "important information").

The important information is information that does not have the nature of urgent notification and the nature of forcible notification, but should be noted, for example, when the user performs future behavior.

The important information include a traveling direction, a transit point, a required time from a current location to a destination, and a destination desired by the user (for example, store information) when the user uses a navigation app of the communication terminal.

When the determination in step S2.41 is affirmed, the process transitions to step S2.42, and when the determination is negated, the process transitions to step S2.5.

In step S2.42, the content classification processing unit 330 classifies the information into the important information, and outputs the classification result. When step S2.42 is executed, the process transitions to step S2.6.

In step S2.5, the content classification processing unit 330 classifies the information into the referential information, and outputs the classification result. The referential information is information that does not have the nature of urgent notification, the nature of forcible notification, and the importance, and is only required to be referred to as appropriate. When step S2.5 is executed, the process transitions to step S2.6.

In step S2.6, the content classification processing unit 330 determines whether or not there has been behavior of the user with respect to display of information.

Specific examples (cases 1 to 4) of behavior of the user with respect to display of information will be presented below.

Case 1: When information is displayed in a peripheral part of the visual field range, the user moves the eyeball in the direction of the information in order to gaze at the information.

Case 2: When information is displayed in a peripheral part of the visual field range, the user does not try to view the information and does not move the eyeball.

Case 3: When information is displayed at the center part of the visual field range, the user moves the eyeball in such a manner to look away from the information.

Case 4: When information is displayed at the center part of the visual field range, the user does not move the eyeball in such a manner to gaze at the information.

Case 5: When information is displayed at the center part of the visual field range, the user erases or moves the information to a peripheral part with an external operation means.

Case 6: When information is displayed at a peripheral part of the visual field range, the user erases or moves the information to the center part with an external operation means.

The cases 1 to 4 described above can be detected using the eyeball sensor 210. The cases 5 and 6 can be detected with the external operation means for operating display content not illustrated in FIG. 10.

Note that, in the content classification processing 2 performed immediately after the display device 10 is activated, information is not yet indicated, and therefore it is assumed that the determination in step S2.6 is negated.

When the determination in step S2.6 is affirmed, the process transitions to step S2.7, and when the determination is negated, the flow ends.

In step S2.7, the content classification processing unit 330 accumulates data (for example, the cases 1 to 6) regarding the behavior of the user with respect to display of information.

The content classification processing unit 330 performs machine learning on the accumulated data by using artificial intelligence (AI), and feeds back the learning result to the next or subsequent content classification processing 2.

For example, the content classification processing unit 330 may determine that information frequently corresponds to Case 1 is important information in step S2.41 (determination of presence or absence of importance of information) of the next and subsequent content classification processing 2.

For example, the content classification processing unit 330 may determine that information frequently corresponds to Case 2 is referential information in step S2.41 of the next and subsequent content classification processing 2.

For example, the content classification processing unit 330 may determine that information frequently corresponds to Case 3 is referential information in step S2.41 of the next and subsequent content classification processing 2.

For example, the content classification processing unit 330 may determine that information frequently corresponds to Case 4 is important information in step S2.41 of the next and subsequent content classification processing 2.

For example, the content classification processing unit 330 may determine that information frequently corresponds to Case 5 is referential information in step S2.41 of the next and subsequent content classification processing 2.

For example, the content classification processing unit 330 may determine that information frequently corresponds to Case 6 is important information in step S2.41 of the next and subsequent content classification processing 2.

When step S2.7 is executed, the flow ends.

For example, the content classification processing needs not be performed in the display processing 1 to 5.

In this case, for example, the display position and/or the display mode of information in the visual field range of the user may be controlled only by the positional relationship between the information (for example, an arrow indicating the traveling direction, a mark indicating the destination, and the like) and the background in the visual field range of the user regardless of the content of the information.

Figure 29:
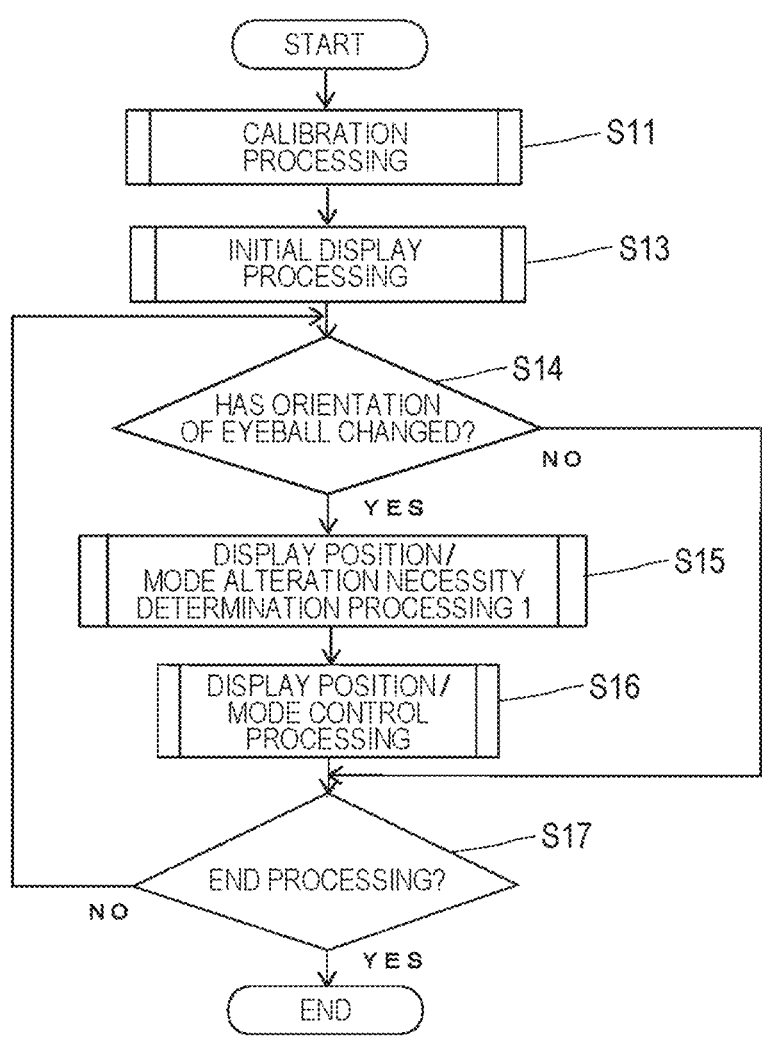
FIG. 29 is a flowchart for explaining display processing 1'.

FIG. 29 is a flowchart presenting display processing 1', which is a modification in which the content classification processing is not performed in the display processing 1.

Figure 30:
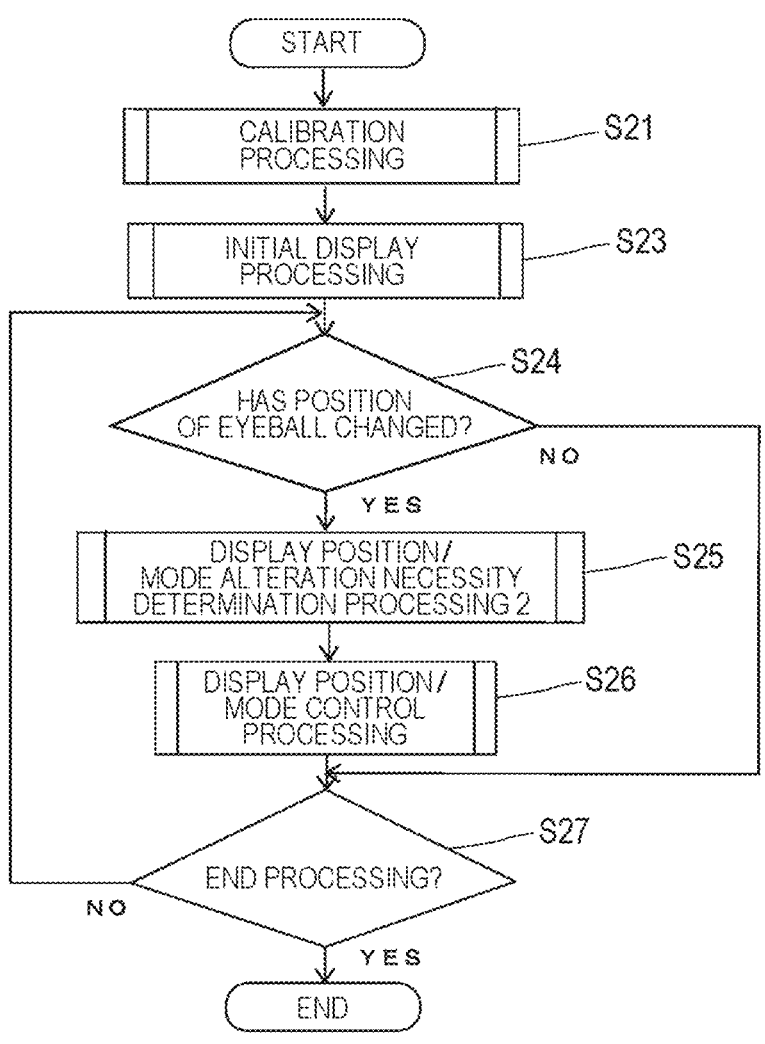
FIG. 30 is a flowchart for explaining display processing 2'.

FIG. 30 is a flowchart presenting display processing 2', which is a modification in which the content classification processing is not performed in the display processing 2.

Figure 31:
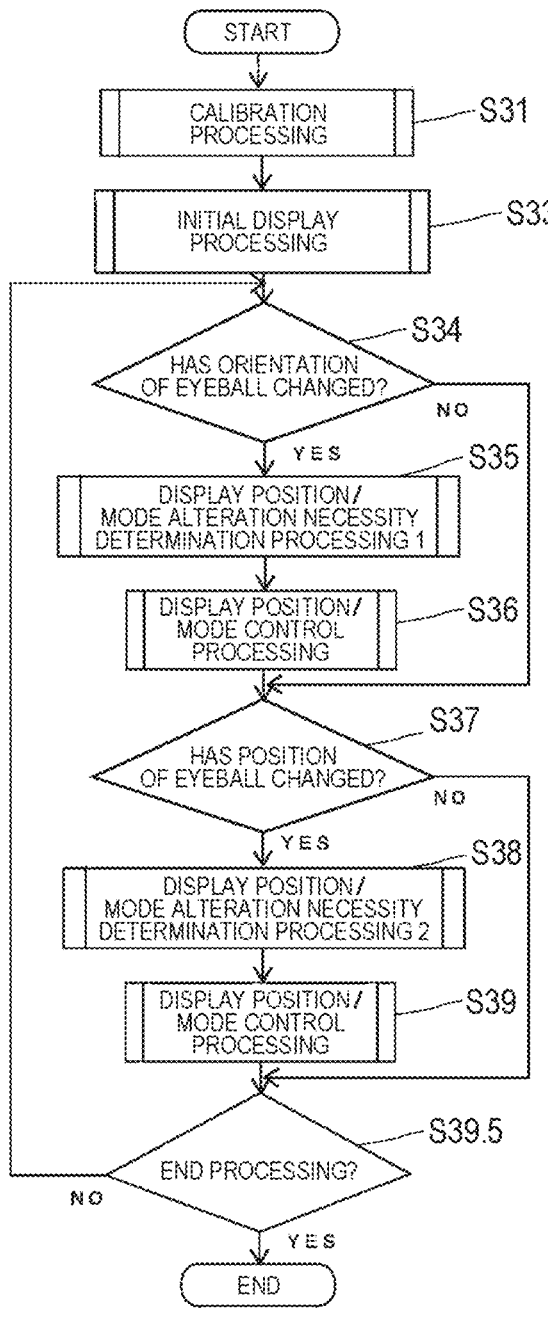
FIG. 31 is a flowchart for explaining display processing 3'.

FIG. 31 is a flowchart presenting display processing 3', which is a modification in which the content classification processing is not performed in the display processing 3.

Figure 32:
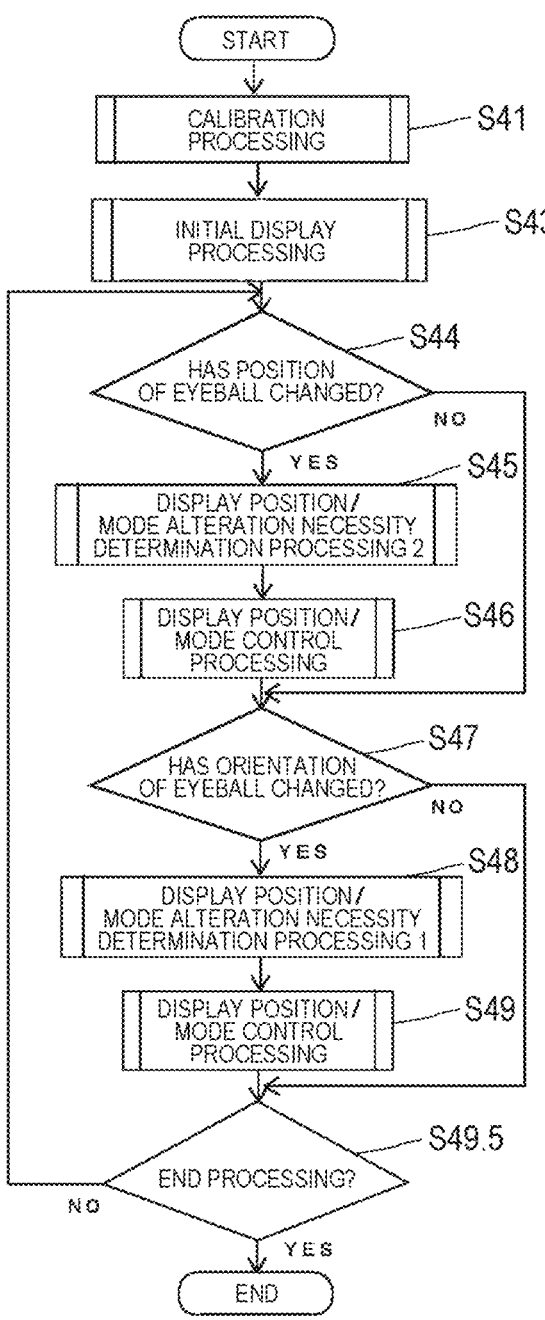
FIG. 32 is a flowchart for explaining display processing 4'.

FIG. 32 is a flowchart presenting display processing 4', which is a modification in which the content classification processing is not performed in the display processing 4.

FIG. 33 is a flowchart presenting display processing 5', which is a modification in which the content classification processing is not performed in the display processing 5.

In a case where the content classification processing is not performed as described above, the control system 300 needs not have the content classification processing unit 330.

In the display processing 5 and/or the display processing 5', the order of a series of processing of steps S54 to S56 and a series of processing of steps S57 to S59 may be exchanged.

Figure 34:
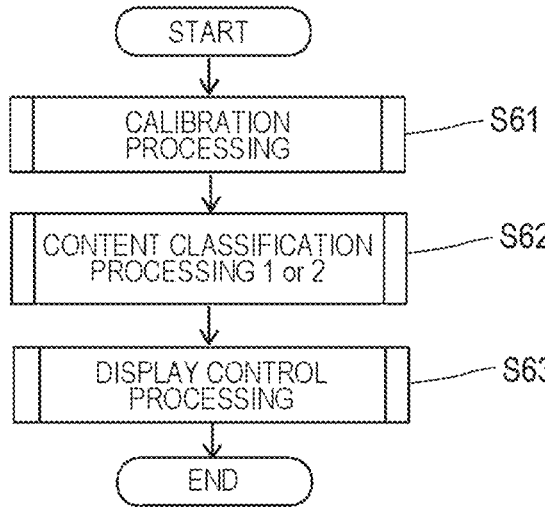
FIG. 34 is a flowchart for explaining display processing 6.

For example, as in the display processing 6 illustrated in FIG. 34, the control system 300 may end the flow after performing only the calibration processing (step S61), the content classification processing 1 or the content classification processing 2 (step S62), and the display control processing (step S63). The calibration processing has been mentioned above. The content classification processing 1 and the content classification processing 2 have been mentioned above. The "display control processing" is processing similar to the initial control processing described above, which is performed by the display position/mode control unit 350.

In a case of performing the display processing 6, the control system 300 needs not have the display position/mode alteration necessity determination unit 340.

The display device used for carrying out the display processing 6 is an example of a display device including:

the display system 100 configured to display information in a visual field range of a user by irradiating the retina 1 of the eyeball EB with light using the element 110 integrally provided on the eyeball EB of the user; and the control system 300 configured to determine content of the information and, on the basis of its determination result, control a display position and/or a display mode of the information in the visual field range of the user.

The display processing 6 is an example of a display method including:

the process of displaying information in a visual field range of a user by irradiating the retina 1 of the eyeball EB with light using the element 110 integrally provided on the eyeball EB of the user; and the process of determining content of the information and, on the basis of its determination result, controlling a display position and/or a display mode of the information in the visual field range of the user.

For example, in the display processing 1 to 5, when performing the content classification processing, the control system 300 may only perform classification as to whether or not the information corresponds to urgent notification information and/or forcible notification information, and make a determination as to alteration necessity in the display position and/or the display mode and display processing in response to its determination result on the basis of the classification result and presence or absence of a change in the orientation and/or the position of the eyeball. In this case, the imaging system 400 is not essential because the background needs not be imaged.

When the control system 300 only performs classification as to whether or not the information corresponds to urgent notification information and forcible notification information, the content classification processing unit 330 needs not have the importance determination unit 334.

When the control system 300 only performs classification as to whether or not the information corresponds to urgent notification information, the content classification processing unit 330 needs not have the forcibility determination unit 333 and/or the importance determination unit 334.

When the control system 300 only performs classification as to whether or not the information corresponds to forcible notification information, the content classification processing unit 330 needs not have the urgency determination unit 332 and/or the importance determination unit 334.

For example, in the display processing 1 to 5, when performing the content classification processing, the control system 300 may only perform classification as to whether or not the information corresponds to important information, and make a determination as to alteration necessity in the display position and/or the display mode and display processing in response to its determination result on the basis of the classification result and presence or absence of a change in the orientation and/or the position of the eyeball.

In this case, the content classification processing unit 330 needs not have the urgency determination unit 332 and/or the forcibility determination unit 333.

For example, in the display processing 1 to 5, on the basis of only the classification result in the content classification processing 1 or the content classification processing 2, the control system 300 may make a determination as to necessity of alteration in the display position and/or the display mode and perform display processing depending on its determination result.

In this case, the display device 10 needs not have the detection system 200 configured to detect a change in the orientation and/or the position of an eyeball.

For example, in the display processing 1 to 5 and 1' to 5', the display position/mode control unit 350 may control the display system 100 on the basis of the detection result of the incident position shift detection system 700 in the initial display processing and/or the display position/mode control processing. In this case, the display position/mode control unit 350 preferably controls the display system 100 in such a manner that the incident position shift is suppressed (preferably corrected).

Figures 35A, 35B, 35C:
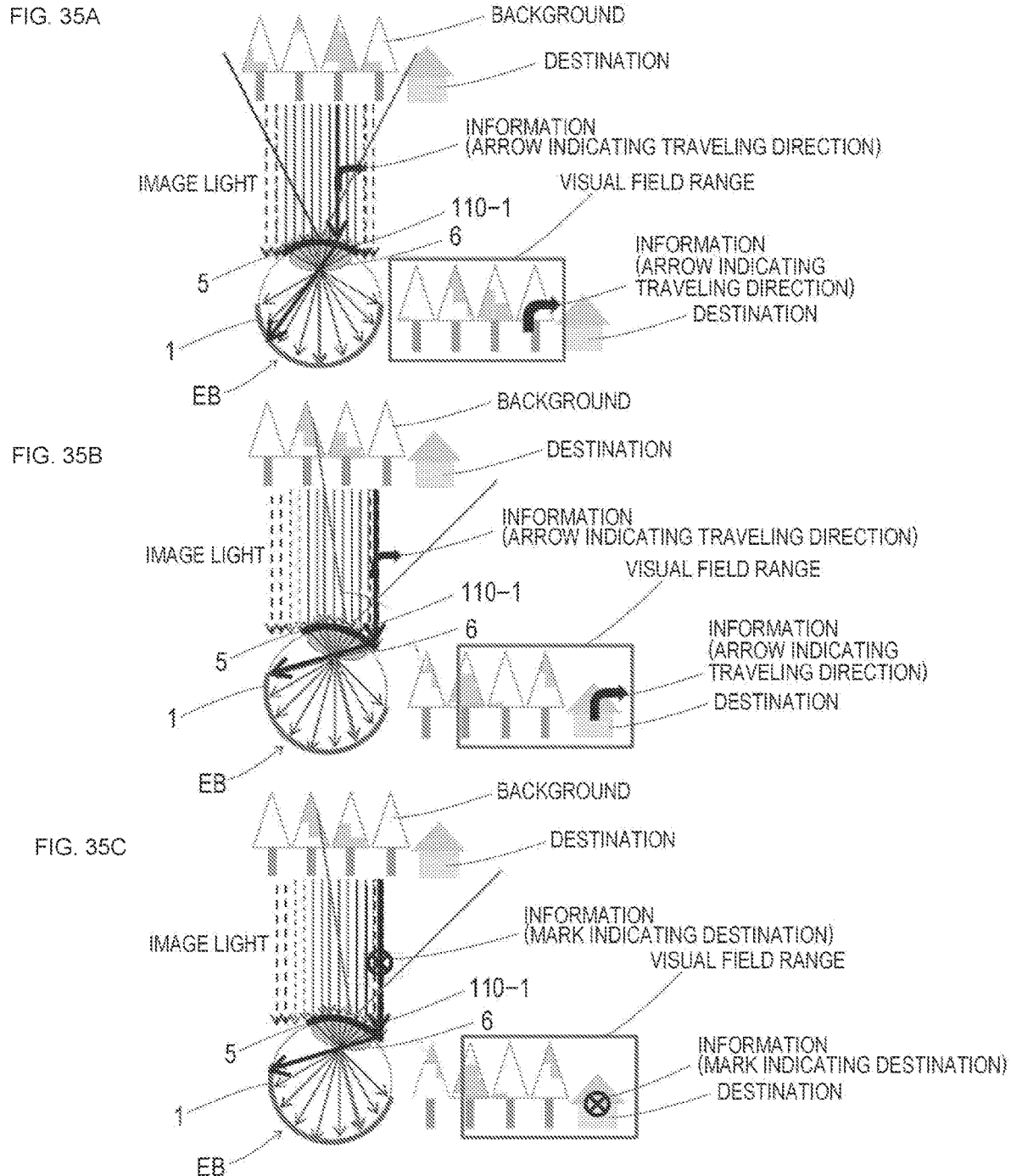
FIGS. 35A and 35C are views for explaining an operation example 3 of the display device of Example 1.
FIG. 35B is a comparison reference view used for comparison with the operation example 3.

As illustrated in FIG. 35A for example, in a case where the user has activated a navigation app in the communication terminal, and in a case where the information displayed in the visual field range using the display device 10-1 of Example 1 is an arrow (important information) indicating the traveling direction, as illustrated in FIG. 35B for example, when the user moves the line-of-sight toward the destination with performing special control (for example, control for causing the information to follow the line-of-sight movement), there is a case where the positional relationship between the background image and the information can become inappropriate (for example, a case where the arrow can overlap with the destination after the line-of-sight movement, or a case where the arrow can point to a direction different from the direction toward the destination) after the line-of-sight movement.

In such a case, as illustrated in FIG. 35C, the display position/mode alteration necessity determination unit 340 may determine that it is necessary to alter the display position and/or the display mode of the information, and for example, it is necessary to alter the arrow to a mark indicating the destination (it is necessary to alter the display mode of the information in the visual field range).

Figures 36A, 36B, 36C:
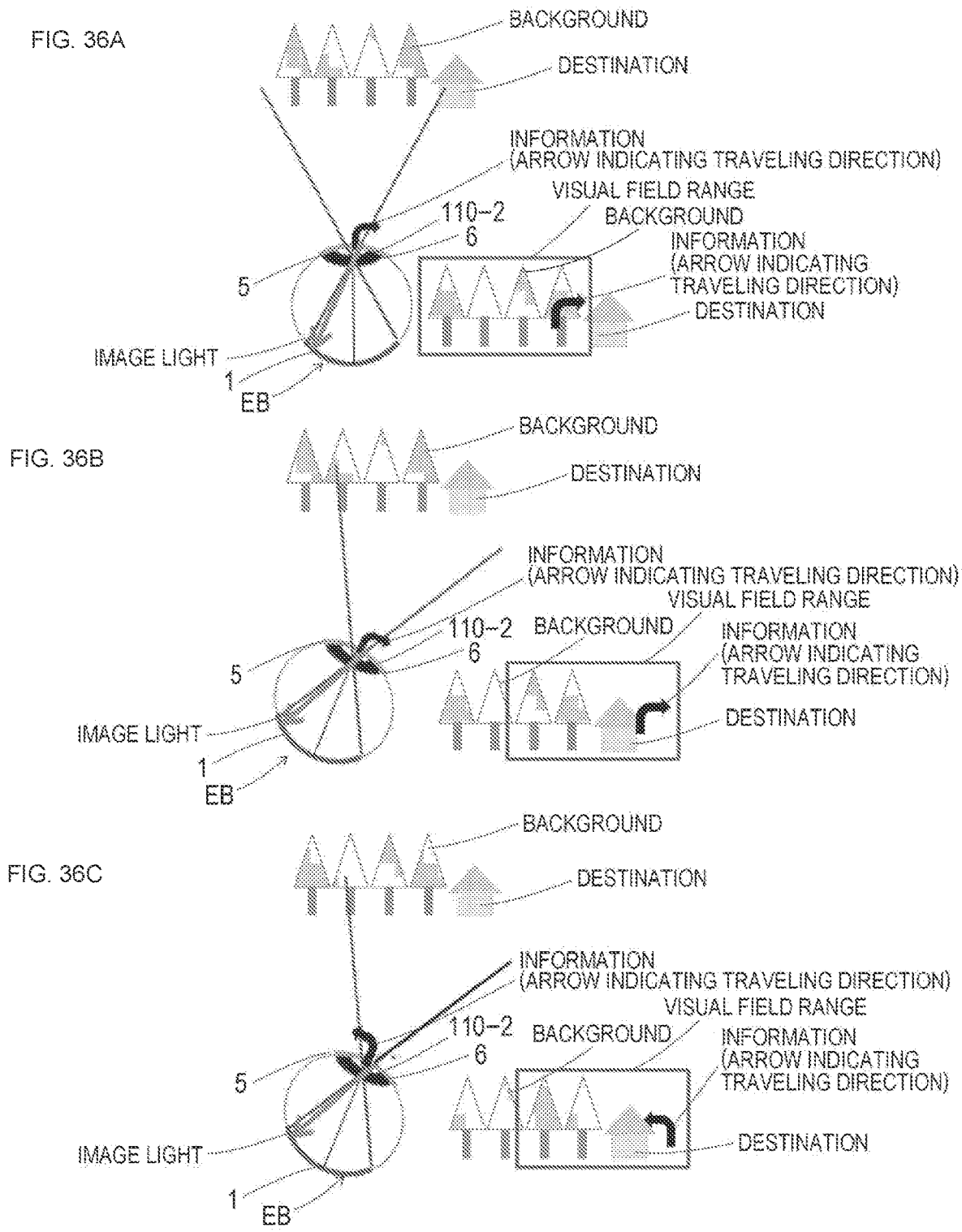
FIGS. 36A and 36C are views for explaining an operation example 3 of the display device of Example 2.
FIG. 36B is a comparison reference view used for comparison with the operation example 3.

As illustrated in FIG. 36A for example, in a case where the user has activated a navigation app in the communication terminal, and in a case where the information displayed in the visual field range using the display device 10-2 of Example 2 is an arrow (important information) indicating the traveling direction, as illustrated in FIG. 36B for example, when the user moves the line-of-sight toward the destination, there is a case where the positional relationship between the background image and the information can become inappropriate (for example, a case where the arrow can overlap with the destination after the line-of-sight movement, or a case where the arrow can point to a direction different from the direction toward the destination) after the line-of-sight movement.

In such a case, as illustrated in FIG. 36C, the display position/mode alteration necessity determination unit 340 may make a determination that it is necessary to alter the display position and/or the display mode of the information, and for example, it is necessary to alter the orientation of the arrow to the orientation pointing to the destination (it is necessary to alter the display mode of the information in the visual field range).

Figures 37A, 37B, 37C:
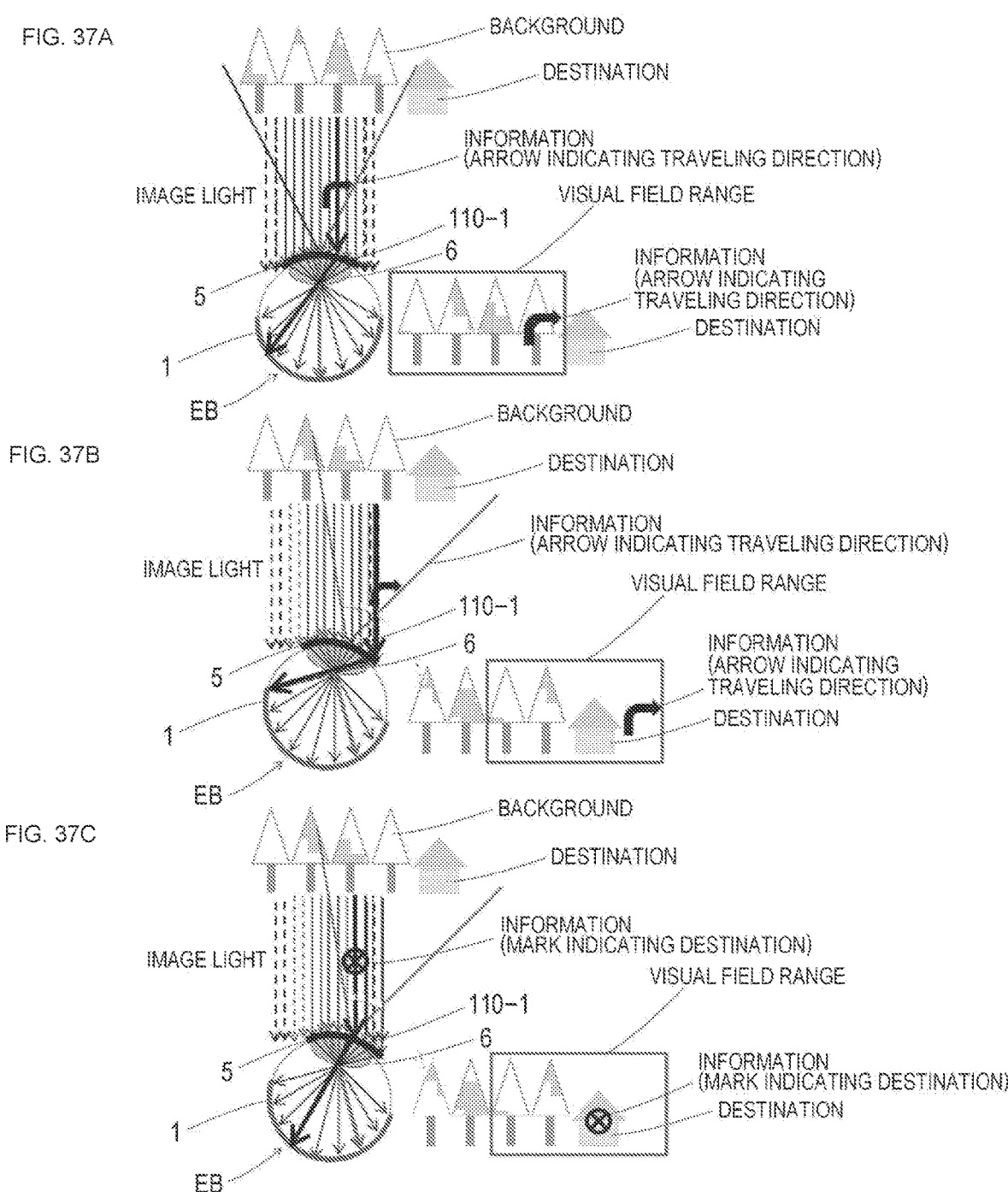
FIGS. 37A and 37C are views for explaining an operation example 4 of the display device of Example 1.
FIG. 37B is a comparison reference view used for comparison with the operation example 4.

As illustrated in FIG. 37A for example, in a case where the user has activated a navigation app in the communication terminal, and in a case where the information displayed in the visual field range using the display device 10-1 of Example 1 is an arrow (important information) indicating the traveling direction, as illustrated in FIG. 37B for example, when the user moves the line-of-sight toward the destination with performing special control (for example, control for causing the information to follow the line-of-sight movement), there is a case where the positional relationship between the background image and the information can become inappropriate (for example, a case where the arrow can overlap with the destination after the line-of-sight movement, or a case where the arrow can point to a direction different from the direction toward the destination) after the line-of-sight movement.

In such a case, as illustrated in FIG. 37C, the display position/mode alteration necessity determination unit 340 may determine that it is necessary to alter the display position and/or the display mode of the information, and for example, it is necessary to alter the arrow to a mark indicating the destination to display the mark at a position (for example, a position closer to the center of the visual field range) overlapping with the destination in the visual field range (it is necessary to alter the display mode and the display position of the information in the visual field range).

As illustrated in FIG. 38A for example, in a case where the user has activated a navigation app in the communication terminal, and in a case where the information displayed in the visual field range using the display device 10-2 of Example 2 is an arrow (important information) indicating the traveling direction, as illustrated in FIG. 38B for example, when the user moves the line-of-sight toward the destination, there is a case where the positional relationship between the background image and the information can become inappropriate (for example, a case where the arrow can overlap with the destination after the line-of-sight movement, or a case where the arrow can point to a direction different from the direction toward the destination) after the line-of-sight movement.

In such a case, as illustrated in FIG. 38C, the display position/mode alteration necessity determination unit 340 may determine that it is necessary to alter the display position and/or the display mode of the information, and for example, it is necessary to alter the arrow to a mark indicating the destination to display the mark at a position (for example, a position closer to the center of the visual field range) overlapping with the destination in the visual field range (it is necessary to alter the display mode and the display position of the information in the visual field range).

In the above description, the display device 10 controls the display position and/or the display mode of information in the visual field range mainly on the basis of the positional relationship between the information and the background in the visual field range, but may control the display position and/or the display mode of information in the visual field range regardless of the positional relationship between the information and the background in the visual field range.

For example, in FIG. 12, the display position/mode alteration necessity determination unit 340 may include only the information content acquisition unit 341 and the alteration necessity determination unit 344.

Alternatively, in the display position/mode alteration necessity determination unit 340, only the information content acquisition unit 341 and the alteration necessity determination unit 344 may be caused to function.

Next, the alteration necessity determination unit 344 may determine necessity of alteration in the display position and/or the display mode of information in the visual field range on the basis of only the content of the information acquired in the information content acquisition unit 341.

Next, the display position/mode control unit 350 may control the display position and/or the display mode of information in the visual field range on the basis of the determination.

While the description has been made on the assumption that the display device according to the present technology is a device that provides the user with augmented reality (AR), the display device according to the present technology is also applicable to a device that provides the user with virtual reality (VR).

Furthermore, the present technology can also have the following configurations.

(1) A display device including:
a display system configured to display information in a visual field range of a user by irradiating a retina of an eyeball with light using an element integrally provided on the eyeball of the user;
a detection system configured to detect a change in an orientation and/or a position of the eyeball; and
a control system configured to control a display position and/or a display mode of the information in the visual field range on the basis of a detection result in the detection system.

(2) The display device according to (1), in which the control system determines necessity of alteration in the display position and/or the display mode when the detection system detects a change in an orientation and/or a position of the eyeball, and controls the display system on the basis of its determination result.

(3) The display device according to (2), in which the control system determines necessity of the alteration depending on presence or absence of a change in the display position before and after a change in an orientation and/or a position of the eyeball.

(4) The display device according to (2) or (3), in which the control system determines necessity of the alteration depending on a positional relationship between the display position and a background in the visual field range after a change in an orientation and/or a position of the eyeball.

(5) The display device according to any one of (2) to (4), in which the control system determines content of information and, depending on its determination result, determines necessity of the alteration.

(6) The display device according to (5), in which the control system makes a first determination of determining whether or not it is necessary to urgently and/or forcibly notify the user of content of the information, and controls the display system on the basis of a determination result in the first determination.

(7) The display device according to (6), in which the control system causes the display system to display the information conspicuously in the visual field range in a case where a determination result in the first determination is affirmed.

(8) The display device according to (6) or (7), in which the control system causes the display system to display the information at a center part in the visual field range in a case where a determination result in the first determination is affirmed.

(9) The display device according to any one of (6) to (8), in which the control system makes a second determination of determining whether or not content of the information is important for future behavior of the user in a case where a determination result in the first determination is negated, and controls the display system on the basis of a determination result in the second determination.

(10) The display device according to (9), in which the control system causes the display system to display the information conspicuously in the visual field range in a case where a determination result in the second determination is affirmed.

(11) The display device according to (9) or (10), in which the control system causes the display system to display the information at a center part in the visual field range in a case where a determination result in the second determination is affirmed.

(12) The display device according to any one of (9) to (11), in which the control system causes the display system to display the information inconspicuously in the visual field range in a case where a determination result in the second determination is negated.

(13) The display device according to any one of (9) to (12), in which the control system causes the display system to display the information at a peripheral part in the visual field range in a case where a determination result in the second determination is negated.

(14) The display device according to any one of (5) to (13), in which the control system performs machine learning of behavior of the user toward display of the information, and determines content of the information on the basis of its learning result.

(15) The display device according to any one of (1) to (14), in which the detection system includes an eyeball sensor configured to detect a change in an orientation of the eyeball.

(16) The display device according to any one of (1) to (15), in which the detection system includes a head sensor configured to detect a change in an orientation of a head of the user.

(17) The display device according to any one of (1) to (16), in which the detection system includes a sensor configured to detect movement of the user.

(18) The display device according to any one of (1) to (17), in which the element is of an eyeball-worn type.

(19) The display device according to (18), in which the element is a display element.

(20) The display device according to (18), in which the element is an optical element, and the display system includes a projection unit configured to project, onto the optical element, light for displaying the information.

(21) The display device according to (20) further including an incident position shift detection system configured to detect an incident position shift, which is a shift of an incident position of light entering the retina via the optical element according to a change in an orientation of the eyeball, in which the control system further controls the display system on the basis of a detection result in the incident position shift detection system.

(22) The display device according to (21), in which the control system controls the display system in such a manner that the incident position shift is corrected.

(23) The display device according to any one of (18) to (22) further including a position shift detection system configured to detect a position shift between the eyeball and the element, in which the control system further controls the display system on the basis of a detection result of the position shift detection system.

(24) The display device according to (23), in which the control system controls the display position in such a manner not to change before and after the position shift.

(25) The display device according to (1), in which the element is of an eyeball-embedded type.

(26) The display device according to (25), in which the element is a display element.

(27) The display device according to (25), in which the element is an optical element, and the display system includes a projection unit configured to project, onto the optical element, light for displaying the information.

(28) The display device according to (27) further including an incident position shift detection system configured to detect an incident position shift, which is a shift of an incident position of light entering the retina via the optical element according to a change in an orientation of the eyeball, in which the control system further controls the display system on the basis of a detection result in the incident position shift detection system.

(29) The display device according to (28), in which the control system controls the display system in such a manner that the incident position shift is corrected.

(30) The display device according to any one of (1) to (29) further including another detection system configured to detect opening-closing of the eyelid corresponding to the eyeball, in which the control system controls the display system on the basis of a detection result in the another detection system.

(31) A display method including:

a process of displaying information in a visual field range of a user by irradiating a retina of an eyeball with light using an element integrally provided on the eyeball of the user;

a process of detecting a change in an orientation and/or a position of the eyeball; and a process of controlling a display position and/or a display mode of the information in the visual field range on the basis of a detection result in the process of detecting.

(32) The display method according to (31), in which in the process of controlling, necessity of alteration in the display position and/or the display mode may be determined when a change in an orientation and/or a position of the eyeball is detected in the process of detecting, and the display position and/or the display mode may be controlled on the basis of its determination result.

(33) The display method according to (32), in which in the process of controlling, necessity of the alteration may be determined depending on presence or absence of a change in the display position before and after a change in an orientation and/or a position of the eyeball.

(34) The display method according to (32), in which in the process of controlling, necessity of the alteration is determined depending on a positional relationship between the display position and a background in the visual field range after a change in an orientation and/or a position of the eyeball.

(35) The display method according to (32), in which in the process of controlling, content of the information is determined and, depending on its determination result, necessity of the alteration is determined.

(36) The display method according to (35), in which in the process of controlling, a first determination of determining whether or not it is necessary to urgently and/or forcibly notify the user of content of the information is made, and the display position and/or the display mode is controlled on the basis of a determination result in the first determination.

(37) The display method according to (36), in which in the process of controlling, the information is displayed conspicuously in the visual field range in a case where a determination result in the first determination is affirmed.

(38) The display method according to (36) or (37), in which in the process of controlling, the information is displayed at a center part in the visual field range in a case where a determination result in the first determination is affirmed.

(39) The display method according to any one of (36) to (38), in which in the process of controlling, a second determination of determining whether or not content of the information is important for future behavior of the user is made in a case where a determination result in the first determination is negated, and the display position and/or the display mode is controlled on the basis of a determination result in the second determination.

(40) The display method according to (39), in which in the process of controlling, the information is displayed conspicuously in the visual field range in a case where a determination result in the second determination is affirmed.

(41) The display method according to (39) or (40), in which in the process of controlling, the information is displayed at a center part in the visual field range in a case where a determination result in the second determination is affirmed.

(42) The display method according to any one of (39) to (41), in which in the process of controlling, the information is displayed inconspicuously in the visual field range in a case where a determination result in the second determination is negated.

(43) The display method according to any one of (39) to (42), in which in the process of controlling, the information is displayed in a peripheral part in the visual field range in a case where a determination result in the second determination is negated.

43

(44) The display method according to any one of (35) to (43), in which in the process of controlling, machine learning of behavior of the user toward display of the information is performed, and content of the information is determined on the basis of its learning result.

(45) The display method according to any one of (31) to (44), in which the element is an optical element irradiated with light for displaying the information, a process of detecting an incident position shift, which is a shift of an incident position of light entering the retina via the optical element according to a change in an orientation of the eyeball is further included, and in the process of controlling, the display system is further controlled on the basis of a detection result in the incident position shift detection system.

(46) The display method according to (45), in which in the process of controlling, the display system is controlled in such a manner that the incident position shift is corrected.

(47) The display method according to any one of (31) to (46), in which the element is of an eyeball-worn type, a process of detecting a position shift between the eyeball and the element is further included, and in the process of controlling, the display position and/or the display mode is controlled on the basis of a detection result in the process of detecting a position shift.

(48) The display method according to (47), in which in the process of controlling, the display position is controlled in such a manner not to change before and after the position shift.

(49) The display method according to any one of (31) to (48) further including a process of detecting opening-closing of an eyelid corresponding to the eyeball, in which in the process of controlling, display of the information may be controlled on the basis of a detection result in the process of detecting opening-closing.

(50) A display device including:

a display system configured to display information in a visual field range of a user by irradiating a retina of an eyeball with light using an element integrally provided on the eyeball of the user; and a control system configured to determine content of the information and, on the basis of its determination result, control a display position and/or a display mode of the information in the visual field range.

(51) A display method including:

a process of displaying information in a visual field range of a user by irradiating a retina of an eyeball with light using an element integrally provided on the eyeball of the user; and a process of determining content of the information and, on the basis of its determination result, controlling a display position and/or a display mode of the information in the visual field range.

REFERENCE SIGNS LIST

1 Retina
10 Display device
100, 100-1 to 100-4 Display system
110, 110-1 to 110-4 Element
200 Detection system
210 Eyeball sensor
220 Head sensor
230 Sensor configured to detect movement
300 Control system
500 Position shift detection system

44

600 Another detection system
700 Incident position shift detection system
Eyeball EB

The invention claimed is:

1. A display device, comprising:
a display system configured to control an element to irradiate a retina of an eyeball with light to display information in a user visual field range, wherein the element is integrally provided on the eyeball;
a first detection system configured to detect a change in at least one of an orientation or a position of the eyeball; and
a control system configured to:
determine necessity of alteration in at least one of a display position or a display mode of the information in the user visual field range based on the detection of the change in the at least one of the orientation or the position of the eyeball, and a positional relationship between the display position of the information and a background in the user visual field range; and
control the at least one of the display position or the display mode of the information in the user visual field range based on the determination of the necessity of the alteration.

2. The display device according to claim 1, wherein the control system is further configured to determine the necessity of the alteration based on one of presence or absence of a change in the display position before and after the change in the at least one of the orientation or the position of the eyeball.

3. The display device according to claim 1, wherein the control system is further configured to:
determine content of the information; and
determine the necessity of the alteration based on the determination of the content of the information.

4. The display device according to claim 3, wherein the control system is further configured to:
determine, based on the content of the information, whether the information is one of urgent notification information or forcible notification information; and
control the display system based on a determination result of the determination whether the information is one of the urgent notification information or the forcible notification information.

5. The display device according to claim 4, wherein the control system is further configured to control, in a case where the information is one of the urgent notification information or the forcible notification information, the display system to display the information conspicuously in the user visual field range.

6. The display device according to claim 4, wherein the control system is further configured to control, in a case where the information is one of the urgent notification information or the forcible notification information, the display system to display the information at a center part in the user visual field range.

7. The display device according to claim 4, wherein the control system is further configured to:
determine whether the content of the information corresponds to user future behavior in a case where the information is not one of the urgent notification information or the forcible notification information; and
control the display system based on a determination result of the determination whether the content of the information corresponds to the user future behavior.

8. The display device according to claim 7, wherein the control system is further configured to control, in a case where the content of the information corresponds to the user future behavior, the display system to display the information conspicuously in the user visual field range.

9. The display device according to claim 7, wherein the control system is further configured to control, in a case where the content of the information corresponds to the user future behavior, the display system to display the information at a center part in the user visual field range.

10. The display device according to claim 7, wherein the control system is further configured to control, in a case where the content of the information does not correspond to the user future behavior, the display system to display the information inconspicuously in the user visual field range.

11. The display device according to claim 7, wherein the control system is further configured to control, in a case where the content of the information does not correspond to the user future behavior, the display system to display the information at a peripheral part in the user visual field range.

12. The display device according to claim 3, wherein the control system is further configured to:

execute machine learning of user behavior toward the display of the information; and determine the content of the information based on a learning result of the execution of the machine learning of the user behavior.

13. The display device according to claim 1, wherein the first detection system includes an eyeball sensor, and the eyeball sensor is configured to detect the orientation of the eyeball.

14. The display device according to claim 13, wherein the first detection system includes a head sensor, and the head sensor is configured to detect the orientation of a user head.

15. The display device according to claim 13, wherein the first detection system includes a sensor, and the sensor is configured to detect a user movement.

16. The display device according to claim 1, wherein the first detection system includes a head sensor, and the head sensor is configured to detect an orientation of a user head.

17. The display device according to claim 14, wherein the first detection system includes a sensor, and the sensor is configured to detect a user movement.

18. The display device according to claim 16, wherein the first detection system includes a sensor, and the sensor is configured to detect a user movement.

19. The display device according to claim 1, wherein the first detection system includes a sensor, and the sensor is configured to detect user movement.

20. The display device according to claim 1, wherein the element is of an eyeball-worn type.

21. The display device according to claim 20, wherein the element is a display element.

22. The display device according to claim 20, wherein the element is an optical element, the display system includes a projection unit, and the projection unit is configured to project, onto the optical element, light for the display of the information.

23. The display device according to claim 22, further comprising an incident position shift detection system, wherein the incident position shift detection system is configured to detect an incident position shift, the incident position shift is a shift of an incident position of light, that enters the retina via the optical element, based on the change in the orientation of the eyeball, and the control system is further configured to control the display system based on a detection result of the detection of the incident position shift.

24. The display device according to claim 23, wherein the control system is further configured to correct the incident position shift based on the control of the display system.

25. The display device according to claim 20, further comprising a position shift detection system configured to detect a position shift between the eyeball and the element, wherein the control system is further configured to control the display system based on a detection result of the detection of the position shift by the position shift detection system.

26. The display device according to claim 25, wherein the control system is further configured to control the display position to not change before the position shift and after the position shift.

27. The display device according to claim 1, wherein the element is of an eyeball-embedded type.

28. The display device according to claim 27, wherein the element is a display element.

29. The display device according to claim 27, wherein the element is an optical element, the display system includes a projection unit, and the projection unit is configured to project, onto the optical element, light for the display of the information.

30. The display device according to claim 29, further comprising an incident position shift detection system, wherein the incident position shift detection system is configured to detect an incident position shift, the incident position shift is a shift of an incident position of light, that enters the retina via the optical element, based on the change in the orientation of the eyeball, and the control system is further configured to control the display system based on a detection result of the detection of the incident position shift.

31. The display device according to claim 30, wherein the control system is further configured to control the display system to correct the incident position shift.

32. The display device according to claim 1, further comprising a second detection system configured to detect opening-closing of an eyelid corresponding to the eyeball, wherein the control system is further configured to control the display system based on a detection result of the detection of the opening-closing of the eyelid by the second detection system.

33. A display method, comprising:

controlling an element to irradiate a retina of an eyeball with light for displaying information in a user visual field range, wherein the element is integrally provided on the eyeball;

detecting a change in at least one of an orientation or a position of the eyeball;

determining necessity of alteration in at least one of a display position or a display mode of the information in the user visual field range based on the detection of the change in the at least one of the orientation or the position of the eyeball, and a positional relationship between the display position of the information and a background in the user visual field range; and controlling the at least one of the display position or the display mode of the information in the user visual field range based on the determination of the necessity of the alteration.

34. The display method according to claim 33, further comprising determining the necessity of the alteration based on one of presence or absence of a change in the display position before and after the change in the at least one of the orientation or the position of the eyeball.

35. The display method according to claim 33, further comprising:

determining content of the information; and determining the necessity of the alteration based on the determination of the content of the information.

36. The display method according to claim 35, further comprising:

determining, based on the content of the information, whether the information is one of urgent notification information or forcible notification information; and controlling the at least one of the display position or the display mode based on the determination whether the information is one of the urgent notification information or the forcible notification information.

37. The display method according to claim 36, further comprising controlling, in a case where the information is one of the urgent notification information or the forcible notification information, the display of the information conspicuously in the user visual field range.

38. The display method according to claim 36, further comprising controlling, in a case where the information is one of the urgent notification information or the forcible notification information, the display of the information at a center part in the user visual field range.

39. The display method according to claim 36, further comprising:

determining whether the content of the information corresponds to user future behavior in a case where the information is not one of the urgent notification information or the forcible notification information; and controlling the at least one of the display position or the display mode based on a determination result of the determination that the content of the information corresponds to the user future behavior.

40. The display method according to claim 39, further comprising controlling, in a case where the content of the information corresponds to the user future behavior, the display of the information conspicuously in the user visual field range.

41. The display method according to claim 39, further comprising controlling, in a case where the content of the information corresponds to the user future behavior, the display of the information at a center part in the user visual field range.

42. The display method according to claim 39, further comprising controlling, in a case where the content of the information does not correspond to the user future behavior, the display of the information inconspicuously in the user visual field range.

43. The display method according to claim 39, further comprising controlling, in a case where the content of the information does not correspond to the user future behavior, the display of the information in a peripheral part in the user visual field range.

44. The display method according to claim 35, further comprising:

executing machine learning of user behavior toward the display of the information; and determining the content of the information based on a learning result of the execution of the machine learning of the user behavior.

45. The display method according to claim 33, further comprising: detecting an incident position shift, wherein the element is an optical element irradiated with light for the displaying of the information, and the incident position shift is a shift of an incident position of light, entering the retina via the optical element, based on the change in the orientation of the eyeball; and controlling at least one of the display position or the display mode of the information based on a detection result of the detection of the incident position shift.

46. The display method according to claim 45, further comprising correcting the incident position shift based on the controlling of the at least one of the display position or the display mode.

47. The display method according to claim 33, further comprising:

detecting a position shift between the eyeball and the element, wherein the element is of an eyeball-worn type; and controlling the at least one of the display position or the display mode based on a detection result of the detecting of the position shift.

48. The display method according to claim 47, further comprising controlling the display position to not change before the position shift and after the position shift.

49. The display method according to claim 33, further comprising:

detecting opening-closing of an eyelid corresponding to the eyeball; and controlling the display of the information based on a detection result of the detecting of the opening-closing of the eyelid.

50. A display device, comprising:

a display system configured to control an element to irradiate a retina of an eyeball with light to display information in a user visual field range, wherein the element is integrally provided on the eyeball; and a control system configured to:

determine content of the information;

determine necessity of alteration in at least one of a display position or a display mode of the information in the user visual field range based on a positional relationship between the display position of the information and a background in the user visual field range; and control at least one of the display position or the display mode of the information in the user visual field range based on the content of the information and the determination of the necessity of the alteration.

51. A display method, comprising:

controlling an element to irradiate a retina of an eyeball with light for displaying information in a user visual field range, wherein the element is integrally provided on the eyeball;

determining content of the information;

determining necessity of alteration in at least one of a display position or a display mode of the information in the user visual field range based on a positional relationship between the display position of the information and a background in the user visual field range; and controlling at least one of the display position or the display mode of the information in the user visual field range based on the content of the information and the determination of the necessity of the alteration.

\*    \*    \*    \*    \*